United States Patent
Kawai et al.

(10) Patent No.: US 9,979,536 B2
(45) Date of Patent: May 22, 2018

(54) CRYPTOGRAPHIC SYSTEM, ENCRYPTION DEVICE, RE-ENCRYPTION KEY GENERATION DEVICE, RE-ENCRYPTION DEVICE, AND CRYPTOGRAPHIC PROGRAM

(71) Applicant: MITSUBISHI ELECTRIC CORPORATION, Tokyo (JP)

(72) Inventors: Yutaka Kawai, Tokyo (JP); Katsuyuki Takashima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 132 days.

(21) Appl. No.: 15/021,929

(22) PCT Filed: Oct. 9, 2013

(86) PCT No.: PCT/JP2013/077491
§ 371 (c)(1),
(2) Date: Mar. 14, 2016

(87) PCT Pub. No.: WO2015/052799
PCT Pub. Date: Apr. 16, 2015

(65) Prior Publication Data
US 2016/0234012 A1 Aug. 11, 2016

(51) Int. Cl.
*H04L 9/06* (2006.01)
*H04L 9/30* (2006.01)
*H04L 9/08* (2006.01)

(52) U.S. Cl.
CPC .......... *H04L 9/0618* (2013.01); *H04L 9/0861* (2013.01); *H04L 9/30* (2013.01); *H04L 2209/76* (2013.01)

(58) Field of Classification Search
CPC .................................................. H04L 9/0618
See application file for complete search history.

(56) References Cited

U.S. PATENT DOCUMENTS 6,381,331 B1    4/2002    Kato
6,587,946 B1 *   7/2003    Jakobsson ............... H04L 63/02
                                                                                                380/286
(Continued)

FOREIGN PATENT DOCUMENTS

EP    2 779 523 A1    9/2014
JP    11-112491 A    4/1999
(Continued)

OTHER PUBLICATIONS

Canetti et al.; Chosen-ciphertext secure proxy re-encryption; Published in: Proceeding CCS '07 Proceedings of the 14th ACM conference on Computer and communications security; 2007; pp. 185-194; ACM Digital Library (Year: 2007).*

(Continued)

*Primary Examiner* — Bradley Holder
(74) *Attorney, Agent, or Firm* — Birch, Stewart, Kolasch & Birch, LLP

(57) ABSTRACT

An encryption device 200 outputs a ciphertext ct including a ciphertext c and a ciphertext c˜. The ciphertext c has been set with one of attribute information x and attribute information v related to each other. The ciphertext c˜ has been set with one of attribute information y and attribute information z related to each other. A decryption device 300 outputs a re-encryption key rk including a decryption key $k^{*rk}$, a decryption key $k^{\sim *rk}$, and encrypted conversion information $\phi^{rk}$. The decryption key $k^{*rk}$ is obtained by converting the decryption key k* which is set with the other one of attribute information x and attribute information v, with conversion information $W_{1,t}$. The decryption key $k^{\sim *rk}$ has been set with the other one of the attribute information y and the attribute information z. The encrypted conversion information $\phi^{rk}$ is obtained by encrypting the conversion information $W_{1,t}$ by setting one of attribute information x' and attribute information v' related to each other. A re-encryption device 400

(Continued)

outputs a re-ciphertext ret including a ciphertext $c^{renc}$ and a decryption key $k^{*renc}$. The ciphertext $c^{renc}$ is obtained by setting one of additional information H and additional information Θ to the ciphertext ct. The decryption key $k^{*renc}$ is obtained by setting the other one of the additional information H and the additional information Θ to the re-encryption key rk.

9 Claims, 30 Drawing Sheets

(56) References Cited

U.S. PATENT DOCUMENTS

| | | | |
|---|---|---|---|
| 6,687,822 B1* | 2/2004 | Jakobsson | H04L 9/3268 713/156 |
| 7,213,143 B1* | 5/2007 | Watson | H04L 63/0428 713/151 |
| 8,094,810 B2* | 1/2012 | Hohenberger | H04L 9/3013 380/28 |
| 8,938,623 B2 | 1/2015 | Takashima et al. | |
| 9,097,926 B2 | 8/2015 | Sato et al. | |
| 9,197,410 B2 | 11/2015 | Yoshida et al. | |
| 2005/0172127 A1* | 8/2005 | Hartung | H04L 51/066 713/167 |
| 2006/0136718 A1 | 6/2006 | Moreillon | |
| 2008/0059787 A1* | 3/2008 | Hohenberger | H04L 9/3013 713/153 |
| 2008/0170701 A1 | 7/2008 | Matsuo et al. | |
| 2009/0210697 A1 | 8/2009 | Chen et al. | |
| 2010/0138671 A1* | 6/2010 | Kim | G06F 21/10 713/189 |
| 2012/0027210 A1 | 2/2012 | Takeuchi et al. | |
| 2012/0188493 A1 | 7/2012 | Sato et al. | |
| 2012/0224690 A1 | 9/2012 | Chatt et al. | |
| 2012/0317655 A1 | 12/2012 | Zhang et al. | |
| 2013/0156188 A1* | 6/2013 | Xu | H04L 9/0861 380/255 |
| 2013/0173929 A1 | 7/2013 | Takashima et al. | |
| 2013/0212388 A1* | 8/2013 | D'Souza | H04L 9/0825 713/168 |
| 2013/0339726 A1 | 12/2013 | Yoshida et al. | |
| 2014/0006773 A1 | 1/2014 | Chazalet et al. | |
| 2014/0050318 A1 | 2/2014 | Hayashi et al. | |
| 2014/0161251 A1 | 6/2014 | Yoshida et al. | |
| 2014/0208117 A1 | 7/2014 | Hayashi et al. | |
| 2014/0310521 A1 | 10/2014 | Ichikawa et al. | |
| 2014/0359309 A1 | 12/2014 | Cachin et al. | |
| 2015/0271153 A1* | 9/2015 | Rohloff | H04L 63/0464 713/153 |
| 2015/0293399 A1 | 10/2015 | Sato et al. | |

FOREIGN PATENT DOCUMENTS

| | | |
|---|---|---|
| JP | 2005-252384 A | 9/2005 |
| JP | 2008-54315 A | 3/2008 |
| JP | 2008-172736 A | 7/2008 |
| JP | 2009-302861 A | 12/2009 |
| JP | 2010-114682 A | 5/2010 |
| JP | 2011-55309 A | 3/2011 |
| JP | 2011-147047 A | 7/2011 |
| JP | 2012-133214 A | 7/2012 |
| JP | 2012-150339 A | 8/2012 |
| JP | 2012-150378 A | 8/2012 |
| JP | 2012-150399 A | 8/2012 |
| JP | 2012-169978 A | 9/2012 |
| JP | 2012-175156 A | 9/2012 |
| JP | 2013-78042 A | 4/2013 |
| JP | 2013-101260 A | 5/2013 |
| JP | 2013-105065 A | 5/2013 |
| JP | 2013-207387 A | 10/2013 |
| WO | WO 2010/123122 A1 | 10/2010 |
| WO | WO 2011/027189 A1 | 3/2011 |
| WO | WO 2012/147869 A1 | 11/2012 |
| WO | WO 2013/094018 A1 | 6/2013 |

OTHER PUBLICATIONS

Libert et al.; Unidirectional Chosen-Ciphertext Secure Proxy Re-Encryption; Published in: IEEE Transactions on Information Theory ( vol. 57, Issue: 3, Mar. 2011 ); IEEE Xplore (Year: 2011).*
Ichikawa et al., "A Functional Encryption System Supporting Revocation," SCIS 2012, The 29th Symposium on Cryptography and Information Security, The Institute of Electronics, Information and Communication Engineers, Kanagawa, Japan, Jan. 30-Feb. 2, 2012, pp. 1-7.
Kawai et al., "Functional Proxy-Re-Encryption," SCIS 2013, The 30th Symposium on Cryptography and Information Security Kyoto, Japan, The Institute of Electronics, Information and Communication Engineers, Jan. 22-25, 2013, pp. 1-8.
Naruse et al., "Attribute Revocable Attribute-Based Encryption with Forward Secrecy," vol. 2013, No. 2, Information Processing Society of Japan, Jul. 3, 2013, pp. 215-221.
Naruse et al., "Attribute-based Encryption Sharing Attribute Revocation Process with Service Server by Proxy Re-Encryption and Attribute Key for Updating," Information Processing Society of Japan, Mar. 6, 2013, pp. 3-521-3-522.
Weng et al., "Efficient Conditional Proxy Re-encryption with Chosen-Ciphertext Security", Springer-Verlag Berlin Heidelberg 2009, pp. 151-166.
Green et al., "Identity-Based Proxy Re-Encryption", pp. 1-21, Jun. 5-8, 2007.
Kawai et al., "Fully-Anonymous Functional Proxy-Re-Encryption", May 29, 2013, pp. 1-71.
Liang et al., "Attribute Based Proxy Re-encryption with Delegating Capabilities", pp. 276-286, Mar. 10-12, 2009.
Okamoto "Achieving Short Ciphertexts or Short Secret-Keys for Adaptively Secure General Inner-Product Encryption", Jul. 11, 2012, pp. 1-45.
Okamoto "Fully Secure Unbounded Inner-Product and Attribute-Based Encryption", Nov. 28, 2012, pp. 1-90.
Okamoto et al., "Decentralized Attribute-Based Signatures", Jul. 27, 2012, pp. 1-59.
Weng et al., "Conditional Proxy Re-Encryption Secure against Chosen-Ciphertext Attack", pp. 322-332, Mar. 10-12, 2009.
Weng et al, "Efficient Conditional Proxy Re-encryption with Chosen-Ciphertext Security", Springer-Verlag Berlin Heidelberg 2009, pp. 151-166.

* cited by examiner

Fig. 3

$$s_0 = \left( \underbrace{1, \ldots, 1}_{r \text{ COLUMNS}} \right) \begin{pmatrix} f_1, \ldots, f_r \end{pmatrix} = \sum_{k=1}^{r} f_k$$

Fig. 4

$$\vec{s}^T = \begin{pmatrix} M_{1,1} & M_{1,2} & \cdots & M_{1,r} \\ M_{2,1} & M_{2,2} & \cdots & M_{2,r} \\ & & \cdots & \\ M_{L,1} & M_{L,2} & \cdots & M_{L,r} \end{pmatrix} \begin{pmatrix} f_1, & \cdots & , f_r \end{pmatrix} = \begin{pmatrix} s_1, & \cdots & , s_L \end{pmatrix}$$

CRYPTOGRAPHIC SYSTEM, ENCRYPTION DEVICE, RE-ENCRYPTION KEY GENERATION DEVICE, RE-ENCRYPTION DEVICE, AND CRYPTOGRAPHIC PROGRAM

TECHNICAL FIELD

The present invention relates to a functional proxy re-encryption (FPRE) scheme. More particularly, the present invention relates to a functional conditional proxy re-encryption (FCPRE) scheme being an FPRE scheme that can designate a condition for re-encryption.

BACKGROUND ART

Proxy Re-Encryption (PRE) is a system that delegates the decryption authority of a ciphertext to others without decrypting the ciphertext. Non-Patent Literature 1 includes a description on an Identity-Based PRE (IBPRE) scheme. Non-Patent Literature 2 includes a description on an Attribute-Based PRE (ABPRE) scheme. In the PRE scheme described in Non-Patent Literature 2, only an attribute constituted of an AND operation and negation can be designated to a ciphertext.

Non-Patent Literature 3 includes a description on a conditional proxy re-encryption (CPRE) scheme that can designate a condition for re-encryption.

Patent Literature 1 includes a description on a functional encryption (FE) scheme. Non-Patent Literature 4 includes a description on the FPRE scheme.

CITATION LIST

Patent Literature

Patent Literature 1: JP 2012-133214 A

Non-Patent Literature

Non-Patent Literature 1: M. Green, and G. Ateniese, Identity-Based Proxy Re-encryption. In Applied Cryptography and Network Security. volume 4521 of LNCS, pp 288-306, 2007.
Non-Patent Literature 2: Xiaohui Liang, Zhenfu Cao, Huang Lin, Jun Shao. Attribute based proxy re-encryption with delegating capabilities. ASIACCS 2009 pp. 276-286.
Non-Patent Literature 3: J. Weng, Y. Yang Q. Tang, R. H. Deng, and F. Bao, "Efficient Conditional Proxy Re-Encryption with Chosen-Ciphertext Security" in ISC2009.
Non-Patent Literature 4: Yutaka Kawai and Katuyuki Takashima, Fully-Anonymous Functional Proxy-Re-Encryption. Cryptology ePrint Archive: Report 2013/318
Non-Patent Literature 5: Okamoto, T Takashima, K.: Decentralized Attribute-Based Signatures. ePrint http://eprint.iacr.org/2011/701
Non-Patent Literature 6: Okamoto, T Takashima, K.: Fully Secure Unbounded Inner-Product and Attribute-Based Encryption. ePrint http://eprint.iacr.org/2012/671
Non-Patent Literature 7: Okamoto, T., Takashima, K.: Achieving Short Ciphertexts or Short Secret-Keys for Adaptively Secure General Inner-Product Encryption. CANS 2011, LNCS, vol. 7092, pp. 138-159 Springer Heidelberg (2011).

SUMMARY OF INVENTION

Technical Problem

The CPRE scheme described in Non-Patent Literature 3 is not a functional encryption scheme, and accordingly has constraints on designation of a decryptor and designation of a condition for re-encryption, thus lacking flexibility.

According to the FPRE scheme described in Non-Patent Literature 4, a re-encryption key generated by a certain recipient can re-encrypt all ciphertexts that the recipient can decrypt. The recipient cannot designate a ciphertext to be re-encrypted.

It is an object of the present invention to flexibly designate a condition for a re-encryptable ciphertext when a re-encryption key is to be generated.

Solution to Problem

A cryptographic system according to the present invention is a cryptographic system that implements a proxy re-encryption function in a cryptographic scheme capable of decrypting a ciphertext with a decryption key, the ciphertext being set with one of two pieces of information related to each other, the decryption key being set with the other one of the two pieces of information, and that includes:

an encryption device to output a ciphertext ct including a ciphertext c and a ciphertext $c^\sim$, the ciphertext c being set with one of attribute information x and attribute information v related to each other, the ciphertext $c^\sim$ being set with one of attribute information y and attribute information z related to each other;

a re-encryption key generation device to acquire a decryption key $k^*$ which is set with the other one of the attribute information x and the attribute information v, and to output a re-encryption key rk including a decryption key $k^{*rk}$, a decryption key $k^{\sim *rk}$, and encrypted conversion information $\phi^{rk}$, the decryption key $k^{*rk}$ being obtained by converting the acquired decryption key $k^*$ with conversion information $W_1$, the decryption key $k^{\sim *rk}$ being set with the other one of the attribute information y and the attribute information z, the encrypted conversion information $\phi^{rk}$ being obtained by encrypting the conversion information $W_1$ by setting one of attribute information x' and attribute information v' related to each other; and a re-encryption device to output a re-ciphertext rct including a ciphertext $c^{renc}$ and a decryption key $k^{*renc}$, the ciphertext $c^{renc}$ being obtained by setting one of additional information H and additional information Θ related to each other to the ciphertext ct, the decryption key $k^{*renc}$ being obtained by setting the other one of the additional information H and the additional information Θ to the re-encryption key rk.

Advantageous Effects of Invention

In the cryptographic system according to the present invention, the encryption device can generate a ciphertext ct by setting not only a decryption condition (one of attribute information x and attribute information v) of the ciphertext ct but also information (one of attribute information y and attribute information z) for setting a condition that enables re-encryption of the ciphertext ct. Also, the re-encryption key generation device can generate a re-encryption key rk by setting not only a decryption condition (one of attribute information x' and attribute information v') of a re-ciphertext ret but also a condition that enables re-encryption (the other one of the attribute information y and the attribute information z). There is no constraint on the attribute information to be set. The decryption condition and the condition for re-encryption can be set flexibly.

BRIEF DESCRIPTION OF DRAWINGS

FIG. 3 is an explanatory drawing of $s_0$.
FIG. 4 is an explanatory drawing of $s^{\rightarrow T}$.

DESCRIPTION OF EMBODIMENTS

Figure 1:
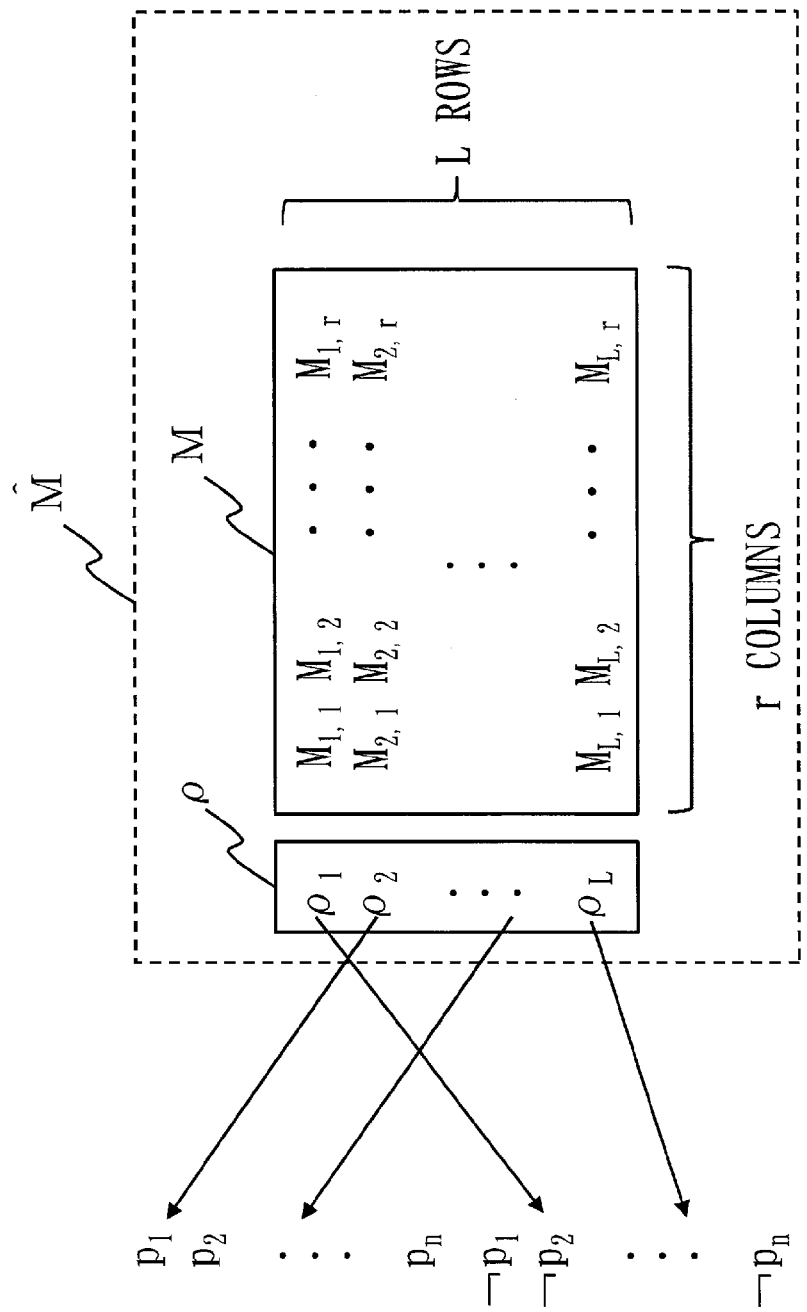
FIG. 1 is an explanatory drawing of a matrix $M^\wedge$.

Embodiments of the present invention will be described hereinafter with reference to the accompanying drawings.

In the following description, a processing device is a CPU 911 (to be described later) and the like. A storage device is a ROM 913, a RAM 914, a magnetic disk 920 (each will be described later), and the like. A communication device is a communication board 915 (to be described later) and the like. An input device is a keyboard 902 (to be described later), the communication board 915, and the like. Namely, the processing device, the storage device, the communication device, and the input device are hardware.

The notation in the following description will be explained.

When A is a random variable or distribution, Formula 101 denotes that y is randomly selected from A according to the distribution of A. Namely, in Formula 101, y is a random number.

$$y \xleftarrow{R} A \qquad \text{[Formula 101]}$$

When A is a set, Formula 102 denotes that y is uniformly selected from A. Namely, in Formula 102, y is a uniform random number.

$$y \xleftarrow{U} A \qquad \text{[Formula 102]}$$

Formula 103 denotes that y is a set, defined or substituted by z.

$$y := z \qquad \text{[Formula 103]}$$

When a is a fixed value, Formula 104 denotes an event that a machine (algorithm) A outputs a on input x.

$$A(x) \rightarrow a$$

For example, $$A(x) \rightarrow 1 \qquad \text{[Formula 104]}$$

Formula 105, namely, $\mathbb{F}_q$, denotes a finite field of order q.

$$\mathbb{F}_q \qquad \text{[Formula 105]}$$

A vector symbol denotes a vector representation over the finite field $\mathbb{F}_q$.

Namely, Formula 106 is established.

$\vec{x}$ denotes $$(x_1, \ldots, x_n) \in \mathbb{F}_q^n \qquad \text{[Formula 106]}$$

Formula 107 denotes the inner-product, indicated by Formula 109, of two vectors $\vec{x}$ and $\vec{v}$ indicated in Formula 108.

$$\vec{x} \cdot \vec{v} \qquad \text{[Formula 107]}$$

$$\vec{x} = (x_1, \ldots, x_n)$$

$$\vec{v} = (v_1, \ldots, v_n) = \qquad \text{[Formula 108]}$$

$$\Sigma_{i=1}^n x_i v_i \qquad \text{[Formula 109]}$$

Note that $X^T$ denotes the transpose of matrix X.

Note that for bases $\mathbb{B}$ and $\mathbb{B}^*$ indicated in Formula 110, Formula 111 is established.

$$\mathbb{B} := (b_1, \ldots, b_N),$$

$$\mathbb{B}^* := (b_1^*, \ldots, b_N^*) \quad \text{[Formula 110]}$$

$$(x_1, \ldots, x_N)\mathbb{B} := \sum_{i=1}^{N} x_i b_i,$$

$$(y_1, \ldots, y_N)\mathbb{B}^* := \sum_{i=1}^{N} y_i b_i^* \quad \text{[Formula 111]}$$

Note that $\vec{e}_j$ denotes an orthonormal basis vector indicated in Formula 112.

$$\vec{e}_j := (\overbrace{0 \ldots 0}^{j-1}, 1, \overbrace{0 \ldots 0}^{n-j}) \in \mathbb{F}_q^n \text{ for } j = 1, \ldots, n \quad \text{[Formula 112]}$$

In the following description, when Vt, nt, wt, zt, nu, wu, or zu is indicated as a subscript or superscript, Vt, nt, wt, zt, nu, wu, or zu is $V_t$, $n_t$, $w_t$, $z_t$, $n_u$, $w_u$, or $z_u$. Likewise, when δi,j is indicated as a superscript, δi,j is $\delta_{i,j}$.

When → indicating a vector is attached to a subscript or superscript, → is attached as a superscript to the subscript or superscript. When ~ is attached to a subscript or superscript, ~ is attached as a superscript to the subscript or superscript.

Embodiment 1

This embodiment describes a basic concept as a basis for implementing the FCPRE scheme, and then describes the structure of the FCPRE scheme according to this embodiment.

First, FCPRE will be briefly described.

Second, a space having a rich mathematical structure called dual pairing vector spaces (DPVS) which is a space for implementing the FCPRE scheme will be described.

Third, a concept for implementing the FCPRE scheme will be described. Here, the span program, the inner product of attribute vectors, and an access structure, and secret distribution scheme (secret sharing scheme) will be described.

Fourth, the FCPRE scheme according to this embodiment will be described. In this embodiment, ciphertext-policy FCPRE (CP-FCPRE) scheme will be described. Initially, the basic structure of the CP-FCPRE scheme will be described. Subsequently, the basic structures of a cryptographic system 10 that implements the CP-FCPR scheme will be described thereafter, and components that are employed to implement the CP-FCPRE scheme will be described. Then, the CP-FCPRE scheme and the cryptographic system 10 according to this embodiment will be described in detail.

<1. FCPRE>

FPRE will initially be described. FPRE is a proxy re-encryption scheme in which the relation among an encryption key (ek), a decryption key (dk), and a re-encryption key (rk) is more sophisticated and flexible.

FPRE has the following two features.

First, attribute information x and attribute information v are respectively set in the encryption key and the decryption key. If and only if R(x,v) is established for a relation R, a decryption key dk can decrypt a ciphertext encrypted by an encryption key $ek_x$.

Second, in addition to the fact that the attribute information x and the attribute information v are respectively set in the encryption key and the decryption key, two pieces of attribute information (x',v) are set in the re-encryption key. If and only if R(x,v) is established, a re-encryption key $rk_{(x',v)}$ can change the ciphertext encrypted by the encryption key $ek_x$ to a ciphertext that can be decrypted by a decryption key $d_{k_{v'}}$ for which R(x',v') is established, namely, to a ciphertext that is encrypted by an encryption key $ek_{x'}$.

If R(x,v) is established if and only if the relation R is an equality relation, that is, if x=v, the PRE scheme is IDPRE.

ABPRE is a more generalized form of PRE than IDPRE. In ABPRE, attribute information that is set in an encryption key and attribute information that is set in a decryption key form a tuple of attribute information. For example, attribute information that is set in the encryption key is $X := (x_1, \ldots, x_d)$, and attribute information that is set in the decryption key is $V := (v_1, \ldots, v_d)$.

Concerning the components of the attribute information, the equality relation (for example, $\{x_t = v_t\} t \in \{1, \ldots, d\}$) of each component is inputted to an access structure S. If and only if the access structure S accepts the input, R(V,V) is established. That is, the ciphertext encrypted by the encryption key can be decrypted by the decryption key. Non-Patent Literature 2 proposes a ciphertext-policy PRE scheme in which the access structure S is embedded in the ciphertext. An access structure for this case has a structure constituted of only a logical product and negation.

FCPRE will now be described. FCPRE is an FPRE in which a condition for re-encryption can be designated.

In FCPRE, attribute information x and attribute information v are respectively set in the encryption key and the decryption key, and two pieces of attribute information (x',v) are set in a re-encryption key. In addition, attribute information z and attribute information y are respectively set in the ciphertext and the re-encryption key. If and only if R(x,v) and R(z,y) are established for a relation R, the ciphertext encrypted by the encryption key $ek_x$ can be changed to a ciphertext that can be decrypted by the decryption key $dk_{v'}$ for which R(x',v') is established, namely, to a ciphertext that is encrypted by the encryption key $ek_{x'}$.

There is ordinary FE in which a ciphertext transfer function does not exist, that is, a re-encryption key does not exist. In FE, a re-encryption key generation process and re-encryption process do not exist, and attribute information x and attribute information v are respectively set in the encryption key and the decryption key. If and only if R(x,v) is established for a relation R, the decryption key $dk_v := (dk, v)$ can decrypt a ciphertext encrypted by the encryption key $ek_x := (ek, x)$.

<2. Dual Pairing Vector Spaces>

First, symmetric bilinear pairing groups will be described.

The symmetric bilinear pairing groups $(q, G, G^T, g, e)$ are a tuple of a prime q, a cyclic additive group G of order q, a cyclic multiplicative group $G^T$ of order q, $g \neq 0 \in G$, and a polynomial-time computable nondegenerate bilinear pairing $e: G \times G \to G_T$. The nondegenerate bilinear pairing signifies $e(sg, tg) = e(g,g)^{st}$ where $e(g,g) \neq 1$.

In the following description, let $G_{bpg}$ be an algorithm that takes as input $1^\lambda$ and outputs the value of a parameter $param_G := (q, G, G_T, g, e)$ of bilinear pairing groups with a security parameter λ.

Dual pairing vector spaces will now be described.

Dual pairing vector spaces $(q, V, G_T, A, e)$ can be constituted by a direct product of symmetric bilinear pairing groups $(param_G := (q, G, G_T, g, e))$. The dual pairing vector spaces $(q, V, G_T, A, e)$ are a tuple of a prime q, an N-dimensional vector space V over $\mathbb{F}_q$ indicated in Formula 113, a cyclic group $G_T$ of the order q, and a canonical basis $A := (a_1, \ldots, a_N)$ of a space V, and have the following operations (1) and (2) where $a_i$ is as indicated by Formula 114.

$$\mathbb{V} := \overbrace{\mathbb{G} \times \ldots \times \mathbb{G}}^{N}$$ [Formula 113]

$$a_i := (\overbrace{0, \ldots, 0}^{i-1}, g, \overbrace{0, \ldots}^{N-i},)$$ [Formula 114]

Operation (1): Nondegenerate Bilinear Pairing
The pairing on the space V is defined by Formula 115.

$$e(x,y) := \Pi_{i=1}^{N} e(G_i, H_i) \in \mathbb{G}_T$$

where $(G_1, \ldots, G_N) := x \in \mathbb{V}$, $(H_1, \ldots, H_N) := x \in \mathbb{V}$ [Formula 115]

This is nondegenerate bilinear, i.e., $e(sx,ty)=e(x,y)^{st}$ and if $e(x,y)=1$ for all $y \in V$, then $x=0$. For all i and j, $e(a_i,a_j)=e(g,g)^{\delta_{i,j}}$ where $\delta_{i,j}=1$ if i=j, and $\delta_{i,j}=0$ if i≠j. Also, $e(g,g) \neq 1 \in G_T$.

Operation (2): Distortion Maps
Linear transformation $\phi_{i,j}$ on the space V indicated in Formula 116 can achieve Formula 117.

$\phi_{i,j}(a_j) = a_i$ [Formula 116]
if $k \neq j$ then $\phi_{i,j}(a_k) = 0$ $$\phi_{i,j}(x) := (\overbrace{0, \ldots, 0}^{i-1}, g_j, \overbrace{0, \ldots, 0}^{N-i})$$ [Formula 117]

Note that
$(g_1, g_N) := x$

Linear transformation $\phi_{i,j}$ will be called distortion maps.

In the following description, let $G_{dpvs}$ be an algorithm that takes as input, $1^\lambda$ ($\lambda \in$ natural number), N∈natural number, and the values of a parameter $param_G := (q, G, G_T, g, e)$ of bilinear pairing groups, and outputs the value of a parameter $param_v := (q, V, G_T, A, e)$ of dual pairing vector spaces which have a security parameter $\lambda$ and which form an N-dimensional space V.

A case will be described where dual pairing vector spaces are constructed from the symmetric bilinear pairing groups described above. Dual pairing vector spaces can be constructed from asymmetric bilinear pairing groups as well. The following description can be easily applied to a case where dual pairing vector spaces are constructed from asymmetric bilinear pairing groups.

<3. Concept for Implementing FCPRE Scheme>
<3-1. Span Program>
FIG. 1 is an explanatory drawing of a matrix M^.

Let $\{p_1, \ldots, P_n\}$ be a set of variables. $M^\wedge := (M,\rho)$ is a labeled matrix where a matrix M is an (L rows×r columns) matrix over $F_q$, and $\rho$ is a label of each row of the matrix M and is related to one of literals $\{p_1, \ldots, p_n, \neg p_1, \ldots, \neg p_n\}$. A label $\rho_i$ (i=1, ..., L) of every row of M is related to one of the literals, namely, $\rho: \{1, \ldots, L\} \to \{p_1, \ldots, p_n, \neg p_1, \ldots, \neg p_n\}$.

For every input sequence $\delta\delta\{0,1\}^n$, a submatrix $M_\delta$ of the matrix M is defined. The matrix $M_\delta$ is a submatrix consisting of those rows of the matrix M, whose labels p are related to value "1" by the input sequence $\delta$. Namely, the matrix $M_\delta$ is a submatrix consisting of the rows of the matrix M which are related to $p_i$ with which $\delta_i=1$ and the rows of the matrix M which are related to $\neg p_i$ with which $\delta_i=0$.

Figure 2:
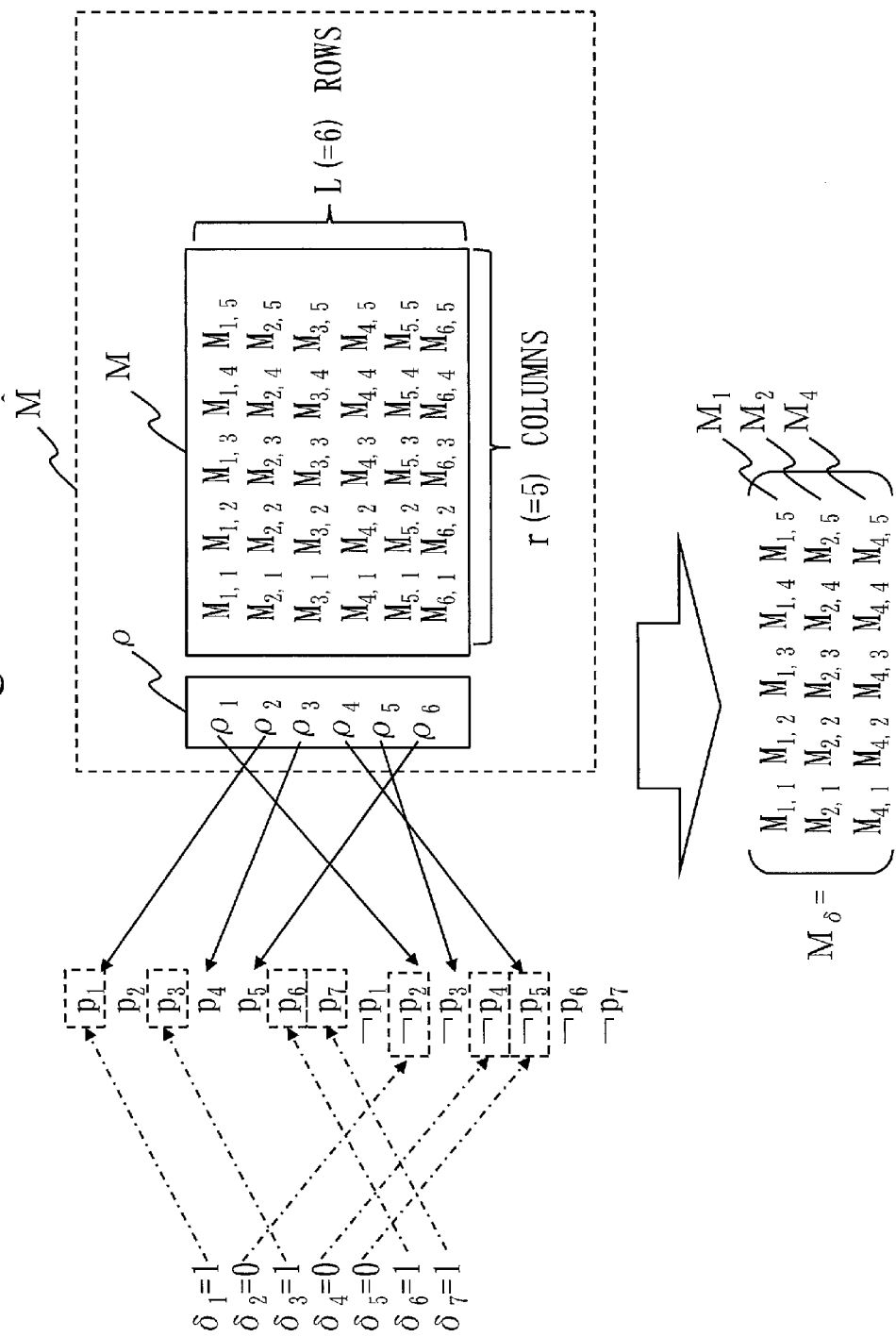
FIG. 2 is an explanatory drawing of a matrix $M_\delta$.

FIG. 2 is an explanatory drawing of the matrix $M_\delta$. Note that in FIG. 2, n=7, L=6, and r=5. That is, the set of variables is $\{p_1, \ldots, p_7\}$, and the matrix M is a (6 rows×5 columns)

matrix. In FIG. 2, assume that the labels p are related such that $\rho_1$ corresponds to $\neg p_2$, $\rho_2$ to $p_1$, $\rho_3$ to $p_4$, $\rho_4$ to $\neg p_5$, $\rho_5$ to $\neg p_3$, and $\rho_6$ to $\neg p_5$.

Assume that in an input sequence $\delta \in \{0,1\}^7$, $\delta_1=1$, $\delta_2=0$, $\delta_3=1$, $\delta_4=0$, $\delta_5=0$, $\delta_6=1$, and $\delta_7=1$. In this case, a submatrix consisting of the rows of the matrix M which are related to literals ($p_1$, $p_3$, $p_6$, $p_7$, $\neg p_2$, $\neg p_4$, $\neg p_5$) surrounded by broken lines is the matrix $M_\delta$. That is, the submatrix consisting of the 1st row ($M_1$), 2nd row ($M_2$), and 4th row ($M_4$) of the matrix M is the matrix $M_\delta$.

In other words, when map $\gamma: \{1, \ldots, L\} \to \{0, 1\}$ is $[\rho(j)=p_i] \wedge [\delta_i=1]$ or $[\rho(j)=\neg p_i] \wedge [\delta_i=0]$, then $\gamma(j)=1$; otherwise $\gamma(j)=0$. In this case, $M_\delta := (M_j)_{\gamma(j)=1}$. Note that $M_j$ is the j-th row of the matrix M.

That is, in FIG. 2, map $\gamma(j)=1$ (j=1, 2, 4), and map $\gamma(j)=0$ (j=3, 5, 6). Hence, $(M_j)_{\gamma(j)=1}$ is $M_1$, $M_2$, and $M_4$, and the matrix M.

More specifically, whether or not the j-th row of the matrix M is included in the matrix $M_\delta$ is determined by whether the value of the map $\gamma(j)$ is "0" or "1".

The span program M^ accepts an input sequence $\delta$ if and only if $\vec{1} \in span<M_\delta>$, and rejects the input sequence $\delta$ otherwise. Namely, the span program M^ accepts the input sequence $\delta$ if and only if linear combination of the rows of the matrix $M_\delta$ which are obtained from the matrix M^ by the input sequence $\delta$ gives $\vec{1}$. $\vec{1}$ is a row vector which has value "1" in each element.

For example, in FIG. 2, the span program M^ accepts the input sequence $\delta$ if and only if linear combination of the respective rows of the matrix $M_\delta$ consisting of the 1st, 2nd, and 4th rows of the matrix M gives $\vec{1}$. That is, if there exist $\alpha_1$, $\alpha_2$, and $\alpha_4$ with which $\alpha_1(M_1)+\alpha_2(M_2)+\alpha_4(M_4)=\vec{1}$, the span program M^ accepts the input sequence $\delta$.

The span program is called monotone if its labels p are related to only positive literals $\{p_1, \ldots, p_n\}$. The span program is called non-monotone if its labels p are related to the literals $\{p_1, \ldots, p_n, \neg p_1, \ldots, \neg p_n\}$. Suppose that the span program is non-monotone. An access structure (non-monotone access structure) is constituted using the non-monotone span program. Briefly, an access structure controls access to encryption, namely, it controls whether a ciphertext is to be decrypted or not.

Because the span program is not monotone but non-monotone, as will be described later in detail, the application of the FCPRE scheme constituted using the span program widens.

<3-2. Inner-Product of Attribute Information and Access Structure>

Map $\gamma(j)$ described above will be calculated using the inner-product of attribute information. Namely, which row of the matrix M is to be included in the matrix $M_\delta$ will be determined using the inner-product of the attribute information.

$U_t$ (t=1, ..., d and $U_t \subset \{0,1\}^*$) is a sub-universe and an attribute set. Each $U_t$ includes identification information (t) of the sub-universe and n-dimensional vector ($\vec{v}$). Namely, $U_t$ is (t,$\vec{v}$) where t∈{1, ..., d} and $\vec{v} \in F_q^n$.

Let $U_t := (t,\vec{v})$ be a variable p of the span program M^ := (M,$\rho$), that is, p:=(t,$\vec{v}$). Let the span program M^ := (M,$\rho$) having the variable (p:=(t,$\vec{v}$), (t,$\vec{v}'$), ...) be an access structure S.

That is, the access structure S:=(M,$\rho$), and $\rho:=\{1, \ldots, L\} \to \{(t,\vec{v}), (t,\vec{v}'), \ldots, \neg(t,\vec{v}), \neg(t,\vec{v}'), \ldots\}$.

Let $\Gamma$ be an attribute set, that is, $\Gamma:=\{(t,\vec{x}_t)|\vec{x}_t \in F_q^n, 1 \leq t \leq d\}$.

When $\Gamma$ is given to the access structure S, map $\gamma: \{1, \ldots, L\} \to \{0, 1\}$ for the span program M^ := (M,$\rho$) is defined as follows. For each integer i of i=1, . . . , L, set γ(j)=1 if [ρ(i)=(t,$\vec{v}_i$)]∧[(t,$\vec{x}_t$)∈Γ]∧[$\vec{v}_i$·$\vec{x}_t$=0] or [ρ(i)=¬(t,$\vec{v}_i$)]∧[(t,$\vec{x}_t$)∈Γ]∧[$\vec{v}_i$·$\vec{x}_t$≠0]. Set γ(j)=0 otherwise.

Namely, the map γ is calculated based on the inner-product of the attribute information $\vec{v}$ and $\vec{x}$. As described above, which row of the matrix M is to be included in the matrix $M_δ$ is determined by the map γ. More specifically, which row of the matrix M is to be included in the matrix $M_δ$ is determined by the inner-product of the attribute information $\vec{v}$ and $\vec{x}$. The access structure S:=(M,ρ) accepts Γ if and only if $\vec{1} \in span<(M_i)_{γ(i)=1}>$.

<3-3. Secret Distribution Scheme>

A secret distribution scheme for the access structure S:=(M,ρ) will be described.

The secret distribution scheme is distributing secret information to render it nonsense distributed information. For example, secret information s is let to be distributed among 10 lumps to generate 10 pieces of distributed information. Each of the 10 pieces of distributed information does not have information on the secret information s. Hence, even when certain one piece of distributed information is obtained, no information can be obtained on the secret information s. On the other hand, if all of the 10 pieces of distributed information are obtained, the secret information s can be recovered.

Another secret distribution scheme is also available according to which even when all of the 10 pieces of distributed information cannot be obtained, if one or more, but not all, (for example, 8 pieces) of distributed information can be obtained, then the secret information s can be recovered. A case like this where the secret information s can be recovered using 8 pieces out of 10 pieces of distributed information will be called 8-out-of-10. That is, a case where the secret information s can be recovered using t pieces out of n pieces of distributed information will be called t-out-of-n. This t will be called a threshold.

Still another secret distribution scheme is available according to which when 10 pieces of distributed information $d_1$, . . . , $d_{10}$ are generated, the secret information s can be recovered if 8 pieces of distributed information $d_1$, . . . , $d_8$ are given, but cannot if 8 pieces of distributed information $d_3$, . . . , $d_{10}$ are given. Namely, this is a secret distribution scheme with which whether or not the secret information s can be recovered is controlled not only by the number of pieces of distributed information obtained but also depending on the combination of the distributed information.

FIG. 3 is an explanatory drawing of $s_0$. FIG. 4 is an explanatory drawing of $\vec{s}^T$.

Let a matrix M be an (L rows×r columns) matrix. Let $\vec{f}^T$ be a column vector indicated in Formula 118.

$$\vec{f}^T := (f_1, \ldots f_r)^T \xleftarrow{U} \mathbb{F}_q^r \qquad \text{[Formula 118]}$$

Let $s_0$ indicated in Formula 119 be secret information to be shared.

$$s_0 := \vec{1} \cdot \vec{f}^T := \sum_{k=1}^r f_k \qquad \text{[Formula 119]}$$

Let $\vec{s}^T$ indicated in Formula 120 be a vector of L pieces of distributed information of $s_0$.

$$\vec{s}^T := (s_1, \ldots s_L)^T := M \cdot \vec{f}^T \qquad \text{[Formula 120]}$$

Let distributed information $s_i$ belong to ρ(i).

If the access structure S:=(M,ρ) accepts Γ, that is, $\vec{1} \in span<(M_i)_{γ(i)=1}>$ for γ: {1, . . . , L}→{0.1}, then there exist constants $\{α_i \in \mathbb{F}_q | i \in I\}$ such that $I \subseteq \{i \in \{1, \ldots, L\} | γ(i)=1\}$.

This is obvious from the explanation on FIG. 2 in that if there exist $α_1$, $α_2$, and $α_4$ with which $α_1(M_1)+α_2(M_2)+α_4(M_4)=\vec{1}$, the span program M^ accepts the input sequence δ. Namely, if the span program M^ accepts the input sequence δ when there exist $α_1$, $α_2$, and $α_4$ with which $α_1(M_1)+α_2(M_2)+α_4(M_4)=\vec{1}$, then there exist $α_1$, $α_2$, and $α_4$ with which $α_1(M_1)+α_2(M_2)+α_4(M_4)=\vec{1}$.

Note Formula 121.

$$\sum_{i \in I} α_i s_i = s_0 \qquad \text{[Formula 121]}$$

Note that the constants $\{α_i\}$ can be computed in time polynomial in the size of the matrix M.

With the FCPRE scheme according to the following embodiment, an access structure is constructed by applying the inner-product predicate and the secret distribution scheme to the span program, as described above. Therefore, access control can be designed flexibly by designing the matrix M in the span program and the attribute information x and the attribute information v (predicate information) in the inner-product predicate. Namely, access control can be designed very flexibly. Designing of the matrix M corresponds to designing conditions such as the threshold of the secret distribution scheme.

For example, the attribute-based encryption scheme described above corresponds to a case, in the access structure in the FCPRE scheme according to the following embodiment, where designing of the inner-product predicate is limited to a certain condition. That is, when compared to the access structure in the FCPRE scheme according to the following embodiment, the access structure in the attribute-based encryption scheme has a lower flexibility in access control design because it lacks the flexibility in designing the attribute information x and the attribute information v (predicate information) in the inner-product predicate. More specifically, the attribute-based encryption scheme corresponds to a case where attribute information $\{\vec{x}_t\}_{t \in \{1, \ldots, d\}}$ and $\{\vec{v}_t\}_{t \in \{1, \ldots, d\}}$ are limited to two-dimensional vectors for the equality relation, for example, $\vec{x}_t := (1, x_t)$ and $\vec{v}_t := (v_t, -1)$.

Also, PRE in the inner-product predicate encryption scheme corresponds to a case, in the access structure in the FCPRE scheme according to the following embodiment, where designing of the matrix M in the span program is limited to a certain condition. That is, when compared to the access structure in the FCPRE scheme according to the following embodiments, the access structure in the inner-product predicate encryption scheme has a lower flexibility in access control design because it lacks the flexibility in designing the matrix M in the span program. More specifically, the inner-product predicate encryption scheme is a case where the secret distribution scheme is limited to 1-out-of-1 (or d-out-of-d).

In particular, the access structure in the FCPRE scheme according to the following embodiment constitutes a non-monotone access structure that uses a non-monotone span program Thus, the flexibility in access control design improves.

More specifically, since the non-monotone span program includes a negative literal (¬p), a negative condition can be set. For example, assume that First Company includes four departments of A, B, C, and D. Assume that access control is to be performed that only the users belonging to departments other than B department of First Company are capable of access (capable of decryption). In this case, if a negative condition cannot be set, a condition that "the user belongs to any one of A, C, and D departments of First Company" must be set. On the other hand, if a negative condition can be set, a condition that "the user is an employee of First Company and belongs to a department other than department B" can be set. Namely, since a negative condition can be set, natural condition setting is possible. Although the number of departments is small in this case, this scheme is very effective in a case where the number of departments is large.

<4. Basic Structure of FCPRE Scheme>

<4-1. Basic Structure of CP-FCPRE Scheme>

The basic structure of the CP-FCPRE scheme will be briefly described. CP (ciphertext policy) signifies that Policy is embedded in the ciphertext, namely, an access structure is embedded in the ciphertext.

The CP-FCPRE scheme consists of seven algorithms: Setup, KG, Enc, RKG, REnc, Dec1, and Dec2.

(Setup)

The Setup algorithm is a randomized algorithm that takes as input a security parameter $\lambda$ and attribute format $\vec{n} := (d; n_1, \ldots, n_d; w_1, \ldots, w_d; z_1, \ldots, z_d)$, and outputs public parameters pk and a master key sk.

(KG)

The KG algorithm is a randomized algorithm that takes as input an attribute set $\Gamma := \{(t, \vec{x}_t) | \vec{x}_t \in \mathbb{F}_q^{nt}, 1 \leq t \leq d\}$, the public parameters pk, and the master key sk, and outputs a decryption key $sk_\Gamma$.

(Enc)

The Enc algorithm is a randomized algorithm that takes as input a message m, access structures $S=(M,\rho)$ and $S\tilde{} =(M\tilde{}, \rho\tilde{})$, and the public parameters pk, and outputs a ciphertext $ct_S$.

(RKG)

The RKG algorithm is a randomized algorithm that takes as input the decryption key $sk_\Gamma$, an access structure $S':=(M', \rho')$, an attribute set $\Gamma\tilde{}$, and the public parameters pk, and outputs a re-encryption key $rk_{\Gamma,S'}$.

(REnc)

The REnc algorithm is a randomized algorithm that takes as input the ciphertext $ct_S$, the re-encryption key $rk_{\Gamma,S'}$, and the public parameters pk, and outputs a re-ciphertext $rct_{S'}$.

(Dec1)

The Dec1 algorithm is an algorithm that takes as input the re-ciphertext $rct_{S'}$, a decryption key $sk_{\Gamma'}$, and the public parameters pk, and outputs the message m or distinguished symbol $\perp$.

(Dec2)

The Dec2 algorithm is an algorithm that takes as input the ciphertext $ct_S$, the decryption key $sk_\Gamma$, and the public parameters pk, and outputs the message m or distinguished symbol $\perp$.

<4-2. Cryptographic System 10>

The cryptographic system 10 that implements the algorithm of the CP-FCPRE scheme will be described.

Figure 5:
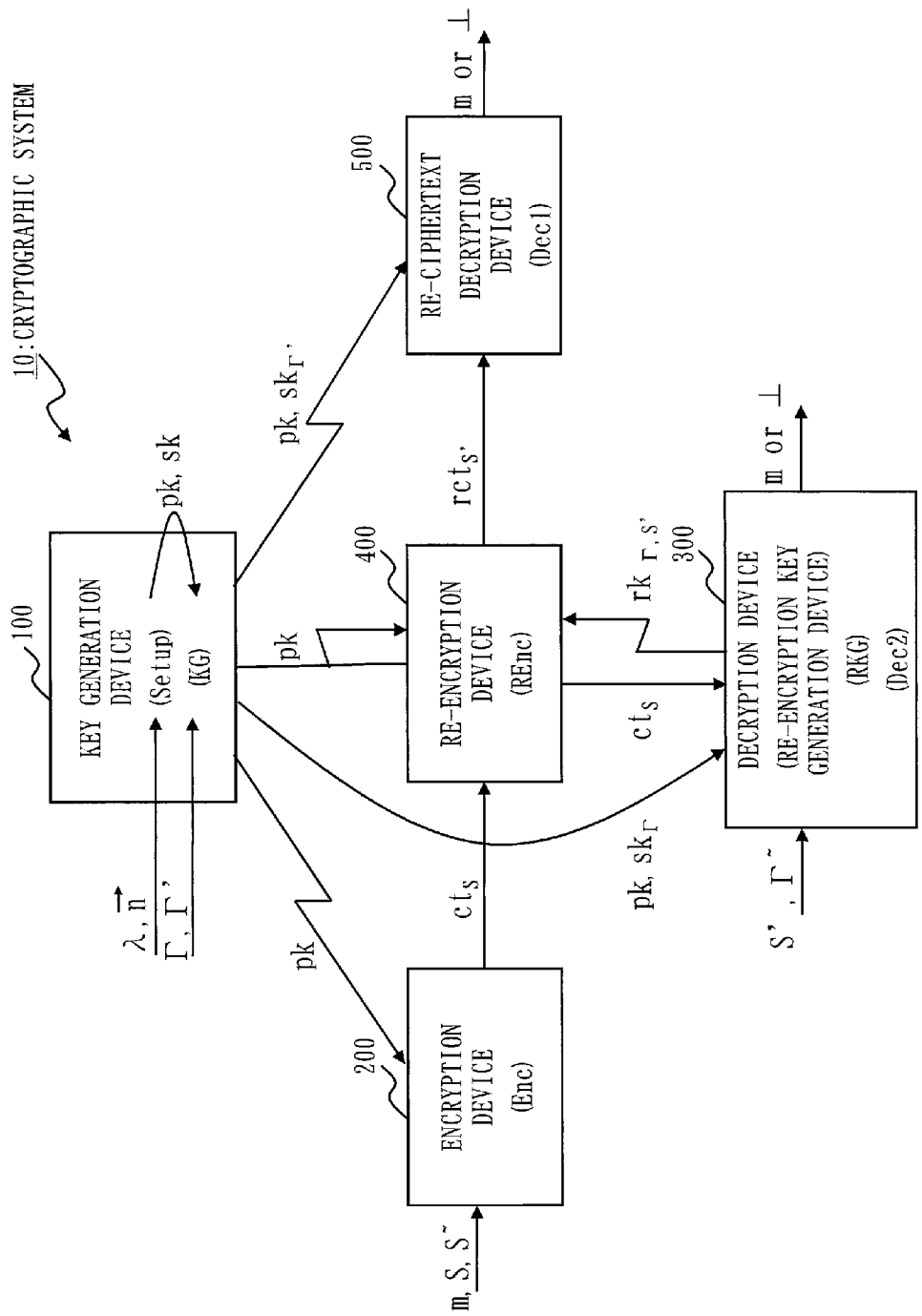
FIG. 5 is a configuration diagram of a cryptographic processing system 10 that executes CP-FCPRE scheme.

FIG. 5 is a configuration diagram of the cryptographic system 10 that executes the CP-FCPRE scheme.

The cryptographic system 10 is provided with a key generation device 100, an encryption device 200, a decryption device 300 (re-encryption key generation device), a re-encryption device 400, and a re-ciphertext decryption device 500.

The key generation device 100 executes the Setup algorithm by taking as input the security parameter $\lambda$ and the attribute format $\vec{n} := (d; n_1, \ldots, n_d; w_1, \ldots, w_d; z_1, \ldots, z_d)$, and generates the public parameters pk and the master key sk.

Then, the key generation device 100 publicizes the public parameters pk. The key generation device 100 also executes the KG algorithm by taking as input the attribute set $\Gamma$, to generate the decryption key $sk_\Gamma$, and transmits the decryption key $sk_\Gamma$ to the decryption device 300 in secrecy. The key generation device 100 also executes the KG algorithm by taking as input an attribute set $\Gamma'$, to generate the decryption key $sk_{\Gamma'}$, and transmits the decryption key $sk_{\Gamma'}$ to the re-ciphertext decryption device 500 in secrecy.

The encryption device 200 executes the Enc algorithm by taking as input the message m, the access structures S and $S\tilde{}$, and the public parameters pk, to generate the ciphertext $ct_S$. The encryption device 200 transmits the ciphertext $ct_S$ to the re-encryption device 400.

The decryption device 300 executes the RKG algorithm by taking as input the decryption key $sk_\Gamma$, the access structure S', the attribute set $\Gamma\tilde{}$, and the public parameters pk, to generate the re-encryption key $rk_{\Gamma,S'}$. The decryption device 300 transmits the re-encryption key $rk_{\Gamma,S'}$ to the re-encryption device 400 in secrecy.

The decryption device 300 also executes the Dec2 algorithm by taking as input the public parameters pk, the decryption key $sk_\Gamma$, and the ciphertext $ct_S$, and outputs the message m or distinguished symbol $\perp$.

The re-encryption device 400 executes the REnc algorithm by taking as input the re-encryption key $rk_{\Gamma,S'}$, the ciphertext $ct_S$, and the public parameters pk, to generate the re-ciphertext $rct_{S'}$. The re-encryption device 400 transmits the re-ciphertext $rct_{S'}$ to the re-ciphertext decryption device 500.

The re-ciphertext decryption device 500 executes the Dec1 algorithm by taking as input the decryption key $sk_{\Gamma'}$, the re-ciphertext $rct_{S'}$, and the public parameters pk, and outputs the message m or distinguished symbol $\perp$.

<4-3. Components Employed to Implement CP-FCPRE Scheme>

The ciphertext-policy functional encryption (CP-FE) and one-time signature are employed to implement the CP-FCPRE scheme. CP-FE and the one-time signature are both known technique, and a scheme employed in the following description will be briefly explained. Patent Literature 1 describes an example of the CP-FE scheme.

The CP-FE scheme consists of four algorithms: $Setup_{CP-FE}$, $KG_{CP-FE}$, $Enc_{CP-FE}$, and $Dec_{CP-FE}$.

($Setup_{CP-FE}$)

The $Setup_{CP-FE}$ algorithm is a randomized algorithm that takes as input a security parameter $\lambda$ and attribute format if $\vec{n} := (d; n_1, \ldots, n_d)$, and outputs public parameters $pk^{CP-FE}$ and a master key $sk^{CP-FE}$.

($KG_{CP-FE}$)

The $KG_{CP-FE}$ algorithm is a randomized algorithm that takes as input an attribute set $\Gamma := \{(t, \vec{x}_t) | \vec{x}_t \in \mathbb{F}_q^{nt}, 1 \leq t \leq d\}$, the public parameters $pk^{CP-FE}$, and the master key $sk^{CP-FE}$, and outputs a decryption key $sk_\Gamma^{CP-FE}$.

($Enc_{CP-FE}$)

The $Enc_{CP-FE}$ algorithm is a randomized algorithm that takes as input the message m, the access structure $S=(M,\rho)$, and the public parameters $pk^{CP-FE}$, and outputs a ciphertext $\phi$.

($Dec_{CP-FE}$)

The $Dec_{CP-FE}$ algorithm is an algorithm that takes as input the ciphertext $\phi$, the decryption key $sk_\Gamma^{CP-FE}$, and the public parameters $pk^{CP-FE}$, and outputs the message m or distinguished symbol $\perp$.

One-time signature scheme consists of three algorithms: SigKG, Sig, and Ver.

(SigKG)

The SigKG algorithm is a randomized algorithm that takes as input a security parameter λ and outputs a signature key sigk and a verification key verk.

(Sig)

The Sig algorithm is a randomized algorithm that takes as input the signature key sigk and a message m, and outputs a signature S.

(Ver)

The Ver algorithm is an algorithm that takes as input the verification key verk, the message m, and the signature S, and outputs 1 if the signature S is authentic with respect to the verification key verk and the message m, and 0 otherwise.

<4-4. CP-FCPRE Scheme and Cryptographic Processing System 10 in Detail>

The CP-FCPRE scheme, and the function and operation of the cryptographic processing system 10 which executes the CP-FCPRE scheme will be described with reference to FIGS. 6 to 17.

Figure 6:
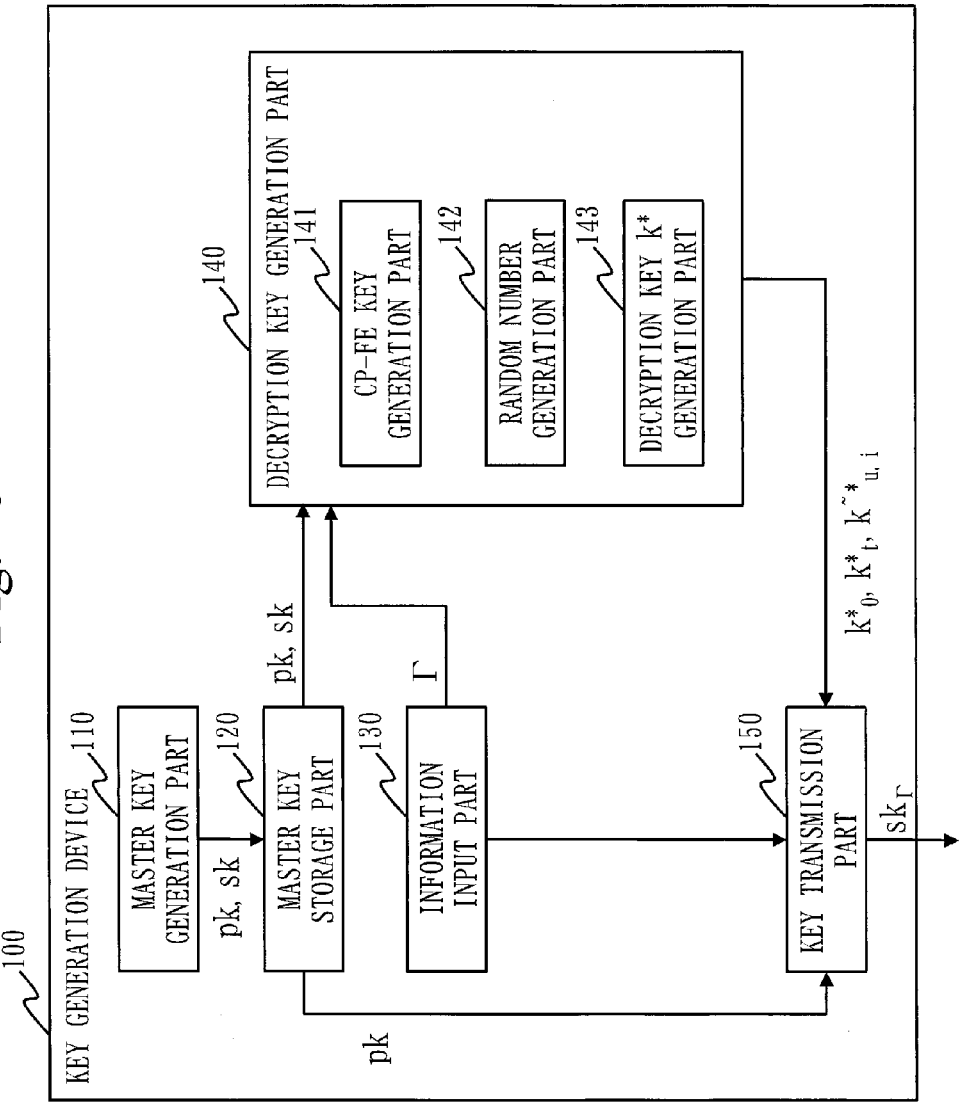
FIG. 6 is a functional block diagram illustrating a function of a key generation device 100.
Figure 7:
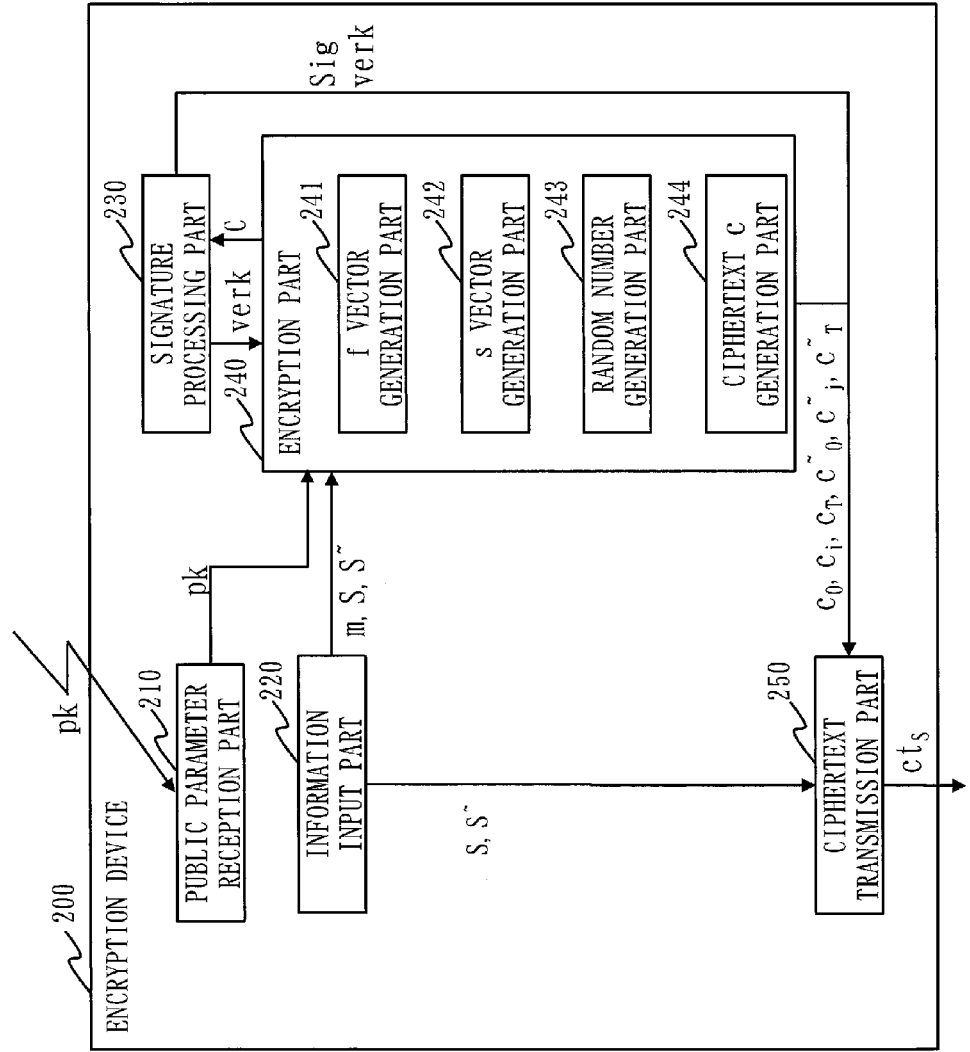
FIG. 7 is a functional block diagram illustrating a function of an encryption device 200.
Figure 8:
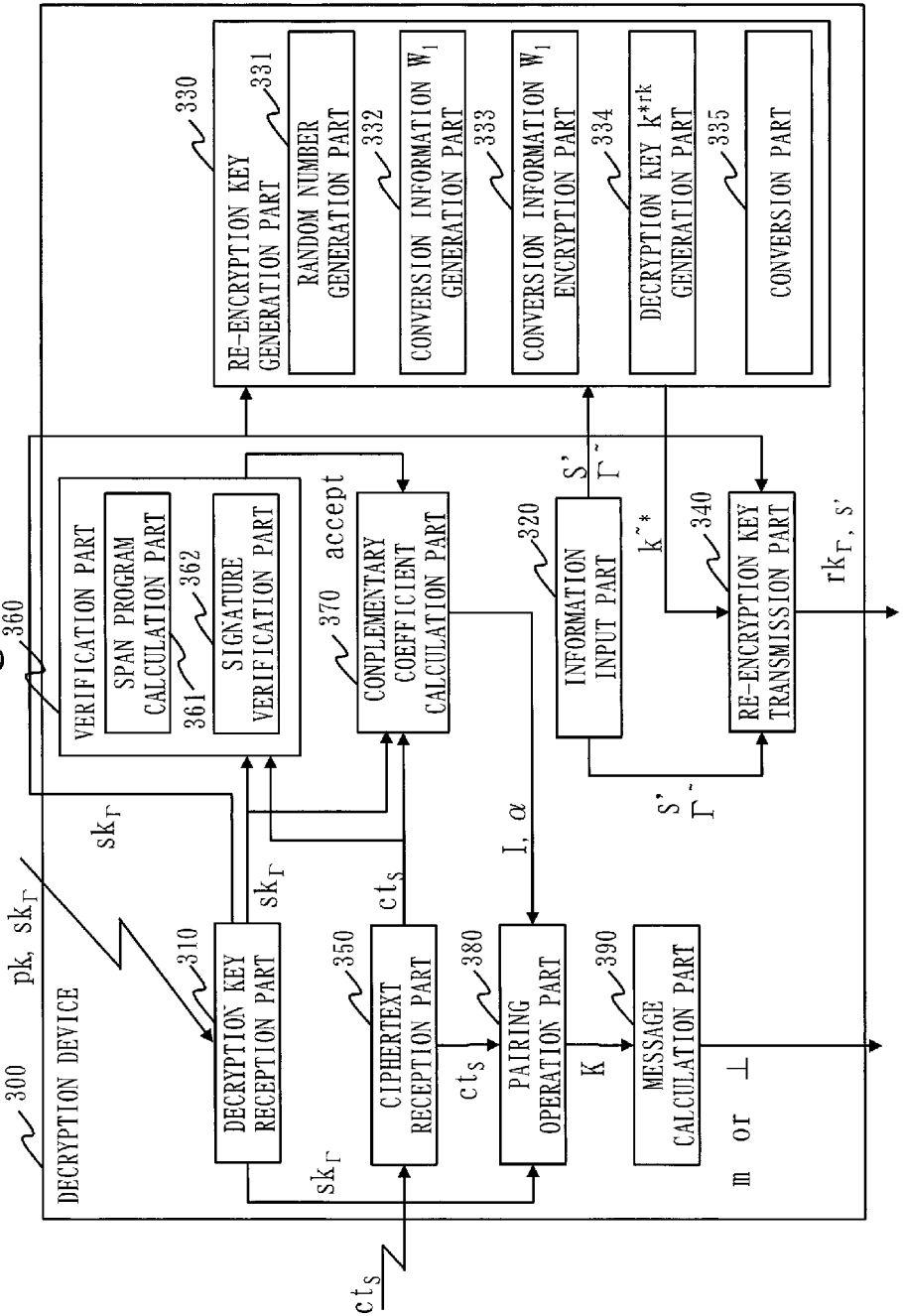
FIG. 8 is a functional block diagram illustrating a function of a decryption device 300.
Figure 9:
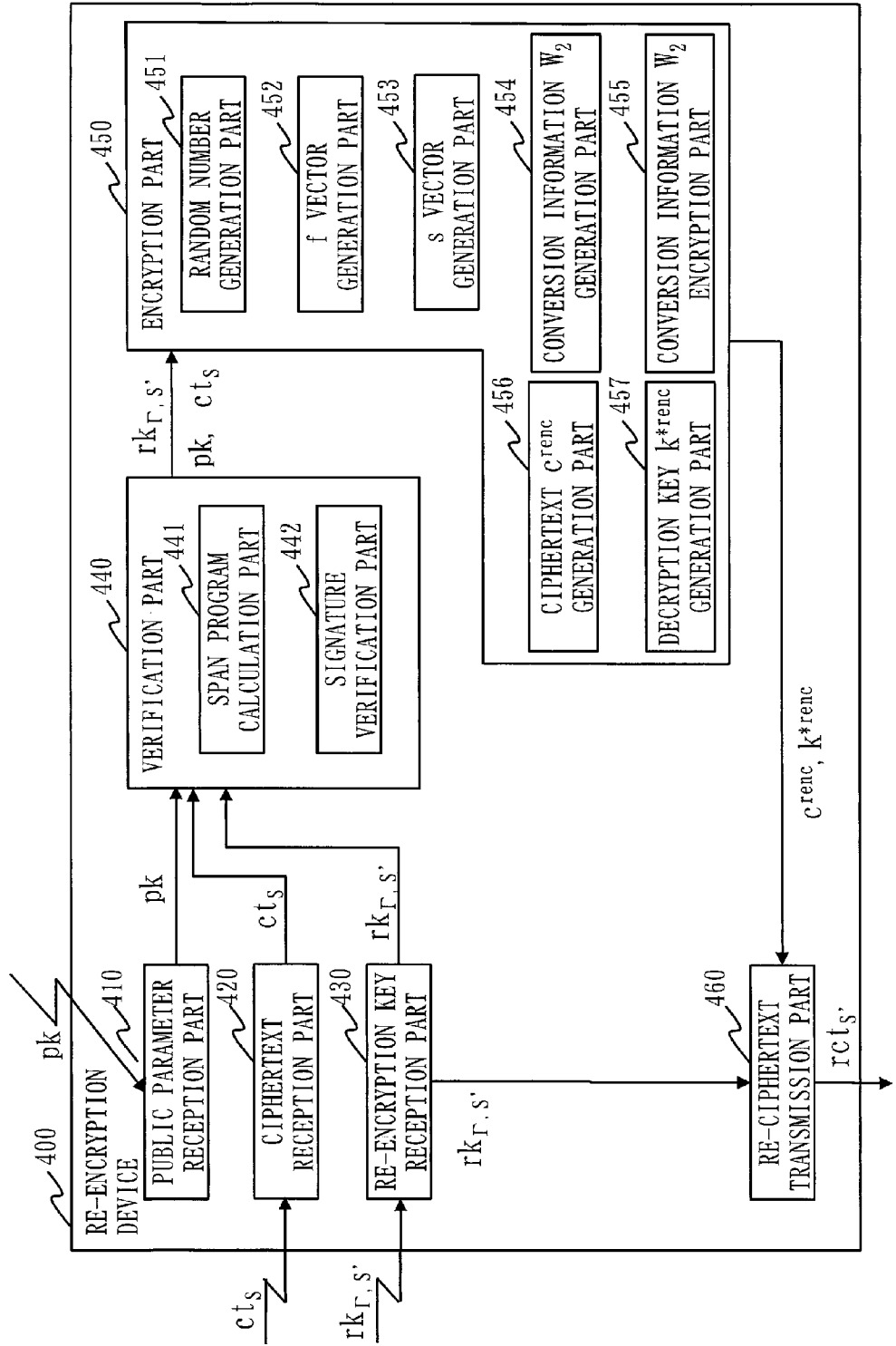
FIG. 9 is a functional block diagram illustrating a function of a re-encryption device 400.
Figure 10:
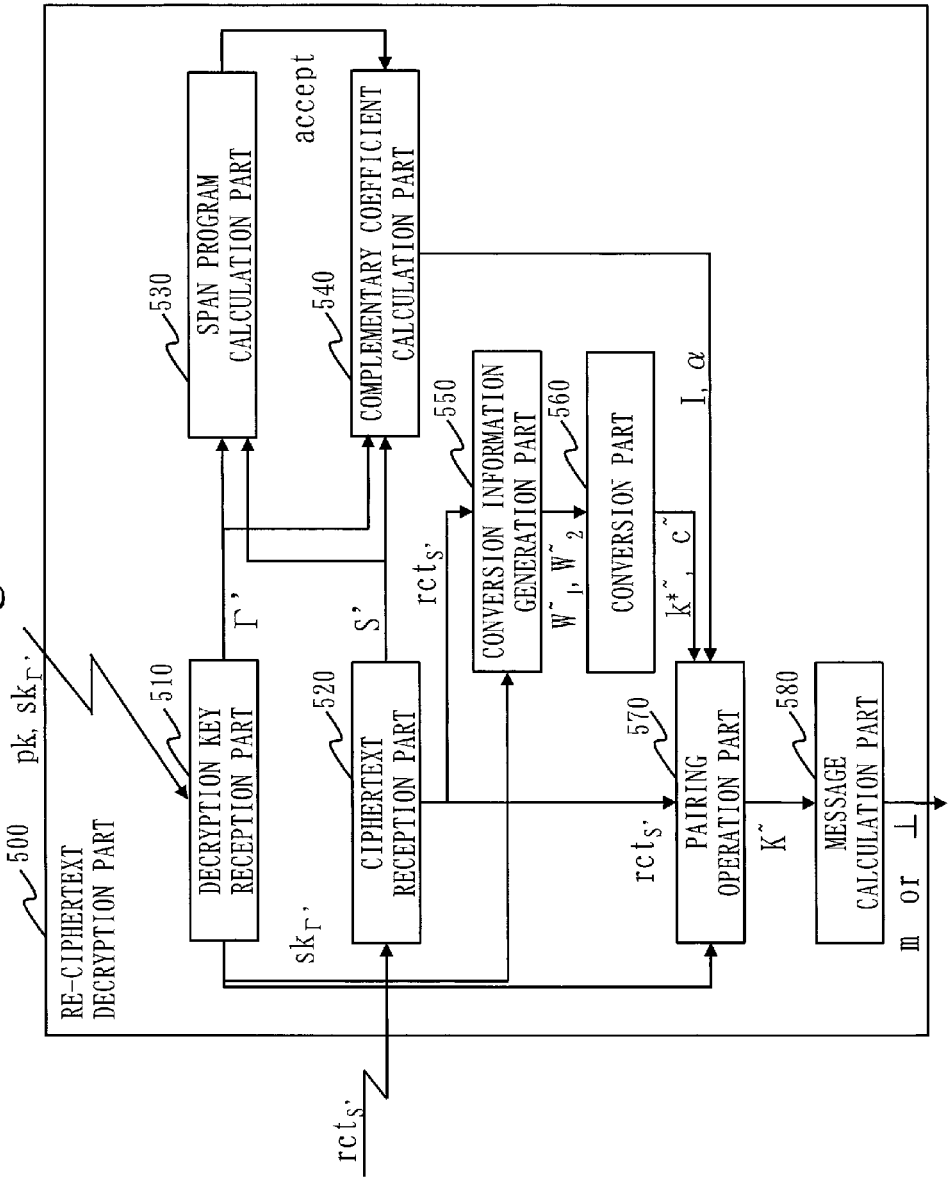
FIG. 10 is a functional block diagram illustrating a function of a re-ciphertext decryption device 500.

FIG. 6 is a functional block diagram illustrating a function of the key generation device 100. FIG. 7 is a functional block diagram illustrating a function of the encryption device 200. FIG. 8 is a functional block diagram illustrating a function of the decryption device 300. FIG. 9 is a functional block diagram illustrating a function of the re-encryption device 400. FIG. 10 is a functional block diagram illustrating a function of the re-ciphertext decryption device 500.

Figure 11:
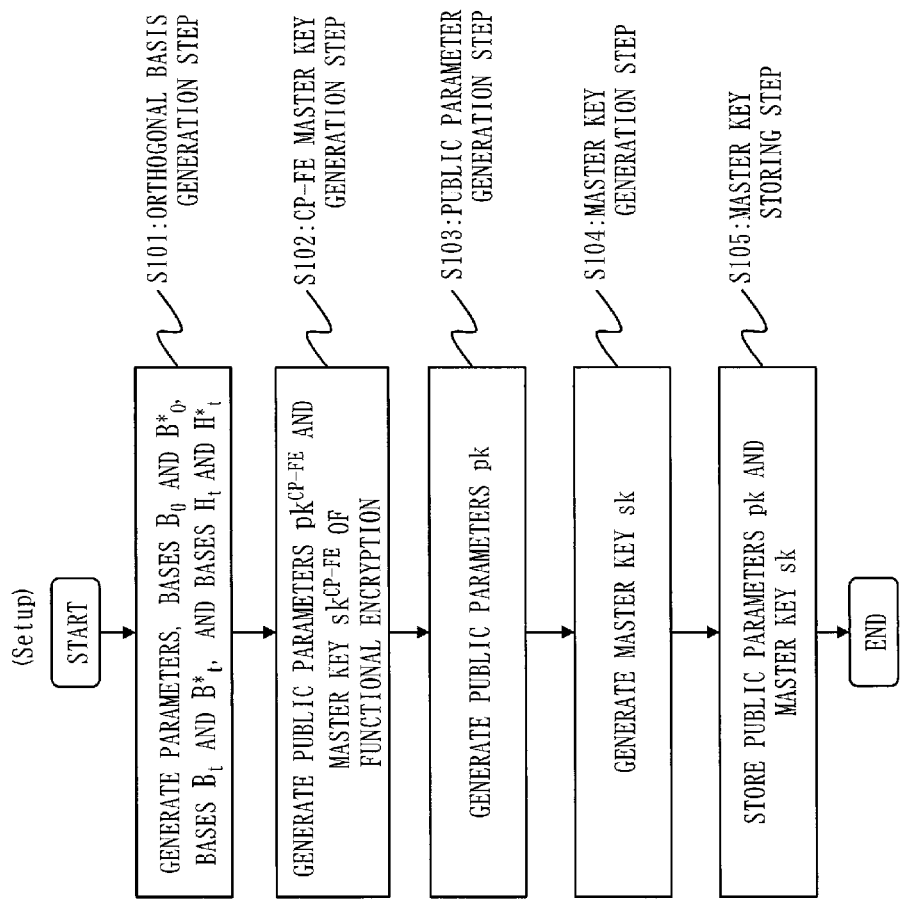
FIG. 11 is a flowchart illustrating a process of Setup algorithm.
Figure 12:
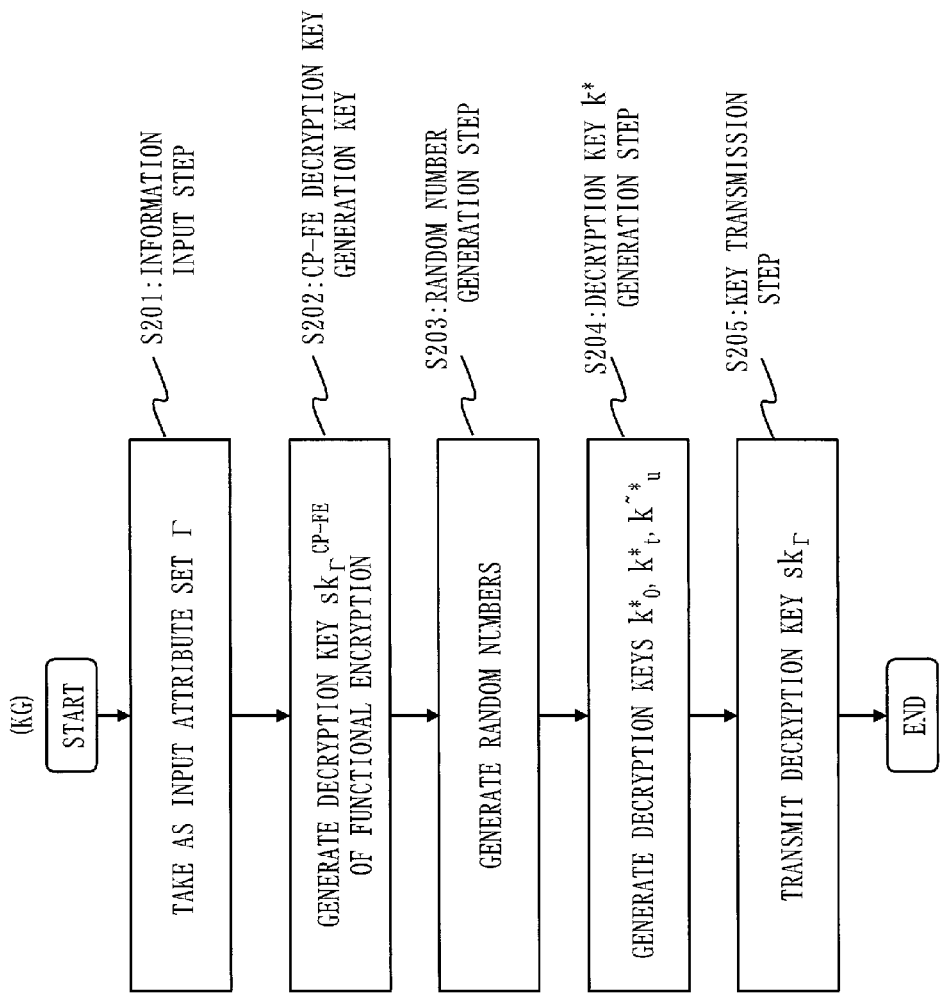
FIG. 12 is a flowchart illustrating a process of KG algorithm.
Figure 13:
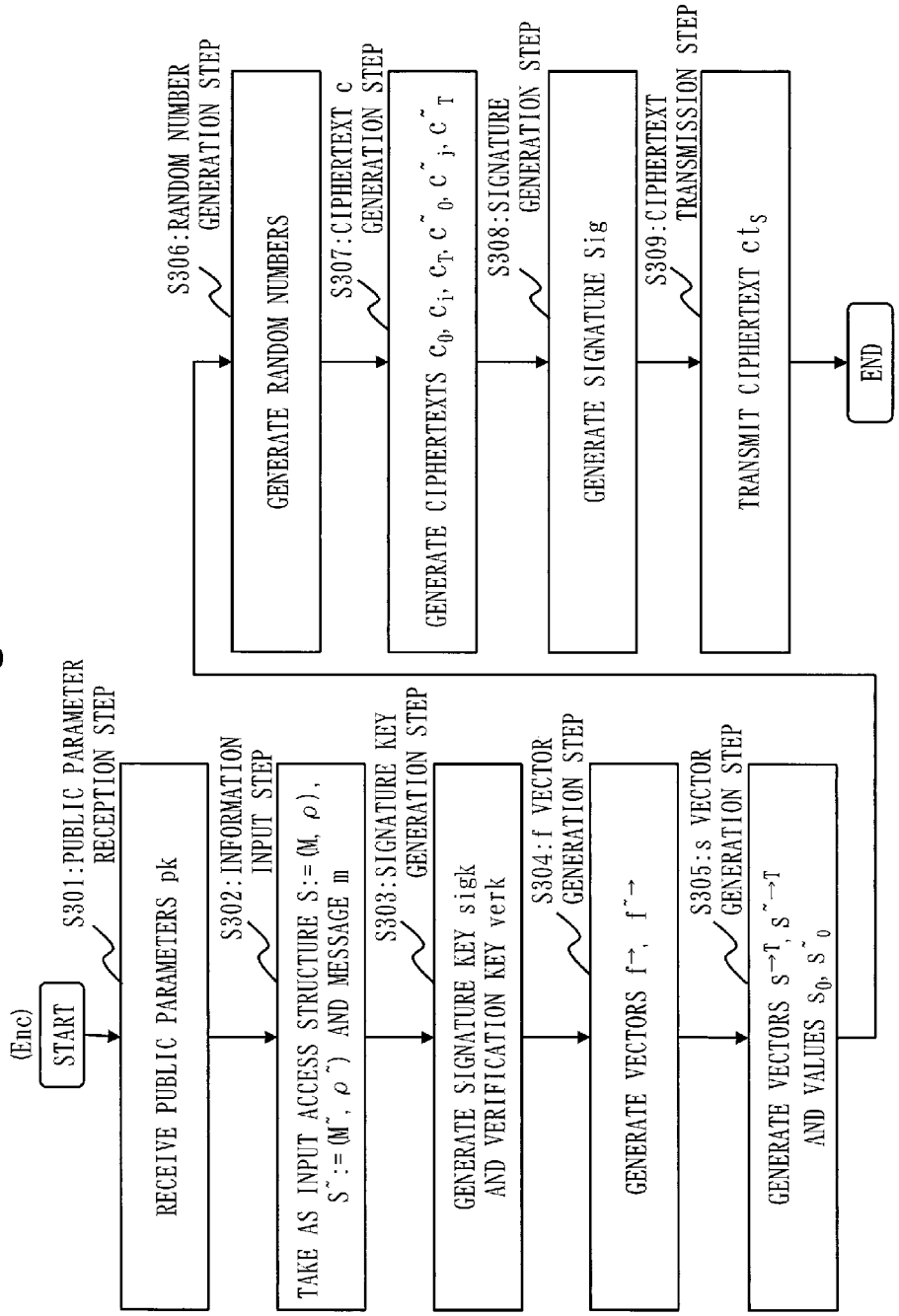
FIG. 13 is a flowchart illustrating a process of Enc algorithm.
Figure 14:
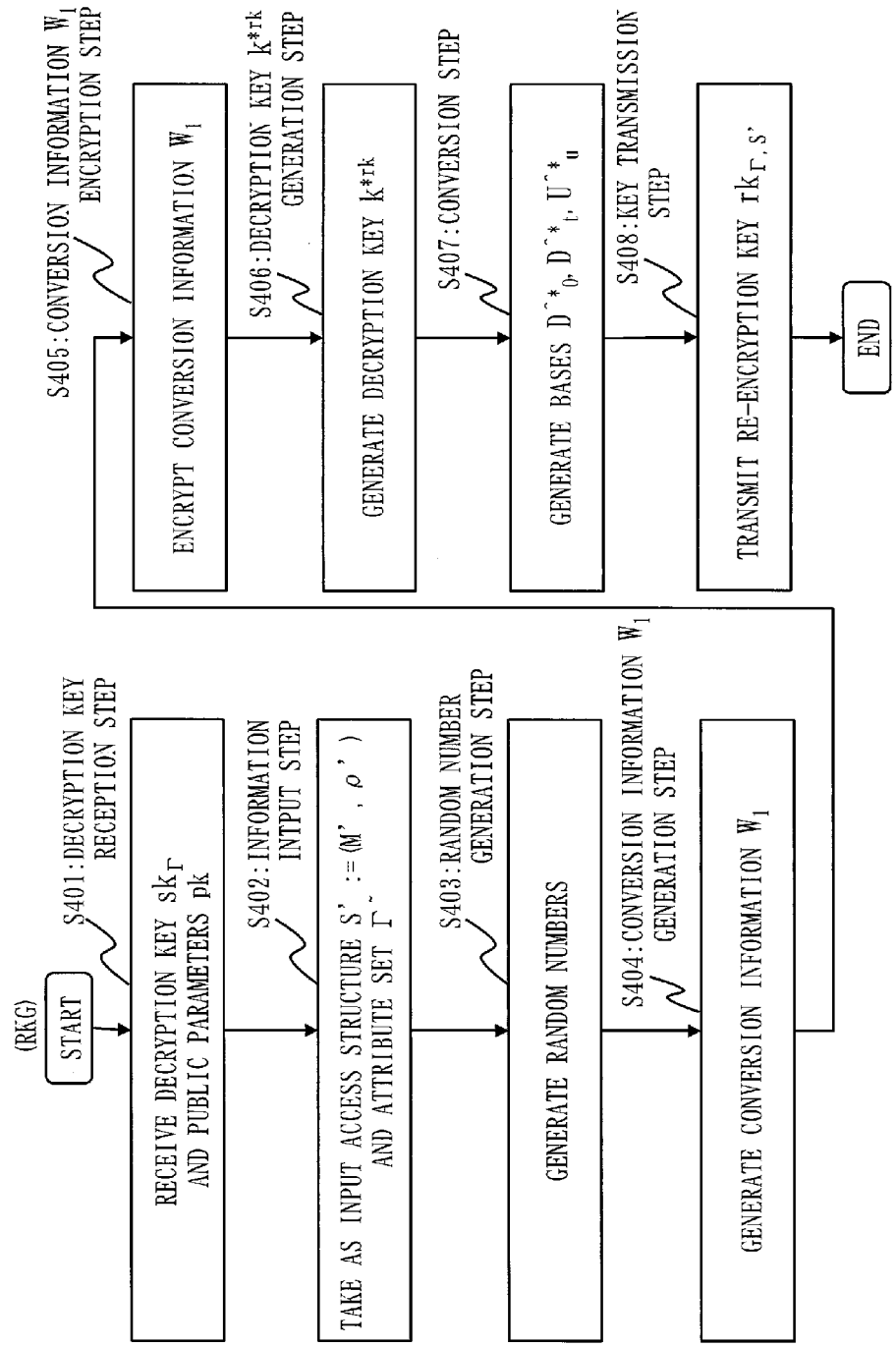
FIG. 14 is a flowchart illustrating a process of RKG algorithm.
Figure 15:
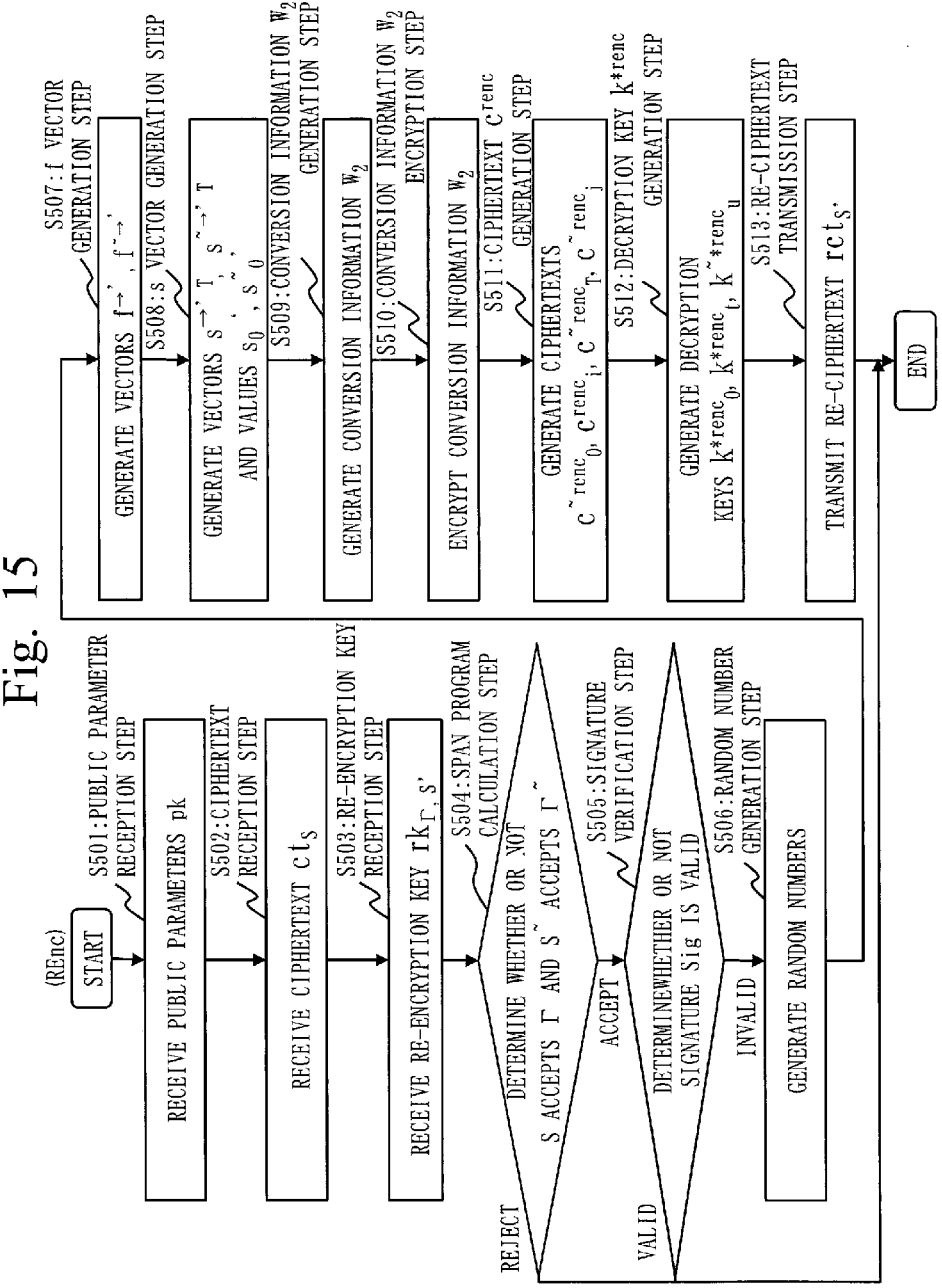
FIG. 15 is a flowchart illustrating a process of REnc algorithm.
Figure 16:
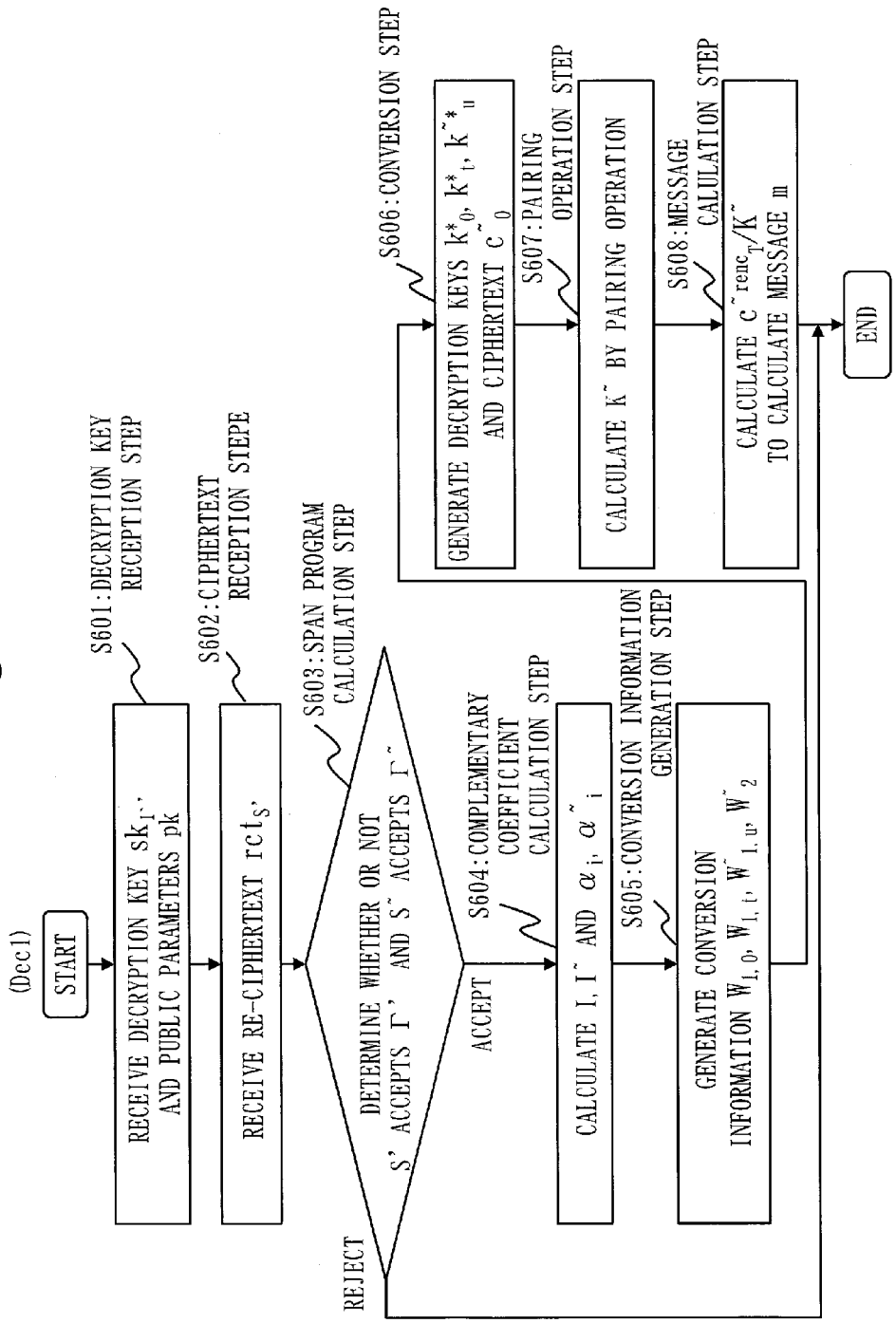
FIG. 16 is a flowchart illustrating a process of Dec1 algorithm.
Figure 17:
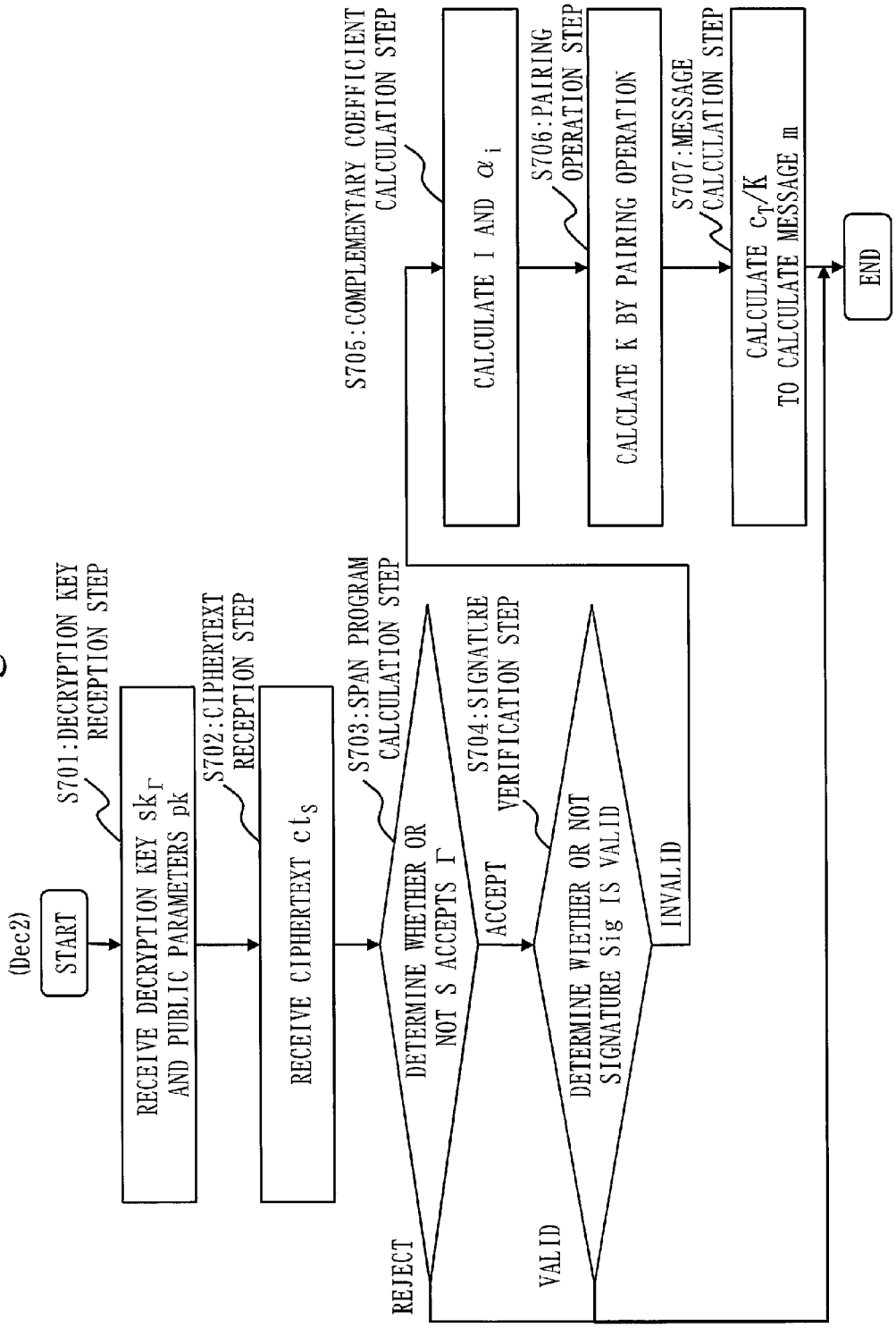
FIG. 17 is a flowchart illustrating a process of Dec2 algorithm.

FIGS. 11 and 12 are flowcharts each illustrating an operation of the key generation device 100, in which FIG. 11 is a flowchart illustrating a process of the Setup algorithm, and FIG. 12 is a flowchart illustrating a process of the KG algorithm. FIG. 13 is a flowchart illustrating an operation process of the encryption device 200 and a process of the Enc algorithm. FIG. 14 is a flowchart illustrating an operation of the decryption device 300 and a process of the RKG algorithm. FIG. 15 is a flowchart illustrating an operation of the re-encryption device 400 and a process of the REnc algorithm. FIG. 16 is a flowchart illustrating an operation of the re-ciphertext decryption device 500 and a process of the Dec1 algorithm. FIG. 17 is a flowchart illustrating an operation of the decryption device 300 and a process of the Dec2 algorithm.

The function and operation of the key generation device 100 will be described.

The key generation device 100 is provided with a master key generation part 110, a master key storage part 120, an information input part 130, a decryption key generation part 140, and a key transmission part 150 (key output part), as illustrated in FIG. 6. The decryption key generation part 140 is provided with a CP-FE key generation part 141, a random number generation part 142, and a decryption key k* generation part 143.

First, the process of the Setup algorithm will be described with reference to FIG. 11.

(S101: Orthogonal Basis Generation Step)

With the processing device, the master key generation part 110 calculates Formula 122-1 and Formula 122-2, to generate parameters $param_{\vec{n}}$, bases $B_0$ and $B^*_0$, bases $B_t$ and $B^*_t$, and bases $H_t$ and $H^*_t$.

[Formula 122-1]

(1) input $1^\lambda, \vec{n}$ (2) $param_\mathbb{G} := (q, \mathbb{G}, \mathbb{G}_T, g, e) \xleftarrow{R} \mathcal{G}_{bpg}(1^\lambda)$ (3) $N_0 := 9,$
$N_t := n_t + w_t + z_t + 1$ for $t = 1, \ldots, d,$
$\psi \xleftarrow{U} \mathbb{F}_q^\times, g_T := e(g, g)^\psi$ Processes of (4) to (10) are executed concerning each integer t of t=0, ..., d.

(4) $param_{\mathbb{V}_t} :=$
$(q, \mathbb{V}, \mathbb{G}_T, \mathbb{A}_t, e) \xleftarrow{R} \mathcal{G}_{dpvs}(1^\lambda, N_t, param_\mathbb{G})$ (5) $X_t = \begin{pmatrix} \vec{\chi}_{t,1} \\ \vdots \\ \vec{\chi}_{t,N_t} \end{pmatrix} := (\chi_{t,i,j})_{i,j} \xleftarrow{U} GL(N_t, \mathbb{F}_q)$ (6) $\begin{pmatrix} \vec{v}_{t,1} \\ \vdots \\ \vec{v}_{t,N_t} \end{pmatrix} := (v_{t,i,j})_{i,j} := \psi \cdot (X_t^T)^{-1}$ (7) $b_{t,i} := \sum_{j=1}^{N_t} \chi_{t,i,j} a_{t,j},$ $\mathbb{B}_t := (b_{t,1}, \ldots, b_{t,N_t}),$ $b^*_{t,i} := \sum_{j=1}^{N_t} v_{t,i,j} a_{t,j}, \mathbb{B}^*_t := (b^*_{t,1}, \ldots, b^*_{t,N_t})$

[Formula 122-2]

(8) $X'_t = \begin{pmatrix} \vec{\chi}'_{t,1} \\ \vdots \\ \vec{\chi}'_{t,N_t} \end{pmatrix} := (\chi'_{t,i,j})_{i,j} \xleftarrow{U} GL(N_t, \mathbb{F}_q)$ (9) $\begin{pmatrix} \vec{v}'_{t,1} \\ \vdots \\ \vec{v}'_{t,N_t} \end{pmatrix} := (v'_{t,i,j})_{i,j} := \psi \cdot (X'^T_t)^{-1}$

(10) $h_{t,i} := \sum_{j=1}^{N_t} \chi'_{t,i,j} a_{t,j},$ $\mathbb{H}_t := (h_{t,1}, \ldots, h_{t,N_t}),$ $h^*_{t,i} := \sum_{j=1}^{N_t} v'_{t,i,j} a_{t,j}, \mathbb{H}^*_t := (h^*_{t,1}, \ldots, h^*_{t,N_t})$

(11) $parm_{\vec{n}} := (\{parm_{\mathbb{V}_t}\}_{t=0,\ldots,d}, g_T)$

Namely, the master key generation part 110 executes the following processes.

(1) With the input device, the master key generation part 110 takes as input a security parameter $\lambda(1^k)$ and the attribute format $\vec{n} := (d; n_1, \ldots, n_d; w_1, \ldots, w_d; z_1, \ldots, z_d)$ where d is an integer of 1 or more. For each integer t of t=1, ..., d, $n_t$ is an integer of 1 or more, and $w_t$ and $z_t$ are each an integer of 0 or more.

(2) With the processing device, the master key generation part 110 executes algorithm $\mathcal{G}_{bpg}$ by taking as input the security parameter λ, inputted in (1), to generate the values of parameters $\text{param}_G := (q, G, G_T, g, e)$ of bilinear pairing groups.

(3) The master key generation part 110 sets 9 in $N_0$, and sets $n_t + w_t + z_t + 1$ in $N_t$ concerning each integer t of $t = 1, \ldots, d$. The master key generation part 110 generates a random number φ. The master key generation part 110 also sets $e(G,G)^\phi$ in $g_T$.

Subsequently, the master key generation part 110 executes the following processes (4) to (10) concerning each integer t of $t = 0, \ldots, d$.

(4) The master key generation part 110 executes algorithm $G_{dpvs}$ by taking as input the security parameter λ inputted in (1), $N_t$ set in (3), and the values of $\text{param}_G := (q, G, G_T, g, e)$ generated in (2), to generate the values of parameters $\text{param}_{V_t} := (q, V_t, G_T, A_t, e)$ of the dual pairing vector spaces.

(5) The master key generation part 110 takes as input, $N_t$ that is set in (3), and $F_q$, and generates linear transformation $X_t := (\chi_{t,i,j})_{i,j}$ randomly. Note that GL stands for General Linear. Namely, GL is a general linear group, a set of square matrices in which the determinant is not 0, and a group with respect to multiplication. Note that $(\chi_{t,i,j})_{i,j}$ signifies a matrix concerning suffixes i and j of a matrix $\chi_{t,i,j}$ where for $(\chi_{t,i,j})_{i,j}$, $i, j = 1, \ldots, N_t$.

(6) Based on the random number φ and the linear transformation $X_t$, the master key generation part 110 generates $(v_{t,i,j})_{i,j} := \phi \cdot (X_t^T)^{-1}$. As $(\Psi_{t,i,j})_{i,j}$ does, $(v_{t,i,j})_{i,j}$ signifies a matrix concerning suffixes i and j of a matrix $v_{t,i,j}$ where for $(v_{t,i,j})_{i,j}$, $i, j = 1, \ldots, N_t$.

(7) Based on the linear transformation $X_t$ generated in (5), the master key generation part 110 generates a basis $B_t$ from a canonical basis $A_t$ generated in (4). Based on $(v_{t,i,j})_{i,j}$ generated in (6), the master key generation part 110 generates a basis $B^*_t$ from the canonical basis $A_t$ generated in (4).

(8) In the same manner as in (5), the master key generation part 110 takes as input $N_t$ set in (3), and $F_q$, and generates linear transformation $X'_t := (\chi'_{t,i,j})_{i,j}$ randomly.

(9) In the same manner as in (6), based on the random number φ and the linear transformation $X'_t$, the master key generation part 110 generates $(v'_{t,i,j})_{i,j} := \phi \cdot (X'^T_t)^{-1}$.

(10) Based on the linear transformation $X'_t$ generated in (8), the master key generation part 110 generates the basis $H_t$ from the basis $A_t$ generated in (4). Based on $(v'_{t,i,j})_{i,j}$ generated in (9), the master key generation part 110 generates the basis $H^*_t$ from the basis $A_t$ generated in (4).

(11) The master key generation part 110 sets $\{\text{param}_{V_t}\}_{t=0, \ldots, d}$ generated in (4), and $g_T$, in $\text{param}_{\vec{n}}$.

(S102: CP-FE Master Key Generation Step)

With the processing device, the master key generation part 110 calculates Formula 123, to generate the public parameters $pk^{CP\text{-}FE}$ and the master key $sk^{CP\text{-}FE}$ of functional encryption.

$$(pk^{CP\text{-}FE}, sk^{CP\text{-}FE}) \xleftarrow{R} \text{Setup}_{CP\text{-}FE}(1^\lambda, \vec{n}) \qquad \text{[Formula 123]}$$

(S103: Public Parameter Generation Step)

With the processing device, the master key generation part 110 generates subbases $\hat{B}_0, \hat{B}_t, \hat{H}_D, \hat{B}^*_0, \hat{B}^*_t$, and $\hat{H}^*_u$ of the bases $B_0, B_t, H_t, B^*_0, B^*_t$, and $H^*_t$, respectively, as indicated in Formula 124.

$$\hat{B}_0 := (b_{0,1}, \ldots, b_{0,4}, b_{0,9}),$$

$$\hat{B}_t := (b_{t,1}, \ldots, b_{t,n_t}, b_{t,N_t}) \text{ for } t = 1, \ldots, d,$$

$$\hat{H}_u := (h_{u,1}, \ldots, h_{u,n_u}, h_{u,N_u}) \text{ for } u = 1, \ldots, d,$$

$$\hat{B}^*_0 := (b^*_{0,2}, b^*_{0,3}, b^*_{0,4}, b^*_{0,7}, b^*_{0,8}),$$

$$\hat{B}^*_t := (b^*_{t,1}, \ldots, b^*_{t,n_t}, b^*_{t,n_t+w_t 1}, \ldots, b^*_{t,n_t+w_t+z_t}) \text{ for } t = 1, \ldots, d,$$

$$\hat{H}^*_u := (h^*_{u,n_u+w_u+1}, \ldots, h^*_{u,n_u+w_u+z_u}) \text{ for } u = 1, \ldots, d \qquad \text{[Formula 124]}$$

The master key generation part 110 treats the public parameters $pk^{CP\text{-}FE}$, security parameter λ, $\text{param}_{\vec{n}}$, and subbases $\hat{B}_0, \hat{B}_t, \hat{H}^*_u, \hat{B}^*_0, \hat{B}^*_t$, and $\hat{H}^*_u$, to form the public parameters pk.

(S104: Master Key Generation Step)

The master key generation part 110 uses the master key $sk^{CP\text{-}FE}$, basis vector $b^*_{0,1}$, and some basis vectors of a basis $H^*_u$ indicated in Formula 125, to form the master key sk.

$$\{h^*_{u,1}, \ldots h^*_{u,n_u}\}_{u=1, \ldots, d} \qquad \text{[Formula 125]}$$

(S105: Master Key Storing Step)

The master key storage part 120 stores the public parameters pk generated in (S103), to the storage device. The master key storage part 120 also stores the master key sk generated in (S104), to the storage device.

In brief, from (S101) through (S104), the key generation device 100 generates the public parameters pk and the master key sk by executing the Setup algorithm indicated in Formula 126-1 and Formula 126-2. Then, in (S105), the key generation device 100 stores the generated public parameters pk and master key sk, to the storage device.

Note that the public parameters are publicized via, e.g., a network, so the encryption device 200, decryption device 300, re-encryption device 400, and re-ciphertext decryption device 500 can acquire them.

Setup($1^\lambda$, [Formula 126-1]

$\vec{n} = (d; n_1, \ldots, n_d; w_1, \ldots, w_d; z_1, \ldots, z_d))$:

$\text{parm}_G := (q, G, G_T, g, e) \xleftarrow{R} G_{bpg}(1^\lambda),$ $N_0 := 9, N_t := n_t + w_t + z_t + 1 \text{ for } t = 1, \ldots, d,$ $\psi \xleftarrow{U} F_q^\times, g_T := e(g,g)\psi, \text{ for } t = 0, \ldots, d,$ $\text{param}_{V_t} :=$ $(q, V, G_T, A_t, e) \xleftarrow{R} G_{dpvs}(1^\lambda, N_t, \text{param}_G),$ $$X_t := \begin{pmatrix} \vec{\chi}_{t,1} \\ \vdots \\ \vec{\chi}_{t,N_t} \end{pmatrix} := (\chi_{t,i,j})_{i,j} \xleftarrow{U} GL(N_t, F_q),$$

$$\begin{pmatrix} \vec{v}_{t,1} \\ \vdots \\ \vec{v}_{t,N_t} \end{pmatrix} := (v_{t,i,j})_{i,j} := \psi \cdot (X_t^T)^{-1},$$

$\text{parm}_{\vec{n}} := (\{\text{parm}_t\}_{t=0,\ldots,d}, g_T),$ $b_{t,i} := \sum_{j=1}^{N_t} \chi_{t,i,j} a_{t,j}, B_t := (b_{t,1}, \ldots, b_{t,N_t}),$ $b^*_{t,i} := \sum_{j=1}^{N_t} v_{t,i,j} a_{t,j}, B^*_t := (b^*_{t,1}, \ldots, b^*_{t,N_t}),$ $$X'_t = \begin{pmatrix} \vec{\chi}'_{t,1} \\ \vdots \\ \vec{\chi}'_{t,N_t} \end{pmatrix} := (\chi'_{t,i,j})_{i,j} \xleftarrow{U} GL(N_t, F_q),$$

$$\begin{pmatrix} \vec{v}'_{t,1} \\ \vdots \\ \vec{v}'_{t,N_t} \end{pmatrix} := (v'_{t,i,j})_{i,j} := \psi \cdot (X'^T_t)^{-1},$$

-continued $$h_{t,i} := \sum_{j=1}^{N_t} \chi'_{t,i,j} a_{t,j}, \mathbb{H}_t := (h_{t,1}, \ldots, h_{t,N_t}),$$ [Formula 126-2]

$$h^*_{t,i} := \sum_{j=1}^{N_t} v'_{t,i,j} a_{t,j}, \mathbb{H}^*_t := (h^*_{t,1}, \ldots, h^*_{t,N_t}),$$

$$(pk^{CP-FE}, sk^{CP-FE}) \xleftarrow{R} Setup_{CP-FE}(1^\lambda, \vec{n})$$

$$\hat{\mathbb{B}}_0 := (b_{0,1}, \ldots, b_{0,4}, b_{0,9}),$$

$$\hat{\mathbb{B}}_t := (b_{t,1}, \ldots, b_{t,n_t}, b_{t,N_t}) \text{ for } t = 1, \ldots, d,$$

$$\hat{\mathbb{H}}_u := (h_{u,1}, \ldots, h_{u,n_u}, h_{u,N_u}) \text{ for } u = 1, \ldots, d,$$

$$\hat{\mathbb{B}}^*_0 := (b^*_{0,2}, b^*_{0,3}, b^*_{0,4}, b^*_{0,7}, b^*_{0,8}),$$

$$\hat{\mathbb{B}}^*_t :=$$
$$(b^*_{t,1}, \ldots, b^*_{t,n_t}, b^*_{t,n_t+w_t+1}, \ldots, b^*_{t,n_t+w_t+z_t})$$

for $t = 1, \ldots, d$, $$\hat{\mathbb{H}}^*_u := (h^*_{u,n_u+w_u+1}, \ldots, h^*_{u,n_u+w_u+z_u})$$

for $u = 1, \ldots, d$, return pk $= (1^\lambda, pk^{CP-FE}, param_{\vec{n}},$ $\{\hat{\mathbb{B}}_t, \hat{\mathbb{B}}^*_t\}_{t=0,\ldots,d}, \{\hat{\mathbb{H}}_u, \hat{\mathbb{H}}^*_u\}_{u=1,\ldots,d}),$ sk $= (sk^{CP-FE}, b^*_{0,1}, \{h^*_{u,1}, \ldots, h^*_{u,n_u}\}_{u=1,\ldots,d}).$ The process of the KG algorithm will now be described with reference to FIG. 12.

(S201: Information Input Step)

With the input device, the information input part 130 takes as input the attribute set $\Gamma:=\{(t, \vec{x}_t:=(x_{t,1}, \ldots, x_{t,n_t}) \in \mathbb{F}_q^{n_t} \setminus \{\vec{0}\})| 1 \leq t \leq d\}$. Note that t need not be all integers t of $1 \leq t \leq d$, but may be at least some of the integers t of $1 \leq t \leq d$. The attribute information of the user of the decryption key $sk_\Gamma$, for example, is set in the attribute set $\Gamma$.

(S202: CP-FE Decryption Key Generation Step)

With the processing device, the CP-FE key generation part 141 calculates Formula 127, to generate the decryption key $sk_\Gamma^{CP-FE}$ of functional encryption.

$$sk_\Gamma^{CP-FE} \xleftarrow{R} KG^{CP-FE}(pk^{CP-FE}, sk^{CP-FE}, \Gamma)$$ [Formula 127]

(S203: Random Number Generation Step)

With the processing device, the random number generation part 142 generates random numbers, as indicated in Formula 128.

$$\delta \xleftarrow{U} \mathbb{F}_q,$$ [Formula 128]

$$\vec{\varphi}_0 \xleftarrow{U} \mathbb{F}_q^2,$$

$$\vec{\varphi}_t \xleftarrow{U} \mathbb{F}_q^{z_t} \text{ for } (t, \vec{x}_t) \in \Gamma,$$

$$\vec{\tilde{\varphi}}_t \xleftarrow{U} \mathbb{F}_q^{z_u} \text{ for } u = 1, \ldots, d$$

(S204: Decryption Key k* Generation Step)

With the processing device, the decryption key k* generation part 143 generates a decryption key k*$_0$, as indicated in Formula 129.

$$k_0^* := (1, \delta, 0^2, 0^2, \vec{\varphi}_0, 0)_{\mathbb{B}_0^*}$$ [Formula 129]

For the bases B and B* indicated in Formula 110, Formula 111 is established. Hence, Formula 129 means that: 1 is set as the coefficient for a basis vector $b^*_{0,1}$ of a basis $\mathbb{B}^*_0$; $\delta$ is set as the coefficient for basis vector $b^*_{0,2}$; 0 is set as the coefficient for basis vectors $b^*_{0,3}, \ldots, b^*_{0,6}$; $\phi_{0,1}$ and $\phi_{0,2}$ are set as the coefficients for basis vectors $b^*_{0,7}$ and $b^*_{0,8}$, respectively; and 0 is set as the coefficient for a basis vector $b^*_{0,9}$.

Also, with the processing device, the decryption key k* generation part 143 generates a decryption key k*$_t$ for each integer t included in the attribute set $\Gamma$, as indicated in Formula 130.

$$k_t^* := \left(\frac{n_t}{\delta \vec{x}_t}, \frac{w_t}{0^{w_t}}, \frac{z_t}{\vec{\varphi}_t}, \frac{1}{0}\right)_{\mathbb{B}_t^*} \text{ for } (t, \vec{x}_t), \in \Gamma$$ [Formula 130]

Formula 130 means that: $\delta x_{t,1}, \ldots, \delta x_{t,n_t}$ are set as the coefficients for basis vectors $b^*_{t,1}, \ldots, b^*_{t,n_t}$, respectively; 0 is set as the coefficient for basis vectors $b^*_{t,n_t+1}, \ldots, b^*_{t,n_t+w_t}$, respectively; $\phi_{t,1}, \ldots, \phi_{t,z_t}$ are set as the coefficients for basis vectors $b^*_{t,n_t+w_t+1}, \ldots, b^*_{t,n_t+w_t+z_t}$, respectively; and 0 is set as the coefficient for a basis vector $b^*_{t,n_t+w_t+z_t+1}$.

With the processing device, the decryption key k* generation part 143 generates a decryption key $\tilde{k}^*_{u,i}$ for each integer u of $u=1, \ldots, d$ and each integer i of $i=1, \ldots, n_u$, as indicated in Formula 131.

$$\tilde{k}^*_{u,i} := \delta h^*_{u,i} + \left(\frac{n_u}{0^{n_u}}, \frac{w_u}{0^{w_u}}, \frac{z_u}{\vec{\tilde{\varphi}}_u}, \frac{1}{0}\right)_{\mathbb{H}_u^*}$$ [Formula 131]

for $u = 1, \ldots, d; i = 1, \ldots, n_u$ (S205: Key Transmission Step)

For example, with the communication device, the key transmission part 150 transmits the decryption key $sk_\Gamma$ constituted as elements by the attribute set $\Gamma$, the decryption key $sk_\Gamma^{CP-FE}$ of functional encryption, and the decryption keys k*$_0$, k*$_t$, and $\tilde{k}^*_{u,i}$, to the decryption device 300 in secrecy via the network. As a matter of course, the decryption key $sk_\Gamma$ may be transmitted to the decryption device 300 by another method.

In brief, from (S201) through (S204), the key generation device 100 generates the decryption key $sk_\Gamma$ by executing the KG algorithm indicated in Formula 132. Then, in (S205), the key generation device 100 transmits the decryption key $sk_\Gamma$ to the decryption device 300.

$$KG = (pk, sk, \Gamma = (\{t, \vec{x}_t\} | \vec{x}_t \in \mathbb{F}_q^{n_t} \setminus \{\vec{0}\}, 1 \leq t \leq d\}):$$ [Formula 132]

$$sk_\Gamma^{CP-FE} \xleftarrow{R} KG^{CP-FE}(pk^{CP-FE}, sk^{CP-FE}, \Gamma),$$

$$\delta \xleftarrow{U} \mathbb{F}_q, \vec{\varphi}_0 \xleftarrow{U} \mathbb{F}_q^2,$$

$$\vec{\varphi}_t \xleftarrow{U} \mathbb{F}_q^{z_t} \text{ for } (t, \vec{x}_t) \in \Gamma, \vec{\tilde{\varphi}}_u \xleftarrow{U} \mathbb{F}_q^{z_u} \text{ for } u = 1, \ldots, d,$$

$$k_0^* := (1, \delta, 0^2, 0^2, \vec{\varphi}_0, 0)_{\mathbb{B}_0^*},$$

$$k_t^* := \left(\frac{n_t}{\delta \vec{x}_t}, \frac{w_t}{0^{w_t}}, \frac{z_t}{\vec{\varphi}_t}, \frac{1}{0}\right)_{\mathbb{B}_t^*} \text{ for } (t, \vec{x}_t), \in \Gamma,$$

$$\tilde{k}^*_{u,i} := \delta h^*_{u,i} + \left(\frac{n_u}{0^{n_u}}, \frac{w_u}{0^{w_u}}, \frac{z_u}{\vec{\tilde{\varphi}}_u}, \frac{1}{0}\right)_{\mathbb{H}_u^*}$$

return $sk_\Gamma :=$ $$(\Gamma, sk_\Gamma^{CP-FE}, k_0^*, \{k_t^*\}_{(t, \vec{x}_t) \in \Gamma}, \{\tilde{k}^*_{u,i}\}_{u=1,\ldots,d; i=1,\ldots,n_u}).$$

In (S201), the key generation device 100 executes the KG algorithm by taking as input an attribute set $\Gamma':=\{(t,x'^{\rightarrow}{}_t:=(x'_{t,1}, \ldots, x'_{t,n}) \in \mathbb{F}_q^{nt} \setminus \{0^{\rightarrow}\})) | 1 \le t \le d\}$ to which the attribute information of the user of the decryption key $sk_{\Gamma'}$ has been set, to generate the decryption key $sk_{\Gamma'}$. Then, the key generation device 100 transmits the decryption key $sk_{\Gamma'}:=(\Gamma', sk_{\Gamma'}^{CP-EE}, k'^*_0, \{k'_t\}_{(t,x\to t)\in\Gamma'}, \{k'^{\sim*}_{t,i}\}_{u=1,\ldots,d;\ i=1,\ldots,nu})$, to the re-ciphertext decryption device 500.

The function and operation of the encryption device 200 will be described.

As illustrated in FIG. 7, the encryption device 200 is provided with a public parameter reception part 210, an information input part 220, a signature processing part 230, an encryption part 240, and a ciphertext transmission part 250 (ciphertext output part). The encryption part 240 is provided with an f vector generation part 241, an s vector generation part 242, a random number generation part 243, and a ciphertext c generation part 244.

The process of the Enc algorithm will be described with reference to FIG. 13.

(S301: Public Parameter Reception Step)

For example, with the communication device, the public parameter reception part 210 receives the public parameters pk generated by the key generation device 100, via the network.

(S302: Information Input Step)

With the input device, the information input part 220 takes as input the access structures $S:=(M,\rho)$ and $S^{\sim}:=(M^{\sim},\rho^{\sim})$. The access structures S and $S^{\sim}$ are set depending on the condition of a system to be implemented. The attribute information of the user who can decrypt the ciphertext $ct_S$, for example, is set to $\rho$ of the access structure S. Information for setting a condition that enables re-encryption, for example, is set to $\rho^{\sim}$ of the access structure $S^{\sim}$. Note that $\rho(i)=(t,v^{\rightarrow}{}_i:=(v_1, \ldots, v_{i,nt})\in\mathbb{F}_q^{nt}\setminus\{0^{\rightarrow}\}))(v_{i,nt}\ne 0)$ and that $\rho^{\sim}(i)=(u,z^{\rightarrow}{}_i:=(z_{i,1}, \ldots, z_{i,nu})\in\mathbb{F}_q^{nu}\setminus\{0^{\rightarrow}\})(z_{i,nu}\ne 0)$. M is an (L rows×r columns) matrix, and $M^{\sim}$ is an ($L^{\sim}$ rows×$r^{\sim}$ columns) matrix.

With the input device, the information input part 220 takes as input the message m to be transmitted to the decryption device 300.

(S303: Signature Key Generation Step)

With the processing device, the signature processing part 230 calculates formula 133, to generate the signature key sigk for one-time signature and the verification key verk.

$$(sigk, verk) \xleftarrow{R} SigKG(1^\lambda) \qquad \text{[Formula 133]}$$

(S304: f Vector Generation Step)

With the processing device, the f vector generation part 241 generates vectors $r^{\rightarrow}$ and $f^{\rightarrow}$ randomly as indicated in Formula 134.

$$\vec{f} \xleftarrow{U} \mathbb{F}_q^r, \qquad \text{[Formula 134]}$$

$$\vec{\tilde{f}} \xleftarrow{U} \mathbb{F}_q^{\tilde{r}}$$

(S305: s Vector Generation Step)

With the processing device, the s vector generation part 242 generates vectors $s^{\rightarrow T}$ and $\tilde{s}^{\rightarrow T}$ as indicated in Formula 135.

$$\vec{s}^T := (s_1, \ldots, s_L)^T := M \cdot \vec{f}^T$$

$$\vec{\tilde{s}}^T := (\tilde{s}_1, \ldots, \tilde{s}_L)^T := \tilde{M} \cdot \vec{\tilde{f}}^T \qquad \text{[Formula 135]}$$

With the processing device, the s vector generation part 242 also generates values $s_0$ and $\tilde{s}_0$ as indicated in Formula 136.

$$s_0 := \vec{1} \cdot \vec{f}^T,$$

$$\tilde{s}_0 := \vec{1} \cdot \vec{\tilde{f}}^T \qquad \text{[Formula 136]}$$

(S306: Random Number Generation Step)

With the processing device, the random number generation part 243 generates random numbers as indicated in Formula 137.

$$\pi, \eta_0, \zeta, \tilde{\pi}, \tilde{\eta}_0, \tilde{\zeta} \xleftarrow{U} \mathbb{F}_q, \qquad \text{[Formula 137]}$$

$$\theta_i, \eta_i, \tau_i \xleftarrow{U} \mathbb{F}_q \text{ for } i=1, \ldots, L,$$

$$\tilde{\theta}_j, \tilde{\eta}_j, \tilde{\tau}_j \xleftarrow{U} \mathbb{F}_q \text{ for } j=1, \ldots, \tilde{L}$$

(S307: Ciphertext c Generation Step)

With the processing device, the ciphertext c generation part 244 generates a ciphertext $c_0$ as indicated in Formula 138.

$$c_0 := (\zeta, -s_0, \pi(verk,1), 0^2, 0^2, \eta_0)_{\mathbb{B}_0} \qquad \text{[Formula 138]}$$

With the processing device, the ciphertext c generation part 244 generates a ciphertext $c_i$ for each integer i of $i=1, \ldots, L$, as indicated in Formula 139.

for $i=1, \ldots, L$, [Formula 139]

if $\rho(i) = (t, \vec{v}_i)$, $$c_i := \left( \frac{n_t}{s_i \vec{e}_{t,1} + \theta_i \vec{v}_t}, \frac{w_t}{0^{w_t}}, \frac{z_t}{0^{z_t}}, \frac{1}{\eta_i} \right)_{\mathbb{B}_t},$$

if $\rho(i) = \neg(t, \vec{v}_i)$, $$c_i := \left( \frac{n_t}{s_i \vec{v}_t}, \frac{w_t}{0^{w_t}}, \frac{z_t}{0^{z_t}}, \frac{1}{\eta_i} \right)_{\mathbb{B}_t}$$

With the processing device, the ciphertext c generation part 244 generates a ciphertext $c_T$ as indicated in formula 140.

$$c_T := m \cdot g_T^{\zeta} \qquad \text{[Formula 140]}$$

With the processing device, the ciphertext c generation part 244 generates a ciphertext $\tilde{c}_0$ as indicated in Formula 141.

$$\tilde{c}_0 := (\tilde{\zeta}, -\tilde{s}_0, \tilde{\pi}(verk,1), 0^2, 0^2, \tilde{\eta}_0)_{\mathbb{B}_0} \qquad \text{[Formula 141]}$$

With the processing device, the ciphertext c generation part 244 generates a ciphertext $\tilde{c}_j$ for each integer j of $j=1, \ldots, \tilde{L}$, as indicated in Formula 142.

for $j=1, \ldots, \tilde{L}$, [Formula 142]

if $\tilde{\rho}(j) = (u, \vec{z}_j)$,

-continued $$\tilde{c}_j := \left( \overbrace{\tilde{s}_j \vec{e}_{u,1} + \tilde{\theta}_j \vec{z}_j}^{n_u}, \overbrace{0^{w_u}}^{w_u}, \overbrace{0^{z_u}}^{z_u}, \overbrace{\tilde{\eta}_j}^{1} \right)_{\mathbb{H}_u},$$

if $\tilde{\rho}(j) = \neg (u, \vec{z}_j),$ $$\tilde{c}_j := \left( \overbrace{\tilde{s}_j \vec{z}_j}^{n_u}, \overbrace{0^{w_u}}^{w_u}, \overbrace{0^{z_u}}^{z_u}, \overbrace{\tilde{\eta}_j}^{1} \right)_{\mathbb{H}_u}$$

With the processing device, the ciphertext c generation part 244 generates a ciphertext $\tilde{c}_T$ as indicated in Formula 142.

$$\tilde{c}_T := m \cdot g_T^{\tilde{\xi}} \qquad \text{[Formula 143]}$$

(S308: Signature Generation Step)

With the processing device, the signature processing part 230 calculates Formula 144, to generate a signature Sig for an element C of the ciphertext $ct_S$.

$$Sig \xleftarrow{R} \qquad \text{[Formula 144]}$$

$$Sig\left(sigk, C := \left(\mathbb{S}, \tilde{\mathbb{S}}, \{c_i\}_{i=0,\ldots,L}, \{\tilde{c}_j\}_{j=0,\ldots,\tilde{L}}, c_T, \tilde{c}_T\right)\right)$$

(S309: Ciphertext Transmission Step)

For example, with the communication device, the ciphertext transmission part 250 transmits the ciphertext $ct_S$ constituted as elements by the access structures S and S~, ciphertexts $c_0, c_1, \ldots, c_L, c_T, \tilde{c}_0, \tilde{c}_1, \ldots, \tilde{c}_{\tilde{L}}$, and $\tilde{c}_T$, the verification key verk, and the signature Sig, to the decryption device 300 via the network. The ciphertext $ct_S$ may be transmitted to the decryption device 300 by another method, as a matter of course.

In brief; from (S301) through (S308), the encryption device 200 executes the Enc algorithm indicated in Formula 145-1 and Formula 145-2, to generate the ciphertext $ct_S$. In (S309), the encryption device 200 transmits the generated ciphertext $ct_S$ to the decryption device 300.

$$Enc = \left(pk, m, \mathbb{S} = (M, \rho), \tilde{\mathbb{S}} = (\tilde{M}, \tilde{\rho})\right): \qquad \text{[Formula 145-1]}$$

$(sigk, verk) \xleftarrow{R} SigKG(1^\lambda),$ $\vec{f} \xleftarrow{U} \mathbb{F}_q^r, \vec{\tilde{f}} \xleftarrow{U} \mathbb{F}_q^{\tilde{r}},$ $\vec{s}^T := (s_1, \ldots, s_L)^T := M \cdot \vec{f}^T,$ $s_0 := \vec{1} \cdot \vec{f}^T,$ $\vec{\tilde{s}}^T := (\tilde{s}_1, \ldots, \tilde{s}_{\tilde{L}})^T := \tilde{M} \cdot \vec{\tilde{f}}^T,$ $\tilde{s}_0 := \vec{1} \cdot \vec{\tilde{f}}^T,$ $\pi, \eta_0, \zeta, \tilde{\pi}, \tilde{\eta}_0, \tilde{\zeta} \xleftarrow{U} \mathbb{F}_q,$ $c_0 := (\zeta, -s_0, \pi(verk, 1), 0^2, 0^2, \eta_0)_{\mathbb{B}_0},$ $\tilde{c}_0 := (\tilde{\zeta}, -\tilde{s}_0, \tilde{\pi}(verk, 1), 0^2, 0^2, \tilde{\eta}_0)_{\mathbb{B}_0},$ $c_T := m \cdot g_T^\zeta, \tilde{c}_T := m \cdot g_T^{\tilde{\zeta}},$ for $i = 1, \ldots, L,$ [Formula 145-2]

if $\rho(i) =$ $(t, \vec{v}_i := (v_{i,1}, \ldots, v_{i,n_t}) \in \mathbb{F}_q^{n_t} \setminus \{\vec{0}\})(v_{i,n_t} \neq 0),$ $\theta_i, \eta_i, \tau_i \xleftarrow{U} \mathbb{F}_q,$ $$c_i := (\overbrace{s_i \vec{e}_{t,1} + \theta_i \vec{v}_i}^{n_t}, \overbrace{0^{w_t}}^{w_t}, \overbrace{0^{z_t}}^{z_t}, \overbrace{\tilde{\eta}_i}^{1})_{\mathbb{B}_t},$$

if $\rho(i) = \neg (t, \vec{v}_i),$ $\eta_i \xleftarrow{U} \mathbb{F}_q,$ $$c_i := (\overbrace{s_i \vec{v}_i}^{n_t}, \overbrace{0^{w_t}}^{w_t}, \overbrace{0^{z_t}}^{z_t}, \overbrace{\tilde{\eta}_i}^{1})_{\mathbb{B}_t},$$

for $j = 1, \ldots, \tilde{L},$ if $\tilde{\rho}(j) =$ $(u, \vec{z}_j := (z_{j,1}, \ldots, z_{j,n_u}) \in \mathbb{F}_q^{n_u} \setminus \{\vec{0}\})(z_{j,n_u} \neq 0),$ $\tilde{\theta}_j, \tilde{\eta}_j, \tilde{\tau}_j \xleftarrow{U} \mathbb{F}_q,$ $$\tilde{c}_j := (\overbrace{\tilde{s}_j \vec{e}_{u,1} + \tilde{\theta}_j \vec{z}_j}^{n_u}, \overbrace{0^{w_u}}^{w_u}, \overbrace{0^{z_u}}^{z_u}, \overbrace{\tilde{\eta}_j}^{1})_{\mathbb{H}_u},$$

if $\tilde{\rho}(j) = \neg (u, \vec{z}_j),$ $\tilde{\eta}_j \xleftarrow{U} \mathbb{F}_q,$ $$\tilde{c}_j := (\overbrace{\tilde{s}_j \vec{z}_j}^{n_u}, \overbrace{0^{w_u}}^{w_u}, \overbrace{0^{z_u}}^{z_u}, \overbrace{\tilde{\eta}_i}^{1})_{\mathbb{H}_u},$$

$Sig \xleftarrow{R} Sig(sigk,$ $C := (\mathbb{S}, \tilde{\mathbb{S}}, \{c_i\}_{i=0,\ldots,L},$ $\{\tilde{c}_j\}_{j=0,\ldots,\tilde{L}}, c_T, \tilde{c}_T),$ $ct_\mathbb{S} := (\mathbb{S}, \tilde{\mathbb{S}}, \{c_i\}_{i=0,\ldots,L},$ $\{\tilde{c}_j\}_{j=0,\ldots,\tilde{L}}, c_T, \tilde{c}_T, verk, Sig).$ The function and operation of the decryption device 300 will be described.

As illustrated in FIG. 8, the decryption device 300 is provided with a decryption key reception part 310, an information input part 320, a re-encryption key generation part 330, a re-encryption key transmission part 340 (re-encryption key output part), a ciphertext reception part 350, a verification part 360, a complementary coefficient calculation part 370, a pairing operation part 380, and a message calculation part 390. The re-encryption key generation part 330 is provided with a random number generation part 331, a conversion information $W_1$ generation part 332, a conversion information $W_1$ encryption part 333, a decryption key $k^{*rk}$ generation part 334, and a conversion part 335. The verification part 360 is provided with a span program calculation part 361 and a signature verification part 362.

The process of the RKG algorithm will be described with reference to FIG. 14. The Dec2 algorithm will be described later.

(S401: Decryption Key Reception Step)

For example, with the communication device, the decryption key reception part 310 receives the decryption key $sk_\Gamma$ transmitted from the key generation device 100, via the network. The decryption key reception part 310 also receives the public parameters pk generated by the key generation device 100.

(S402: Information Input Step)

With the input device, the information input part 320 takes as input the access structure S':=(M', ρ'). The access structure S' is set depending on the condition of a system to be implemented. The attribute info' cation of the user who can decrypt the re-ciphertext $ct_{S'}$, for example, is set to ρ' of the access structure S'. Note that $\rho'(i)=(t,\vec{v}'_i:=(v'_{i,1}, \ldots, v'_{i,nt}) \in \mathbb{F}_q^{nt} \setminus \{\vec{0}\})$ $(v'_{i,nt} \neq 0).$ With the input device, the information input part 320 takes as input the attribute set $\tilde{\Gamma} := \{(u, \vec{y}_u := y_{u,1}, \ldots, y_{u,nu} \in \mathbb{F}_q^{nu} \setminus \{\vec{0}\})) | 1 \leq t \leq d\}$. Note that u need not be all the integers u of $1 \leq u \leq d$ but may be at least some of the integers u of $1 \leq u \leq d$. Attribute information indicating a condition that enables re-encryption, for example, is set to the attribute set F.

(S403: Random Number Generation Step)

With the processing device, the random number generation part 331 generates random numbers as indicated in Formula 146.

$$\delta', \delta'_{ran} \xleftarrow{U} \mathbb{F}_q,$$

$$\vec{\varphi}', \vec{\varphi}'_{ran} \xleftarrow{U} \mathbb{F}_q^2,$$

$$\vec{\varphi}'_t, \vec{\varphi}'_{t,ran} \xleftarrow{U} \mathbb{F}_q^{z_t} \text{ for } (t, \vec{x}_t) \in \Gamma,$$

$$\vec{\varphi}'_u \xleftarrow{U} \mathbb{F}_q^{z_u} \text{ for } (u, \vec{y}_u) \in \tilde{\Gamma}$$

[Formula 146]

(S404: Conversion Information $W_1$ Generation Step)

With the processing device, the conversion information $W_1$ generation part 332 generates conversion information $W_{1,0}$, $W_{1,t}$, and $\tilde{W}_{1,u}$, as indicated in Formula 147.

$$W_{1,0} \xleftarrow{U} GL(9, \mathbb{F}_q),$$

$$W_{1,t} \xleftarrow{U} GL(N_t, \mathbb{F}_q) \text{ for } (t, \vec{x}_t) \in \Gamma,$$

$$\tilde{W}_{1,u} \xleftarrow{U} GL(N_u, \mathbb{F}_q) \text{ for } (u, \vec{y}_u) \in \tilde{\Gamma}$$

[Formula 147]

(S405: Conversion Information $W_1$ Encryption Step)

With the processing device, the conversion information $W_1$ encryption part 333 calculates Formula 148, to encrypt the conversion information $W_{1,0}$, $W_{1,t}$, and $\tilde{W}_{1,u}$ by functional encryption, thereby generating encrypted conversion information $ct^{rk}_{S'}(\phi^{rk})$. As the conversion information $W_{1,0}$, $W_{1,t}$, and $\tilde{W}_{1,u}$ are encrypted by functional encryption that takes as input the access structure S', they are encrypted by setting the attribute information of the user capable of decrypting the re-ciphertext $rct_S$.

$$ct^{rk}_{S'} \xleftarrow{R} Enc_{CP\text{-}FE}(pk^{CP\text{-}FE}, S',$$

$$(\{W_{1,t}\}_{t=0,(t,\vec{x}_t) \in \Gamma}, \{W_{1,u}\}_{(u,\vec{y}_u) \in \tilde{\Gamma}}, \Gamma, \tilde{\Gamma}))$$

[Formula 148]

(S406: Decryption Key $k^{*rk}$ Generation Step)

With the processing device, the decryption key $k^{*rk}$ generation part 334 generates decryption keys $k^{*rk}_0$ and $k^{*rk}_{0,ran}$, as indicated in Formula 149.

$$k_0^{*rk} := (k_0^* + (0,0,0^4, \vec{\phi}', 0) \mathbb{B}^*) W_{1,0},$$

$$k_{0,ran}^{*rk} := (0,0,0^4, \vec{\phi}'_{ran}, 0) \mathbb{B}^* W_{1,0}$$

[Formula 149]

Also, with the processing device, the decryption key $k^{*rk}$ generation part 334 generates decryption keys $k^{*rk}_t$ and $k^{*rk}_{t,ran}$ for each integer t included in the attribute set $\Gamma$, as indicated in Formula 150.

$$k_t^{*rk} := (k_t^* + (0^{n_t}, 0^{w_t}, \vec{\phi}'_t; 0) \mathbb{B}_t^*) W_{1,t} \text{ for } (t, \vec{x}_t) \in \Gamma,$$

$$k_{t,ran}^{*rk} := (0^{n_t}, 0^{w_t}, \vec{\phi}'_{t,ran}, 0) \mathbb{B}_t^* W_{1,t} \text{ for } (t, \vec{x}_t) \in \Gamma$$

[Formula 150]

Also, with the processing device, the decryption key $k^{*rk}$ generation part 334 generates a decryption key $k^{\sim *rk}_u$ for each integer u included in the attribute set $\tilde{\Gamma}$, as indicated in Formula 151.

$$\tilde{k}_{u,i}^{*rk} := \vec{y}_{u,i} \tilde{k}_{u,i}^* + \left( \begin{array}{c} \frac{n_u \ w_u \ z_u}{0^{n_u}, 0^{w_u}, \vec{\varphi}'_u, 0} \end{array} \right)_{\mathbb{H}_u^*} \tilde{W}_{1,u} \text{ for } (u, \vec{y}_u) \in \tilde{\Gamma};$$

$$i = 1, \ldots, n_u,$$

$$\tilde{k}_u^{*rk} := \sum_{i=1}^{n_u} \tilde{k}_{u,i}^{*rk} (u, \vec{y}_u) \in \tilde{\Gamma}$$

[Formula 151]

(S407: Conversion Step)

With the processing device, the conversion part 335 calculates Formula 152, to generate bases $\hat{D}^*_0$, $\hat{D}^*_t$, and $\hat{U}^*_u$.

$$\hat{\mathbb{D}}_0^* := (d_{0,i}^* := b_{0,i}^* W_{1,0})_{i=3,4,7,8},$$

$$\hat{\mathbb{D}}_t^* := (d_{t,i}^* := b_{0,i}(W_{1,t}))_{i=n_t+w_t+1, \ldots, n_t+w_t+z_t} \text{ for } t=1, \ldots, d,$$

$$\hat{\mathbb{U}}_u^* := (d_{u,i}^* := b_{0,i}^* W_{1,u})_{i=n_u+w_u+1, \ldots, n_u+w_u+z_u} \text{ for } u=1, \ldots, d$$

[Formula 152]

(S408: Key Transmission Step)

For example, with the communication device, the re-encryption key transmission part 340 transmits the re-encryption key $rk_{\Gamma,S'}$ constituted as elements by the attribute sets $\Gamma$ and $\tilde{\Gamma}$, the access structure S', the decryption keys $k^{*rk}_0$, $k^{*rk}_{0,ran}$, $k^{*rk}_t$, $k^{*rk}_{t,ran}$, and $k^{\sim *rk}_u$, the encrypted conversion information $ct^{rk}_{S'}$, and the bases $\hat{D}^*_0$, $\hat{D}^*_t$, and $\hat{U}^*_u$, to the re-encryption device 400 in secrecy via the network. As a matter of course, the re-encryption key $rk_{\Gamma,S'}$ may be transmitted to the re-encryption device 400 by another method.

In brief, from (S401) through (S407), the decryption device 300 generates the re-encryption key $rk_{\Gamma,S'}$ by executing the RKG algorithm indicated in Formula 153-1 and Formula 153-2. Then, in (S408), the decryption device 300 transmits the generated re-encryption key $rk_{\Gamma,S'}$ to the re-encryption device 400.

$$RKG = \left( pk, sk_\Gamma := \left( \Gamma, sk_\Gamma^{CP\text{-}FE}, \right. \right.$$

$$k_0^*, \{k_t^*\}_{(t,\vec{x}_t) \in \Gamma}, \{k_u^*\}_{u=1, \ldots, d} \right), S',$$

$$\tilde{\Gamma} := (\{(u, \vec{y}_u) | \vec{y}_u \in \mathbb{F}_q^{n_u} \setminus \{\vec{0}\}, 1 \leq u \leq d\})):$$

$$\delta', \delta'_{ran} \xleftarrow{U} \mathbb{F}_q,$$

$$\vec{\varphi}', \vec{\varphi}'_{ran} \xleftarrow{U} \mathbb{F}_q^2,$$

$$\vec{\varphi}'_t, \vec{\varphi}'_{t,ran} \xleftarrow{U} \mathbb{F}_q^{z_t} \text{ for } (t, \vec{x}_t) \in \Gamma,$$

$$\vec{\varphi}'_u \xleftarrow{U} \mathbb{F}_q^{z_u} \text{ for } (u, \vec{y}_u) \in \tilde{\Gamma}$$

$$W_{1,0} \xleftarrow{U} GL(9, \mathbb{F}_q),$$

$$W_{1,t} \xleftarrow{U} GL(N_t, \mathbb{F}_q) \text{ for } (t, \vec{x}_t) \in \Gamma,$$

$$\tilde{W}_{1,u} \xleftarrow{U} GL(N_u, \mathbb{F}_q) \text{ for } (u, \vec{y}_u) \in \tilde{\Gamma}$$

$$ct^{rk}_{S'} \xleftarrow{R} Enc_{CP\text{-}FE}(pk^{CP\text{-}FE}, S',$$

$$(\{W_{1,t}\}_{t=0,(t,\vec{x}_t) \in \Gamma}, \{W_{1,u}\}_{u=(u,\vec{y}_u) \in \tilde{\Gamma}}, \Gamma, \tilde{\Gamma}))$$

[Formula 153-1]

-continued $$k_0^{*rk} := (k_0^* + (0, 0, 0^4, \vec{\varphi}', 0)_{\mathbb{B}^*})W_{1,0},$$ [Formula 153-2]

$$k_{0,ran}^{*rk} := (0, 0, 0^4, \vec{\varphi}'_{ran}, 0)_{\mathbb{B}^*}W_{1,0},$$

$$k_t^{*rk} := (k_t^* + (0^{n_t}, 0^{w_t}, \vec{\varphi}'_t, 0)_{\mathbb{B}_t^*})W_{1,t} \text{ for } (t, \vec{x}_t) \in \Gamma,$$

$$k_{t,ran}^{*rk} := (0^{n_t}, 0^{w_t}, \vec{\varphi}'_{t,ran}, 0)_{\mathbb{B}_t^*}W_{1,t} \text{ for } (t, \vec{x}_t) \in \Gamma,$$

$$\tilde{k}_{u,i}^{*rk} := \tilde{y}_{u,i}\tilde{k}_{u,i}^* + (\overbrace{0^{n_u}}^{n_u}, \overbrace{0^{w_u}}^{w_u}, \vec{\varphi}'_u, \overbrace{0}^{\tilde{z}_u-1})_{\mathbb{H}_u^*}\tilde{W}_{1,u},$$

for $(u, \vec{y}_u) \in \tilde{\Gamma}$; $i = 1, \ldots, n_u,$ $$\tilde{k}_u^{*rk} := \sum_{i=1}^{n_u} \tilde{k}_{u,i}^{*rk}(u, \vec{y}_u) \in \tilde{\Gamma},$$

$$\hat{\mathbb{D}}_0^* := (d_{0,i}^* := b_{0,i}^*W_{1,0})_{i=3,4,7,8},$$

$$\hat{\mathbb{D}}_t^* := (d_{t,i}^* := b_{0,i}^*W_{1,t})_{i=n_t+w_t+1,\ldots,n_t+w_t+z_t}$$

for $t = 1, \ldots, d,$ $$\hat{\mathbb{U}}_u^* := (d_{u,i}^* := b_{0,i}^*\tilde{W}_{1,u})_{i=n_u+w_u+1,\ldots,n_u+w_u+z_u}$$

for $u = 1, \ldots, d,$ return $rk_{\Gamma,\mathbb{S}'} := \left(\Gamma, \tilde{\Gamma}, \mathbb{S}', \{k_t^{*rk}, k_{t,ran}^{*rk}, \hat{\mathbb{D}}_t^*\}_{t=0,(t,\vec{x}_t)\in\Gamma}, \{\tilde{k}_u^{*rk}, \hat{\mathbb{U}}_u^*\}_{(u,\vec{y}_u)\in\tilde{\Gamma}}, ct_{\mathbb{S}'}^{rk}\right).$ The function and operation of the re-encryption device 400 will be described.

As indicated in FIG. 9, the re-encryption device 400 is provided with a public parameter reception part 410, a ciphertext reception part 420, a re-encryption key reception part 430, a verification part 440, an encryption part 450, and a re-ciphertext transmission part 460 (re-ciphertext output part). The verification part 440 is provided with a span program calculation part 441 and a signature verification part 442. The encryption part 450 is provided with a random number generation part 451, an f vector generation part 452, an s vector generation part 453, a conversion information $W_2$ generation part 454, a conversion information $W_2$ encryption part 455, a ciphertext $c^{renc}$ generation part 456, and a decryption key $k^{*renc}$ generation part 457.

The process of the REnc algorithm will be described with reference to FIG. 15.

(S501: Public Parameter Reception Step)
For example, with the communication device, the public parameter reception part 410 receives the public parameters pk generated by the key generation device 100, via the network.

(S502: Ciphertext Reception Step)
For example, with the communication device, the ciphertext reception part 420 receives the ciphertext $ct_S$ transmitted by the encryption device 200, via the network.

(S503: Re-encryption Key Reception Step)
For example, with the communication device, the re-encryption key reception part 430 receives the re-encryption key $rk_{\Gamma,S'}$ transmitted from the decryption device 300, via the network.

(S504: Span Program Calculation Step)
With the processing device, the span program calculation part 441 determines whether or not the access structure S included in the ciphertext $ct_S$ accepts $\Gamma$ included in the re-encryption key $rk_{\Gamma,S'}$, and determines whether or not the access structure S~ included in the ciphertext $ct_S$ accepts $\Gamma$~ included in the re-encryption key $rk_{\Gamma,S'}$. The method of determining whether or not the access structure S accepts $\Gamma$ and whether or not the access structure S~ accepts $\Gamma$~ is as described in "3. Concept for Implementing FCPRE" of Embodiment 1.

If the access structure S~ accepts $\Gamma$~ and the access structure S~ accepts $\Gamma$~ (ACCEPT in S504), the span program calculation part 441 advances the process to (S505). If the access structure S rejects $\Gamma$ or the access structure S~ rejects $\Gamma$~ (REJECT in S504), the span program calculation part 441 ends the process.

(S505: Signature Verification Step)
With the processing device, the signature verification part 442 determines whether or not the result of calculating Formula 154 is 1. If the result is 1 (VALID in S505), the signature verification part 442 advances the process to (S506). If the result is 0 (INVALID in S505), the signature verification part 442 ends the process.

Ver(verk,C,Sig)

where $$C := (\mathbb{S}, \tilde{\mathbb{S}}, \{c_i\}_{i=0,\ldots,L}, \{\tilde{c}_j\}_{j=0,\ldots,\tilde{L}}, c_T, \tilde{c}_T)$$ [Formula 154]

(S506: Random Number Generation Step)
With the processing device, the random number generation part 451 generates random numbers as indicated in Formula 155.

$$r, \sigma, \pi', \eta', \zeta' \xleftarrow{U} \mathbb{F}_q,$$ [Formula 155]

$$\vec{\varphi}'_0 \xleftarrow{U} \mathbb{F}_q^2,$$

$$\vec{\varphi}'_t \xleftarrow{U} \mathbb{F}_q^{z_t} \text{ for } (t, \vec{x}_t) \in \Gamma,$$

$$\vec{\varphi}'_u \xleftarrow{U} \mathbb{F}_q^{\tilde{z}_u} \text{ for } (u, \vec{y}_u) \in \tilde{\Gamma},$$

$$\theta'_i, \eta'_i \xleftarrow{U} \mathbb{F}_q \text{ for } i = 1, \ldots, L,$$

$$\tilde{\theta}'_j, \tilde{\eta}'_j \xleftarrow{U} \mathbb{F}_q \text{ for } j = 1, \ldots, \tilde{L}$$

(S507: f Vector Generation Step) With the processing device, the f vector generation part 452 generates vectors $\vec{r}'$ and $\vec{f}'$ randomly, as indicated in Formula 156.

$$\vec{f}' \xleftarrow{U} \mathbb{F}_q^r,$$ [Formula 156]

$$\vec{\tilde{f}}' \xleftarrow{U} \mathbb{F}_q^{\tilde{r}},$$

(S508: s Vector Generation Step)
With the processing device, the s vector generation part 453 generates vectors $\vec{s}'^T$ and $\vec{\tilde{s}}'^T$, as indicated in Formula 157.

$$\vec{s}'^T := (s_1', \ldots, s_L')^T := M \cdot \vec{f}'^T,$$

$$\vec{\tilde{s}}'^T := (\tilde{s}_1', \ldots, \tilde{s}_{\tilde{L}}')^T := \tilde{M} \cdot \vec{\tilde{f}}'^T$$ [Formula 157]

With the processing device, the s vector generation part 453 generates values $s_0'$ and $\tilde{s}_0'$, as indicated in Formula 158.

$$s_0' := \vec{1} \cdot \vec{f}'^T,$$

$$\tilde{s}_0' := \vec{1} \cdot \vec{\tilde{f}}'^T$$ [Formula 158]

(S509: Conversion Information $W_2$ Generation Step)
With the processing device, the conversion information $W_2$ generation part 454 generates conversion information $W_2$, as indicated in Formula 159.

$$W_2 \xleftarrow{R} GL(9, \mathbb{F}_q)$$ [Formula 159]

(S510: Conversion Information $W_2$ Encryption Step)

With the processing device, the conversion information $W_2$ encryption part 455 calculates Formula 160, to encrypt the conversion information $W_2$ by functional encryption, thereby generating encrypted conversion information $ct^{renc}_{S'}$ ($\phi^{renc}$). The conversion information $W_2$ is encrypted by functional encryption that takes as input the access structure S'. Hence, the conversion information $W_2$ is encrypted by setting the attribute information of the user capable of decrypting the re-ciphertext $rct_{S'}$.

$$ct^{renc}_{S'} \xleftarrow{R} Enc_{CP\text{-}FE}(pk^{CP\text{-}FE}, \mathbb{S}', W_2)$$ [Formula 160]

(S511: Ciphertext $c^{renc}$ Generation Step)

With the processing device, the ciphertext $c^{renc}$ generation part 456 generates a ciphertext $c^{-renc}_0$, as indicated in Formula 161.

$$\tilde{c}_0^{renc} := (c_0 + \tilde{c}_0 + (\zeta', -s_0' - \tilde{s}_0', \pi'(verk, 1), 0^2, 0^{2,\eta'} \mathbb{B}_0)$$ [Formula 161]

With the processing device, the ciphertext $c^{renc}$ generation part 456 generates a ciphertext $c^{renc}_i$ for each integer i of i=1, ..., L, as indicated in Formula 162.

for $i = 1, \ldots, L,$ [Formula 162]

if $\rho(i) = (t, \vec{v}_i),$ $c_i^{renc} := c_i + (s_i' \vec{e}_{t,1} + \theta_i' \vec{v}_i, \overbrace{0^{w_t}}^{n_t}, \overbrace{0^{z_t}}^{w_t}, \overbrace{\eta_i'}^{z_t})_{\mathbb{B}_t},$ if $\rho(i) = \neg (t, \vec{v}_i),$ $c_i^{renc} := c_i + (s_i' \vec{v}_i, \overbrace{0^{w_t}}^{n_t}, \overbrace{0^{z_t}}^{w_t}, \overbrace{\eta_i'}^{z_t})_{\mathbb{B}_t},$ With the processing device, the ciphertext $c^{renc}$ generation part 456 generates a ciphertext $c^{-renc}_T$, as indicated in Formula 163.

$$\tilde{c}_T^{renc} := c_T \cdot \tilde{c}_T \cdot g_T^{\zeta'}$$ [Formula 163]

With the processing device, the ciphertext $c^{renc}$ generation part 456 generates a ciphertext $c^{-renc}_j$ for each integer j of j=1, ..., L~, as indicated in Formula 164.

for $j = 1, \ldots, \tilde{L},$ [Formula 164]

if $\tilde{\rho}(j) = (u, \vec{z}_j),$ $\tilde{c}_j^{renc} := \tilde{c}_j + (\tilde{s}_i' \vec{e}_{u,1} + \tilde{\theta}_j' \vec{z}_j, \overbrace{0^{w_u}}^{n_u}, \overbrace{0^{z_u}}^{w_u}, \overbrace{\tilde{\eta}_j'}^{z_u})_{\mathbb{H}_u},$ if $\tilde{\rho}(j) = \neg (u, \vec{z}_j),$ $\tilde{c}_j^{renc} := \tilde{c}_j + (\tilde{s}_j' \vec{z}_j, \overbrace{0^{w_u}}^{n_u}, \overbrace{0^{z_u}}^{w_u}, \overbrace{\tilde{\eta}_j'}^{z_u})_{\mathbb{H}_u},$ (S512: Decryption Key $k^{*renc}$ Generation Step)

With the processing device, the decryption key $k^{*renc}$ generation part 457 generates a decryption key $k^{*renc}_0$, as indicated in Formula 165.

$$k_0^{*renc} := k_0^{*rk} + rk_{0,ran}^{*rk} + (0^2, \sigma(-1, verk), 0^2, \vec{\phi}_0', 0) \mathbb{D}_0^*$$ [Formula 165]

With the processing device, the decryption key $k^{*renc}$ generation part 457 generates a decryption key $k^{*renc}_t$ for each integer t included in the attribute set Γ, as indicated in Formula 166.

$$k_t^{*renc} := k_t^{*rk} + rk_{t,ran}^{*rk} + (0^{n_t}, 0^{w_t}, \vec{\phi}_t', 0) \mathbb{D}_t^* \text{ for } (t, \vec{x}_t) \in \Gamma$$ [Formula 166]

With the processing device, the decryption key $k^{*renc}$ generation part 457 generates a decryption key $\tilde{k}^{*renc}_u$ for each integer u included in the attribute set Γ~, as indicated in Formula 167.

$$\tilde{k}_u^{*renc} := \tilde{k}_u^{*rk} + (0^{n_u}, 0^{w_u}, \vec{\phi}_u', 0) \tilde{\mathbb{U}}_u^* \text{ for } (u, \vec{y}_u) \in \tilde{\Gamma}$$ [Formula 167]

(S513: Re-Ciphertext Transmission Step)

For example, with the communication device, the re-ciphertext transmission part 460 transmits the re-ciphertext $rct_{S'}$ constituted as elements by the access structures S', S, and S~, the attribute sets Γ and Γ~, the decryption keys $k^{*renc}_0$, $k^{*renc}_t$, and $\tilde{k}^{*renc}_u$, the ciphertexts $c^{-renc}_0$, $c^{renc}_i$, $c^{renc}_T$, and $\tilde{c}^{-renc}_j$, the encrypted conversion information $ct^{rk}_{S'}$, and the encrypted conversion information $ct^{renc}_{S'}$, to the re-ciphertext decryption device 500 in secrecy via the network. The re-ciphertext $rct_{S'}$ may be transmitted to the decryption device 500 by another method, as a matter of course.

In brief, from (S501) through (S512), the re-encryption device 400 executes the REnc algorithm indicated in Formula 168-1, Formula 168-2, and Formula 168-3, to generate the re-ciphertext $rct_{S'}$. In (S513), the re-encryption device 400 transmits the generated re-ciphertext $rct_{S'}$ to the re-ciphertext decryption device 500.

$$REnc = \left(pk, rk_{\Gamma,\mathbb{S}'} := \left(\Gamma, \mathbb{S}'\{k_t^{*rk}, k_{t,ran}^{*rk}, \hat{\mathbb{D}}_t^*\}_{(t,\vec{x}_t) \in \Gamma},\right.\right.$$ [Formula 168-1]

$$\{\tilde{k}_u^{*rk}, \hat{\mathbb{U}}_u^*\}_{(u, \vec{y}_u) \in \tilde{\Gamma}}, ct^{rk}_{\mathbb{S}'}\right),$$

$$ct_\mathbb{S} := (C := (\mathbb{S}, \tilde{\mathbb{S}},$$

$$\{c_i\}_{i=0,\ldots,L}, \{\tilde{c}_j\}_{j=0,\ldots,\tilde{L}}, c_T, \tilde{c}_T),$$

$$verk, Sig))$$

If $\mathbb{S}$ accepts Γ, $\tilde{\mathbb{S}}$ accepts $\tilde{\Gamma}$, and Ver(verk,C,Sig)=1 then compute following $$r, \sigma, \pi', \eta', \zeta' \xleftarrow{U} \mathbb{F}_q, \vec{\phi}_0' \xleftarrow{U} \mathbb{F}_q^2,$$

$$\vec{\phi}_t' \xleftarrow{U} \mathbb{F}_q^{n_t} \text{ for } (t, \vec{x}_t) \in \Gamma,$$

$$\vec{\phi}_u' \xleftarrow{U} \mathbb{F}_q^{n_t} \text{ for } (u, \vec{y}_u) \in \tilde{\Gamma},$$

$$\vec{f}' \xleftarrow{U} \mathbb{F}_q^r, \vec{s}'^T := (s_1', \ldots, s_L')^T := M \cdot \vec{f}'^T,$$

$$\vec{\tilde{f}}' \xleftarrow{U} \mathbb{F}_q^{\tilde{r}}, \vec{\tilde{s}}'^T := (\tilde{s}_1', \ldots, \tilde{s}_{\tilde{L}}')^T := \tilde{M} \cdot \vec{\tilde{f}}'^T,$$

$$s_0' := \vec{1} \cdot \vec{f}'^T,$$

$$\tilde{s}_0' := \vec{1} \cdot \vec{\tilde{f}}'^T,$$

$$W_2 \xleftarrow{R} GL(9, \mathbb{F}_q),$$

$$ct^{renc}_{\mathbb{S}'} \xleftarrow{R} Enc_{CP\text{-}FE}(pk^{CP\text{-}FE}, \mathbb{S}', W_2),$$

$$\tilde{c}_0^{renc} := (c_0 + \tilde{c}_0 + (\zeta', -s_0', \tilde{s}_0', \pi'(verk, 1), 0^2,$$

$$0^2, \eta') \mathbb{B}_0) W_2,$$

$$\tilde{c}_T^{renc} := c_T \cdot \tilde{c}_T \cdot g_T^{\zeta'},$$

-continued for $i = 1, \ldots, L$, [Formula 168-2]

if $\rho(i) = (t, \vec{v}_i := (v_{i,1}, \ldots, v_{i,n_t}) \in \mathbb{F}_q^{n_t} \setminus \{\vec{0}\})(v_{i,n_t} \neq 0)$, $\theta'_i, \eta'_i \xleftarrow{U} \mathbb{F}_q$, $c_i^{renc} := c_i + (\overline{s_i \vec{e}_{t,1} + \theta'_i \vec{v}_i}^{n_t}, \overline{0^{w_t}, 0^{z_t}}^{w_t}, \overline{\eta'_i}^{1})_{\mathbb{B}_t}$, if $\rho(i) = \neg (t, \vec{v}_i), \eta'_i \xleftarrow{U} \mathbb{F}_q$, $c_i^{renc} := c_i + (\overline{s_i \vec{v}_i}^{n_t}, \overline{0^{w_t}, 0^{z_t}}^{w_t}, \overline{\eta'_i}^{1})_{\mathbb{B}_t}$, for $j = 1, \ldots, \tilde{L}$, if $\tilde{\rho}(j) =$ $(u, \vec{z}_j := (z_{j,1}, \ldots, z_{j,n_u}) \in \mathbb{F}_q^{n_u} \setminus \{\vec{0}\})(z_{j,n_u} \neq 0)$, $\tilde{\theta}'_j, \tilde{\eta}'_j \xleftarrow{U} \mathbb{F}_q$, $\tilde{c}_j^{renc} := \tilde{c}_j + (\overline{\tilde{s}_j \vec{e}_{u,1} + \tilde{\theta}'_u \vec{z}_j}^{n_u}, \overline{0^{w_u}, 0^{z_u}}^{w_u}, \overline{\tilde{\eta}'_j}^{1})_{\mathbb{H}_u}$, if $\tilde{\rho}(j) = \neg (u, \vec{z}_j), \tilde{\eta}'_i \xleftarrow{U} \mathbb{F}_q$, $\tilde{c}_j^{renc} := \tilde{c}_j + (\overline{\tilde{s}'_j \vec{z}_j}^{n_u}, \overline{0^{w_u}, 0^{z_u}}^{w_u}, \overline{\tilde{\eta}'_j}^{1})_{\mathbb{H}_u}$, $k_0^{*renc} := k_0^{*rk} + rk_{0,ran}^{*rk} + \begin{pmatrix} 0^2, \sigma(-1, verk), \\ 0^2, \vec{\varphi}'_0, 0 \end{pmatrix}_{\mathbb{D}_0^*}$, [Formula 168-3]

$k_t^{*renc} :=$
$k_t^{*rk} + rk_{0,ran}^{*rk} + (0^{n_t}, 0^{w_t}, \vec{\varphi}'_t, 0)_{\mathbb{D}_t^*}$ for $(t, \vec{x}_t) \in \Gamma$, $\tilde{k}_u^{*renc} := \tilde{k}_u^{*rk} + (0^{n_u}, 0^{w_u}, \vec{\varphi}'_u, 0)_{\mathbb{U}_u^*}$ for $(u, \vec{y}_u) \in \tilde{\Gamma}$, return $rct_{S'} := (S', \mathbb{S}, \tilde{\mathbb{S}}, \Gamma, \tilde{\Gamma}, \{k_t^{*renc}\}_{t=0,(t,\vec{x}_t) \in \Gamma},$ $\{k_u^{*renc}\}_{(u,\vec{y}_u) \in \tilde{\Gamma}}, \{c_i^{renc}\}_{i=1,\ldots,L},$ $\{\tilde{c}_j^{renc}\}_{j=0,\ldots,\tilde{L}}, \tilde{c}_T^{renc}, ct_S^{rk}, ct_S^{renc})$.

The function and operation of the re-ciphertext decryption device 500 will be described.

As illustrated in FIG. 10, the re-ciphertext decryption device 500 is provided with a decryption key reception part 510, a ciphertext reception part 520, a span program calculation part 530, a complementary coefficient calculation part 540, a conversion information generation part 550, a conversion part 560, a pairing operation part 570, and a message calculation part 580. The pairing operation part 570 and the message calculation part 580 will be collectively referred to as a decryption part.

The process of the Dec1 algorithm will be described with reference to FIG. 16.

(S601: Decryption Key Reception Step)
For example, with the communication device, the decryption key reception part 510 receives the decryption key $sk_{\Gamma'}$ transmitted from the key generation device 100, via the network. The decryption key reception part 510 also receives the public parameters pk generated by the key generation device 100.

(S602: Ciphertext Reception Step)
For example, with the communication device, the ciphertext reception part 520 receives the re-ciphertext $rct_{S'}$ transmitted by the re-encryption device 400, via the network.

(S603: Span Program Calculation Step)
With the processing device, the span program calculation part 530 determines whether or not the access structure S' included in the re-ciphertext $rct_{S'}$ accepts $\Gamma$ included in the decryption key $sk_{\Gamma'}$, and determines whether or not the access structure $S^\sim$ included in the re-ciphertext $rct_{S'}$ accepts $\Gamma^\sim$ included in the re-ciphertext $rct_{S'}$. The method of determining whether or not the access structure S' accepts $\Gamma$ and whether or not the access structure $S^\sim$ accepts $\Gamma^\sim$ is as described in "3. Concept for Implementing FCPRE" of Embodiment 1.

If the access structure S' accepts and the access structure $S^\sim$ accepts $\Gamma^\sim$ (ACCEPT in S603), the span program calculation part 530 advances the process to (S604). If the access structure S' rejects $\Gamma$ or the access structure $S^\sim$ rejects $\Gamma^\sim$ (REJECT in S603), the span program calculation part 530 ends the process.

(S604: Complementary Coefficient Calculation Step)
With the processing device, the complementary coefficient calculation part 540 calculates I and J and constants (complementary coefficients) $\{\alpha_i\}_{i \in I}$ and $\{\tilde{\alpha}_j\}_{j \in J}$ which satisfy Formula 169.

$$\vec{1} = \sum_{i \in I} \alpha_i M_i, \vec{1} = \sum_{j \in J} \tilde{\alpha}_j \tilde{M}_j \quad \text{[Formula 169]}$$

where $M_i$ is the i-th row of M, $\tilde{M}_j$ is the j-th row of $\tilde{M}$ and $I \subseteq \{i \in \{1, \ldots, L\} | [\rho(i) = (t, \vec{v}_i) \wedge (t, \vec{x}_t) \in \Gamma \wedge \vec{v}_i \cdot \vec{x}_t = 0]$
$\vee [\rho(i) = \neg (t, \vec{v}_i) \wedge (t, \vec{x}_t) \in \Gamma \wedge \vec{v}_i \cdot \vec{x}_t \neq 0]\}$, $J \subseteq \{j \in \{1, \ldots, \tilde{L}\} | [\tilde{\rho}(j) = (u, \vec{z}_j) \wedge (u, \vec{y}_u) \in \tilde{\Gamma} \wedge \vec{z}_j \cdot$
$\vec{y}_u = 0] \vee [\tilde{\rho}(j) = \neg (u, \vec{z}_j) \wedge (u, \vec{y}_u) \in \tilde{\Gamma} \wedge \vec{z}_j \cdot \vec{y}_u \neq 0]\}$ (S605: Conversion Information Generation Step)
With the processing device, the conversion information generation part 550 generates the conversion information $W_{1,0}, W_{1,t}, W^\sim_{1,u}$, and $W_2$, as indicated in Formula 170.

$$(\{W_{1,t}\}_{t=0,(t,\vec{x}_t) \in \Gamma}, \quad \text{[Formula 170]}$$
$$\{W_{1,u}\}_{u=(u,\vec{y}_u) \in \tilde{\Gamma}}, \Gamma, \tilde{\Gamma}) \xleftarrow{R}$$
$$Dec_{CP\text{-}FE}\left(pk^{CP\text{-}FE}, sk_{\Gamma'}^{CP\text{-}FE}, ct_S^{rk}\right),$$
$$\tilde{W}_2 \xleftarrow{R} Dec_{CP\text{-}FE}\left(pk^{CP\text{-}FE}, sk_{\Gamma'}^{CP\text{-}FE}, ct_S^{renc}\right)$$

(S606: Conversion Step)
With the processing device, the conversion part 560 generates the decryption keys $k^*_0, k^*_t$, and $k^{\sim*}_u$, and generates the ciphertext $c^\sim_0$, as indicated in Formula 171.

$k_0^* := k_0^{*renc} W_{1,0}^{-1}$, $k_t^* := k_t^{*renc} W_{1,t}^{-1}$ for $(t, \vec{x}) \in \Gamma$, $\vec{k}_u^* := k_u^{*renc} W_{1,u}^{-1}$ for $(u, \vec{y}) \in \tilde{\Gamma}$, $\tilde{c}_0 := \tilde{c}_0^{renc} W_2^{-1}$ [Formula 171]

(S607: Pairing Operation Step)
With the processing device, the pairing operation part 570 calculates Formula 172, to generate a session key $K^\sim$.

$$\tilde{K} := e(\tilde{c}_0, k_0^*) \prod_{i \in I \wedge \rho(i)=(t,\vec{v}_i)} e(c_i^{renc}, k_t^*)^{\alpha_i} \quad \text{[Formula 172]}$$
$$\prod_{i \in I \wedge \rho(i)=\neg(t,\vec{v}_i)} e(c_i^{renc}, k_t^*)^{\alpha_i/(\vec{v}_i \cdot \vec{x}_t)}$$

$$\prod_{j\in \tilde{I}\wedge\tilde{\rho}(j)=(u,\vec{z}_j)} e\left(\tilde{c}_j^{renc}, \tilde{k}_u^*\right)^{\tilde{\alpha}_j}$$

$$\prod_{j\in \tilde{I}\wedge\tilde{\rho}(j)=\neg(u,\vec{z}_j)} e\left(\tilde{c}_j^{renc}, \tilde{k}_u^*\right)^{\tilde{\alpha}_j/(\vec{z}_j\cdot\vec{y}_u)}$$

(S608: Message Calculation Step)

With the processing device, the message calculation part 580 calculates $m'=c^{\sim renc}{}_T/K^{\sim}$, to generate a message m' (=m).

In brief, from (S601) through (S608), the re-ciphertext decryption device 500 executes the Dec1 algorithm indicated in Formula 173-1 and Formula 173-2, to generate the message message m' (=m).

$Dec_1(rct\mathbb{S}':=(\mathbb{S}',\mathbb{S},\tilde{\mathbb{S}},\Gamma,\tilde{\Gamma},$
$\{k_t^{*renc}\}_{t=0,(t,\vec{x}_t)\in\Gamma},\{k_u^{*renc}\}_{(u,\vec{y}_u)\in\tilde{\Gamma}},$
$\{c_i^{renc}\}_{i=1,\ldots,L},\{\tilde{c}_j^{renc}\}_{j=0,\ldots,\tilde{L}},\tilde{c}_T^{renc},c\overset{rk}{\mathbb{S}'},$
$ct_{\mathbb{S}'}^{renc},sk_\Gamma:=(\Gamma',sk_{\Gamma'}^{CP\text{-}FE},k_0^*,$
$\{k_t^*\}_{(t,\vec{x}_t)\in\Gamma'},\{k_u^*\}_{u=1,\ldots,d}))$     [Formula 173-1]

If $\mathbb{S}'$ accepts $\Gamma'''$ and $\tilde{\mathbb{S}}$ accepts $\tilde{\Gamma}$,
then compute I, J and $\{\alpha_i\}_{i\in I}$, $\{\tilde{\alpha}_j\}_{j\in J}$ such that $\vec{1}=\Sigma_{i\in I}\alpha_i M_i, \vec{1}=\Sigma_{j\in J}\tilde{\alpha}_j\tilde{M}_j$ where $M_i$ is the i-th row of M, $\tilde{M}_j$ is the j-th row of $\tilde{M}$ and $I\subseteq\{i\in\{1,\ldots,L\}\,|\,[\rho(i)=(t,\vec{v}_i)\wedge(t,\vec{x}_t)\in\Gamma\wedge\vec{v}_i\cdot\vec{x}_t=0]\vee[$
$\rho(i)=\neg(t,\vec{v}_i)\wedge(t,\vec{x}_t)\in\Gamma\wedge\vec{v}_i\cdot\vec{x}_t\neq 0]\},$ $J\subseteq\{j\in\{1,\ldots,\tilde{L}\}\,|\,[\tilde{\rho}(j)=(u,\vec{z}_j)\wedge(u,\vec{y}_u)\in\tilde{\Gamma}\wedge\vec{z}_j\cdot\vec{y}_u=0]\vee[$
$\tilde{\rho}(j)=\neg(u,\vec{z}_j)\wedge(u,\vec{y}_u)\in\tilde{\Gamma}\wedge\vec{z}_j\cdot\vec{y}_u\neq 0]\},$ $(\{W_{1,t}\}_{t=0,(t,\vec{x}_t)\in\Gamma},\{W_{1,u}\}_{u=(u,\vec{y}_u)\in\tilde{\Gamma}},\Gamma,\tilde{\Gamma})\overset{R}{\leftarrow}$ $Dec_{CP\text{-}FE}\left(pk^{CP\text{-}FE},sk_{\Gamma'}^{CP\text{-}FE},ct_{\mathbb{S}}^{rk}\right),$ $\tilde{W}_2 \overset{R}{\leftarrow} Dec_{CP\text{-}FE}\left(pk^{CP\text{-}FE},sk_{\Gamma'}^{CP\text{-}FE},ct_{\mathbb{S}}^{renc}\right),$ $k_0^* := k_0^{*renc} W_{1,0}^{-1},$     [Formula 173-2]
$k_t^* := k_t^{*renc} W_{1,t}^{-1}$ for $(t,\vec{x})\in\Gamma,$
$\tilde{k}_u^* := k_u^{*renc} \tilde{W}_{1,u}^{-1}$ for $(u,\vec{y})\in\tilde{\Gamma},$
$\tilde{c}_0 := \tilde{c}_0^{renc} W_2^{-1},$ $\tilde{K} := e(\tilde{c}_0, k_0^*) \prod_{i\in I\wedge\rho(i)=(t,\vec{v}_i)} e(c_i^{renc}, k_t^*)^{\alpha_i}$ $\prod_{i\in I\wedge\rho(i)=\neg(t,\vec{v}_i)} e(c_i^{renc}, k_t^*)^{\alpha_i/(\vec{v}_i\cdot\vec{x}_t)}$ $\prod_{j\in \tilde{I}\wedge\tilde{\rho}(j)=(u,\vec{z}_j)} e\left(\tilde{c}_j^{renc}, \tilde{k}_u^*\right)^{\tilde{\alpha}_j}$ $\prod_{j\in \tilde{I}\wedge\tilde{\rho}(j)=\neg(u,\vec{z}_j)} e\left(\tilde{c}_j^{renc}, \tilde{k}_u^*\right)^{\tilde{\alpha}_j/(\vec{z}_j\cdot\vec{y}_u)},$ $m' := \tilde{c}_T^{renc}/\tilde{K},$ return $m'$.

The process of the Dec2 algorithm will be described with reference to FIG. 17.

(S701: Decryption Key Reception Step)

For example, with the communication device, the decryption key reception part 310 receives the decryption key $sk_\Gamma$ transmitted from the key generation device 100, via the network. The decryption key reception part 310 also receives the public parameters pk generated by the key generation device 100.

(S702: Ciphertext Reception Step)

For example, with the communication device, the ciphertext reception part 350 receives the ciphertext $ct_S$ transmitted by the re-encryption device 400, via the network.

(S703: Span Program Calculation Step)

With the processing device, the span program calculation part 361 determines whether or not the access structure S included in the ciphertext $ct_S$ accepts $\Gamma$ included in the decryption key $sk_\Gamma$. The method of determining whether or not the access structure S accepts $\Gamma$ is as described in "3. Concept for Implementing FCPRE" of Embodiment 1.

If the access structure S accepts $\Gamma$ (ACCEPT in S703), the span program calculation part 361 advances the process to (S704). If the access structure S rejects $\Gamma$ (REJECT in S703), the span program calculation part 361 ends the process.

(S704: Signature Verification Step)

With the processing device, the signature verification part 362 determines whether or not the result of calculating Formula 174 is 1. If the result is 1 (VALID in S704), the signature verification part 362 advances the process to (S705). If the result is 0 (INVALID in S704), the signature verification part 362 ends the process.

Ver(verk,C,Sig)

where $C:=(\mathbb{S},\tilde{\mathbb{S}},\{c_i\}_{i=0,\ldots,L},\{\tilde{c}_j\}_{j=0,\ldots,\tilde{L}},c_T,\tilde{c}_T)$     [Formula 174]

(S705: Complementary Coefficient Calculation Step)

With the processing device, the complementary coefficient calculation part 370 calculates I and a constant (complementary coefficients) $\{\alpha_i\}_{i\in I}$ which satisfy Formula 175.

$\vec{1} = \sum_{i\in I} \alpha_i M_i$     [Formula 175]

where $M_i$ is the i-th row of M, and $I\subseteq\{i\in\{1,\ldots,L\}\,|\,[$ $\rho(i) = (t,\vec{v}_i)\wedge(t,\vec{x}_t)\in\Gamma\wedge\vec{v}_i\cdot\vec{x}_t = 0]\vee[$ $\rho(i) = \neg(t,\vec{v}_i)\wedge(t,\vec{x}_t)\in\Gamma\wedge\vec{v}_i\cdot\vec{x}_t \neq 0]\}$ (S706: Pairing Operation Step)

With the processing device, the pairing operation part 380 calculates Formula 176, to generate a session key K.

$K := e(c_0, k_0^*) \cdot \prod_{i\in I\wedge\rho(i)=(t,\vec{v}_i)}$     [Formula 176]

$e(c_i, k_t^*)^{\alpha_i} \cdot \prod_{i\in I\wedge\rho(i)=\neg(t,\vec{v}_i)} e(c_i, k_t^*)^{\alpha_i/(\vec{v}_i\cdot\vec{x}_t)}$ (S707: Message Calculation Step)

With the processing device, the message calculation part 390 calculates $m'=c_T/K$, to generate a message m' (=m).

In brief, from (S701) through (S707), the decryption device 300 executes the Dec2 algorithm indicated in Formula 177, to generate the message message m' (=m).

$$Dec_2(pk, sk_\Gamma := (\Gamma, sk_\Gamma^{CP\text{-}FE}, k_0^*, \{k_t^*\}_{(t,\vec{x}_t) \in \Gamma},$$
$$\{k_u^*\}_{u=1,\ldots,d}), ct_\mathbb{S} := (C := (\mathbb{S}, \tilde{\mathbb{S}},$$
$$\{c_i\}_{i=0,\ldots,L}, \{\tilde{c}_j\}_{j=0/L}, c_T, \tilde{c}_T), verk, Sig)):$$ [Formula 177]

If $\mathbb{S}$ accepts $\Gamma := \{(t, \vec{x}_t)\}$
and Ver(verk,C,Sig)=1,
then compute $I$ and $\{\alpha_i\}_{i \in I}$ such that $$\vec{1} = \sum_{i \in I} \alpha_i M_i$$

where $M_i$ is the i-th row of M,
and $$I \subseteq \{i \in \{1, \ldots, L\} \mid [\rho(i) = (t, \vec{v}_i) \land (t, \vec{x}_t) \in \Gamma \land \vec{v}_i \cdot \vec{x}_t = 0]$$
$$\lor [\rho(i) = \neg(t, \vec{v}_i) \land (t, \vec{x}_t) \in \Gamma \land \vec{v}_i \cdot \vec{x}_t \neq 0]\}$$

$$K := e(c_0, k_0^*) \cdot \prod_{i \in I \land \rho(i) = (t, \vec{v}_i)} \quad [\text{Formula 176}]$$
$$e(c_i, k_t^*)^{\alpha_i} \cdot \prod_{i \in I \land \rho(i) = \neg(t, \vec{v}_i)} e(c_i, k_t^*)^{\alpha_i / (\vec{v}_i \cdot \vec{x}_t)}$$

$m' = c_T / K$, return $m'$.

As described above, the cryptographic system according to Embodiment 1 is capable of implementing the CP-FCPRE scheme. Therefore, with a single re-encryption key, a ciphertext can be transferred to a group of various types of users. Furthermore, a condition for designating a ciphertext to be re-encrypted can be designated.

In the above explanation, the decryption device 300 also serves as a re-encryption key generation device, and the decryption device 300 executes not only the Dec2 algorithm but also the RKG algorithm. Alternatively, the decryption device 300 and the re-encryption key generation device may be separate devices. In this case, the decryption device 300 executes the Dec2 algorithm and the re-encryption key generation device executes the RKG algorithm. Accordingly, in this case, the decryption device 300 is provided with a functional configuration necessary for executing the Dec2 algorithm, and the re-encryption key generation device is provided with a functional configuration necessary for executing the RKG algorithm.

In the above explanation, $n_t + w_t + z_t + 1$ is set to $N_t$. Alternatively, $n_t + w_t + z_t + \beta_t$ may be set to $N_t$ where $\beta_t$ is an integer of not less than 0.

In the above explanation, 9 is set to $N_0$. Alternatively, $1+1+2+w_0+z_0+\beta_0$ may be set to $N_0$ where $w_0$, $z_0$, and $\beta_0$ are each an integer of not less than 0.

In the above explanation, $\pi'(verk, 1)$ in the ciphertext $c^{\sim renc}_0$ generated in S511 is additional information H, and $\sigma(-1, verk)$ in the decryption key $k^{*renc}_0$ generated in S512 is additional information $\Theta$. The additional information H and $\Theta$ are related to each other, and are canceled by the pairing operation executed in S607.

Embodiment 2

In Embodiment 1, the CP-FCPRE scheme has been described. In Embodiment 2, a key-policy FCPRE (KP-FCPRE) scheme will be described.

First, the basic structure of the KP-FCPRE scheme will be described. Subsequently, the basic structure of a cryptographic processing system 10 that implements the KP-FCPRE scheme will be described. Also, components employed to implement the KP-FCPRE scheme will be described. Then, the KP-FCPRE scheme and the cryptographic processing system 10 according to this embodiment will be described in detail.

The structure of the KP-FCPRE scheme will be briefly described. KP (key policy) signifies that Policy is embedded in the key, namely, an access structure is embedded in the key.

<1-1. Basic Structure of KP-FCPRE Scheme>

The KP-FCPRE scheme consists of seven algorithms: Setup, KG, Enc, RKG,
REnc, Dec1, and Dec2.

(Setup)

The Setup algorithm is a randomized algorithm that takes as input a security parameter $\lambda$ and attribute format $\vec{n} := (d; n_1, \ldots, n_d; w_1, \ldots, w_d; z_1, \ldots, z_d)$, and outputs public parameters pk and a master key sk.

(KG)

The KG algorithm is a randomized algorithm that takes as input an access structure $S = (M, \rho)$, the public parameters pk, and the master key sk, and outputs a decryption key $sk_S$.

(Enc)

The Enc algorithm is a randomized algorithm that takes as input a message m, attribute sets $\Gamma := \{(t, \vec{x}_t) \mid \vec{x}_t \in F_q^{n_t}, 1 \leq t \leq d\}$ and $\Gamma^\sim := \{(u, \vec{y}_u) \mid \vec{y}_u \in F_q^{n_u}, 1 \leq t \leq d\}$, and the public parameters pk, and outputs a ciphertext $ct_\Gamma$.

(RKG)

The RKG algorithm is a randomized algorithm that takes as input the decryption key $sk_S$, an attribute set $\Gamma' := \{(t, x'_t) \mid x'_t \in F_q^{n_t}, 1 \leq t \leq d\}$, an access structure $S^\sim = (M^\sim, \rho^\sim)$, and the public parameters pk, and outputs a re-encryption key $rk_{S, \Gamma'}$.

(REnc)

The REnc algorithm is a randomized algorithm that takes as input the ciphertext $ct_\Gamma$, the re-encryption key $rk_{S, \Gamma'}$, and the public parameters pk, and outputs a re-ciphertext $rct_{\Gamma'}$.

(Dec1)

The Dec1 algorithm is an algorithm that takes as input the re-ciphertext $rct_{\Gamma'}$, a decryption key $sk_{S^\sim}$, and the public parameters pk, and outputs the message m or distinguished symbol $\perp$.

(Dec2)

The Dec2 algorithm is an algorithm that takes as input the ciphertext $ct_\Gamma$, the decryption key $sk_S$, and the public parameters pk, and outputs the message m or distinguished symbol $\perp$.

<1-2. Cryptographic Processing System 10>

The cryptographic processing system 10 that implements the algorithm of the KP-FCPRE scheme will be described.

Figure 18:
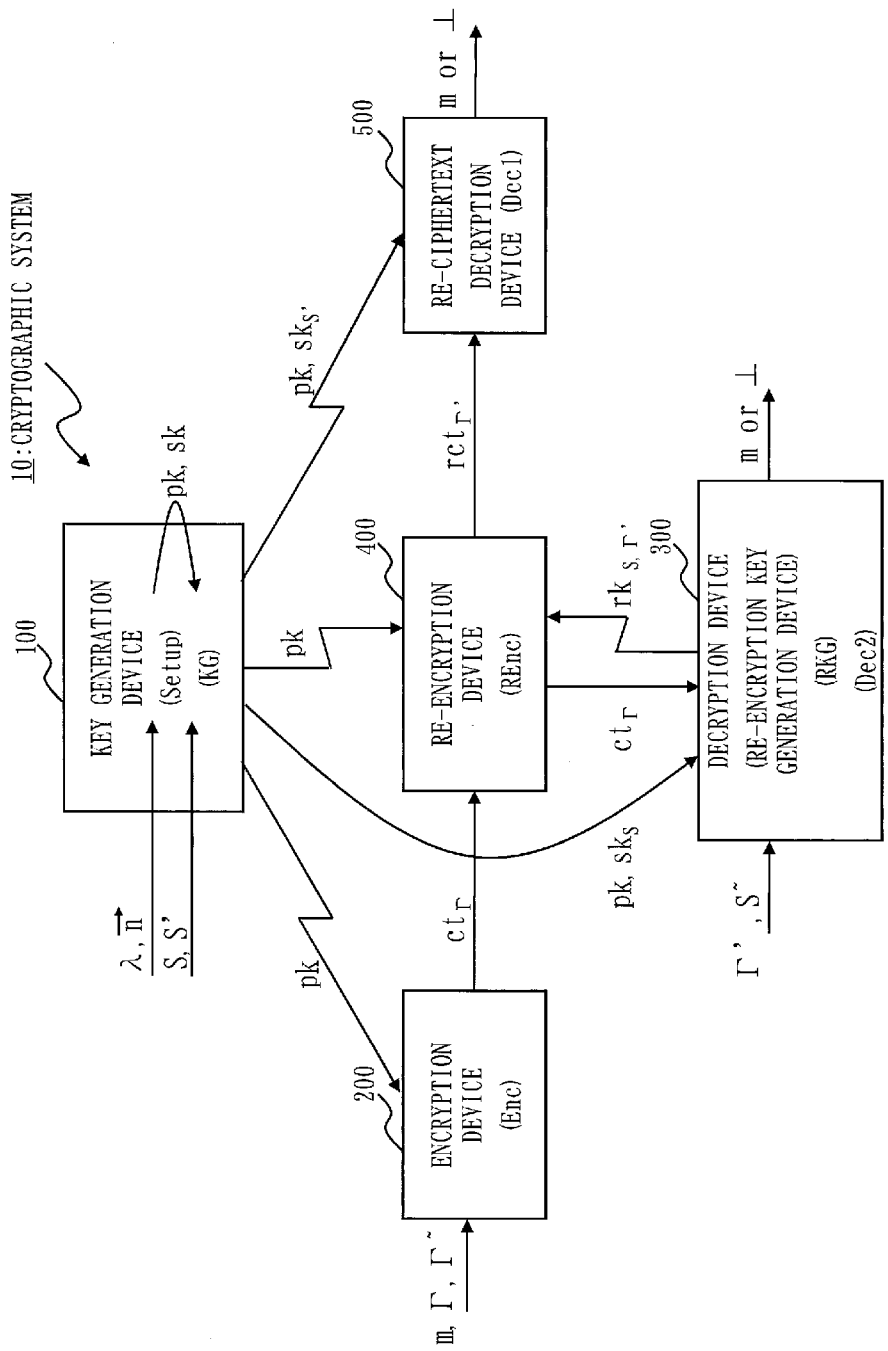
FIG. 18 is a configuration diagram of a cryptographic processing system 10 that executes KP-FCPRE scheme.

FIG. 18 is a configuration diagram of the cryptographic processing system 10 that executes the KP-FCPRE scheme.

The cryptographic processing system 10 is provided with a key generation device 100, an encryption device 200, a decryption device 300 (re-encryption key generation device), a re-encryption device 400, and a re-ciphertext decryption device 500, as the cryptographic processing system 10 illustrated in FIG. 5 is.

The key generation device 100 executes the Setup algorithm by taking as input the security parameter $\lambda$ and the attribute format $\vec{n} := (d; n_1, \ldots, n_d; w_1, \ldots, w_d; z_1, \ldots, z_d)$, and generates the public parameters pk and the master key sk.

Then, the key generation device 100 publicizes the public parameters pk. The key generation device 100 also executes the KG algorithm by taking as input the access structure S, to generate the decryption key $sk_S$, and transmits the decryption key $sk_S$ to the decryption device 300 in secrecy. The key generation device 100 also executes the KG algorithm by taking as input an access structure S', to generate the decryption key $sk_{S'}$, and transmits the decryption key $sk_{S'}$ to the re-ciphertext decryption device 500 in secrecy.

The encryption device 200 executes the Enc algorithm by taking as input the message m, the attribute sets $\Gamma$ and $\Gamma^\sim$, and the public parameters pk, to generate the ciphertext $ct_\Gamma$. The encryption device 200 transmits the ciphertext $ct_\Gamma$ to the re-encryption device 400.

The decryption device 300 executes the RKG algorithm by taking as input the public parameters pk, the decryption key $sk_S$, the attribute set $\Gamma'$, and the access structure $S^\sim$, to generate the re-encryption key $rk_{S',\Gamma'}$. The decryption device 300 transmits the re-encryption key $rk_{S',\Gamma'}$ to the re-encryption device 400 in secrecy.

The decryption device 300 also executes the Dec2 algorithm by taking as input the public parameters pk, the decryption key $sk_S$, and the ciphertext $ct_\Gamma$, and outputs the message m or distinguished symbol $\perp$.

The re-encryption device 400 executes the REnc algorithm by taking as input the public parameters pk, the re-encryption key $rk_{S,\Gamma'}$, and the ciphertext $ct_\Gamma$, to generate the re-ciphertext $rct_{\Gamma'}$. The re-encryption device 400 transmits the re-ciphertext $rct_{\Gamma'}$ to the re-ciphertext decryption device 500.

The re-ciphertext decryption device 500 executes the Dec1 algorithm by taking as input the public parameters pk, the decryption key $sk_{S'}$, and the re-ciphertext $rct_{\Gamma'}$, and outputs the message m or distinguished symbol $\perp$.

<1-3. Components Employed to Implement KP-FCPRE Scheme>

Key-policy functional encryption (KP-FE) and one-time signature are employed to implement the KP-FCPRE scheme. Since KP-FE and the one-time signature are both known technique, a scheme employed in the following description will be briefly explained. Patent Literature 1 describes an example of the KP-FE scheme. The one-time signature has been described in Embodiment 1 and a decryption thereof will accordingly be omitted here.

The KP-FE scheme consists of four algorithms: $Setup_{KP-FE}$, $KG_{KP-FE}$, $Enc_{KP-FE}$, and $Dec_{KP-FE}$.

($Setup_{KP-FE}$)

The $Setup_{KP-FE}$ algorithm is a randomized algorithm that takes as input a security parameter $\lambda$ and attribute format $n^\rightarrow := (d; n_1, \ldots, n_d)$, and outputs public parameters $pk^{KP-FE}$ and a master key $sk^{KP-FE}$.

($KG_{KP-FE}$)

The $KG_{KP-FE}$ algorithm is a randomized algorithm that takes as input an access structure $S=(M,\rho)$, the public parameters $pk^{KP-FE}$, and the master key $sk^{KP-FE}$, and outputs a decryption key $sk_S^{KP-FE}$.

($Enc_{KP-FE}$)

The $Enc_{KP-FE}$ algorithm is a randomized algorithm that takes as input a message m, the attribute set $\Gamma := \{(t, x^\rightarrow_t) | x^\rightarrow_t \in F_q^{n_t}, 1 \le t \le d\}$, and the public parameters $pk_{CP-FE}$, and outputs a ciphertext $\phi$.

($Dec_{KP-FE}$)

The $Dec_{KP-FE}$ algorithm is an algorithm that takes as input the ciphertext $\phi$, the decryption key $sk_S^{KP-PE}$, and the public parameters $pk^{KP-FE}$, and outputs the message m or distinguished symbol $\perp$.

<1-4. KP-FCPRE Scheme and Cryptographic Processing System 10 in Detail)

The KP-FCPRE scheme, and the function and operation of the cryptographic processing system 10 which executes the KP-FCPRE scheme will be described with reference to FIGS. 19 to 29.

Figure 19:
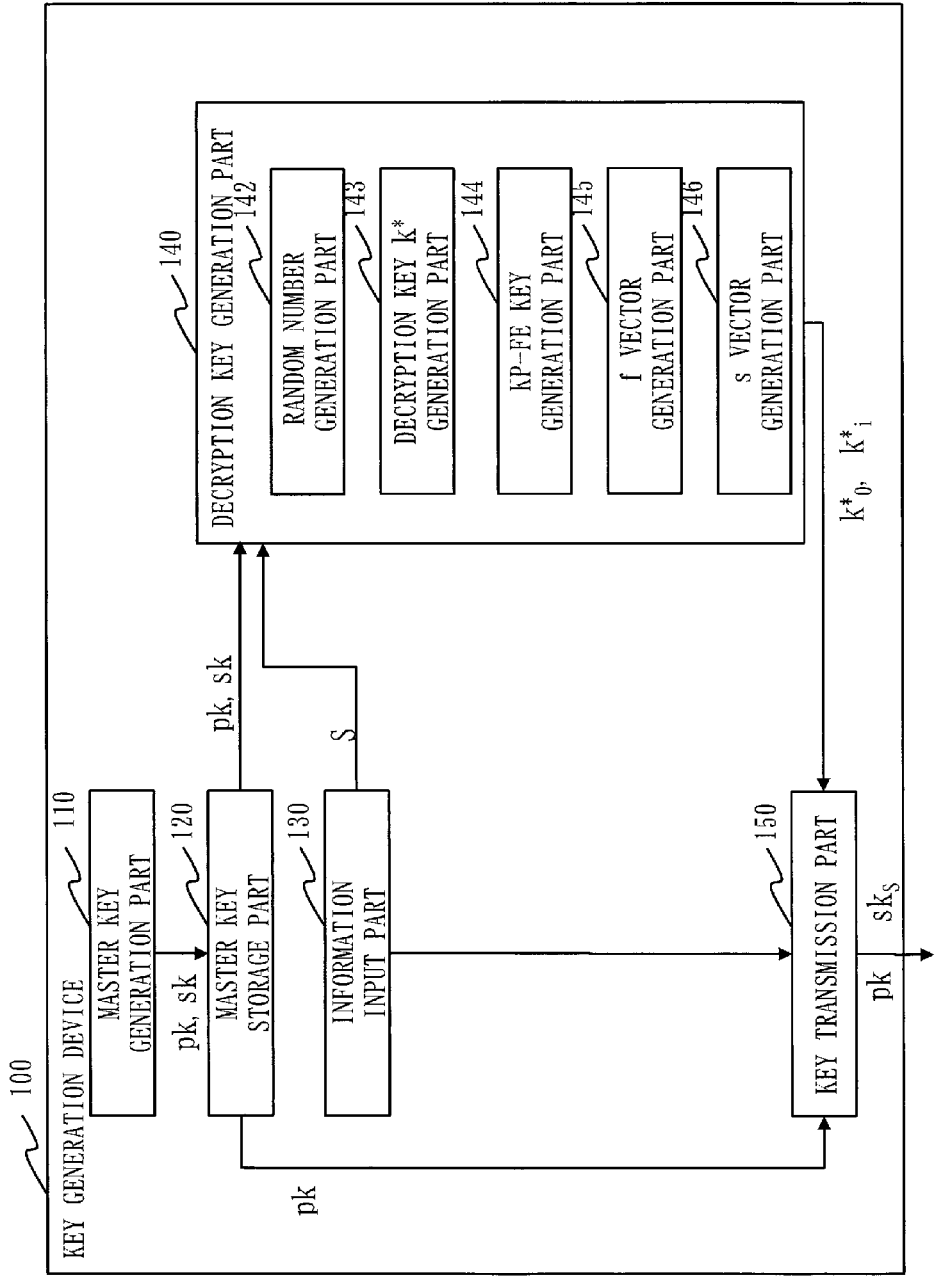
FIG. 19 is a functional block diagram illustrating a function of a key generation device 100.
Figure 20:
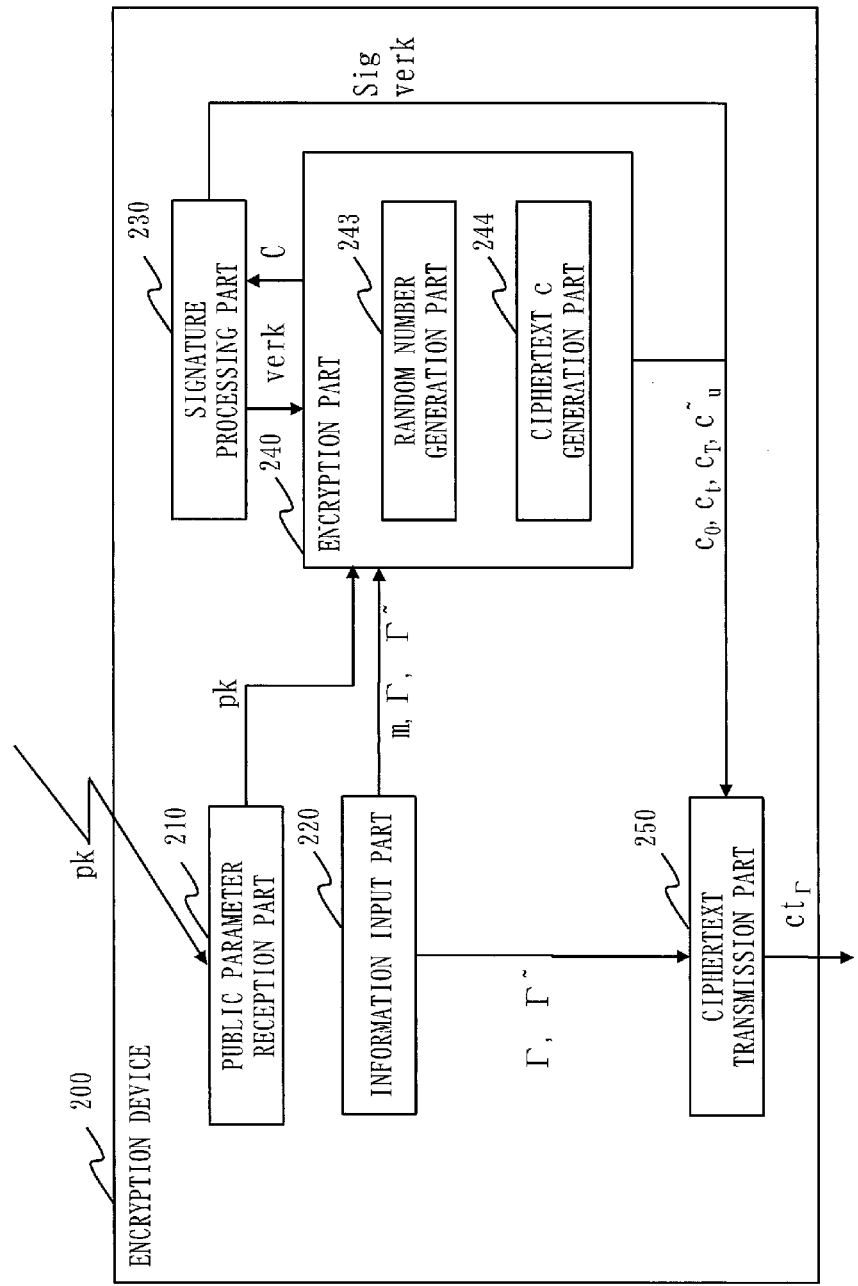
FIG. 20 is a functional block diagram illustrating a function of an encryption device 200.
Figure 21:
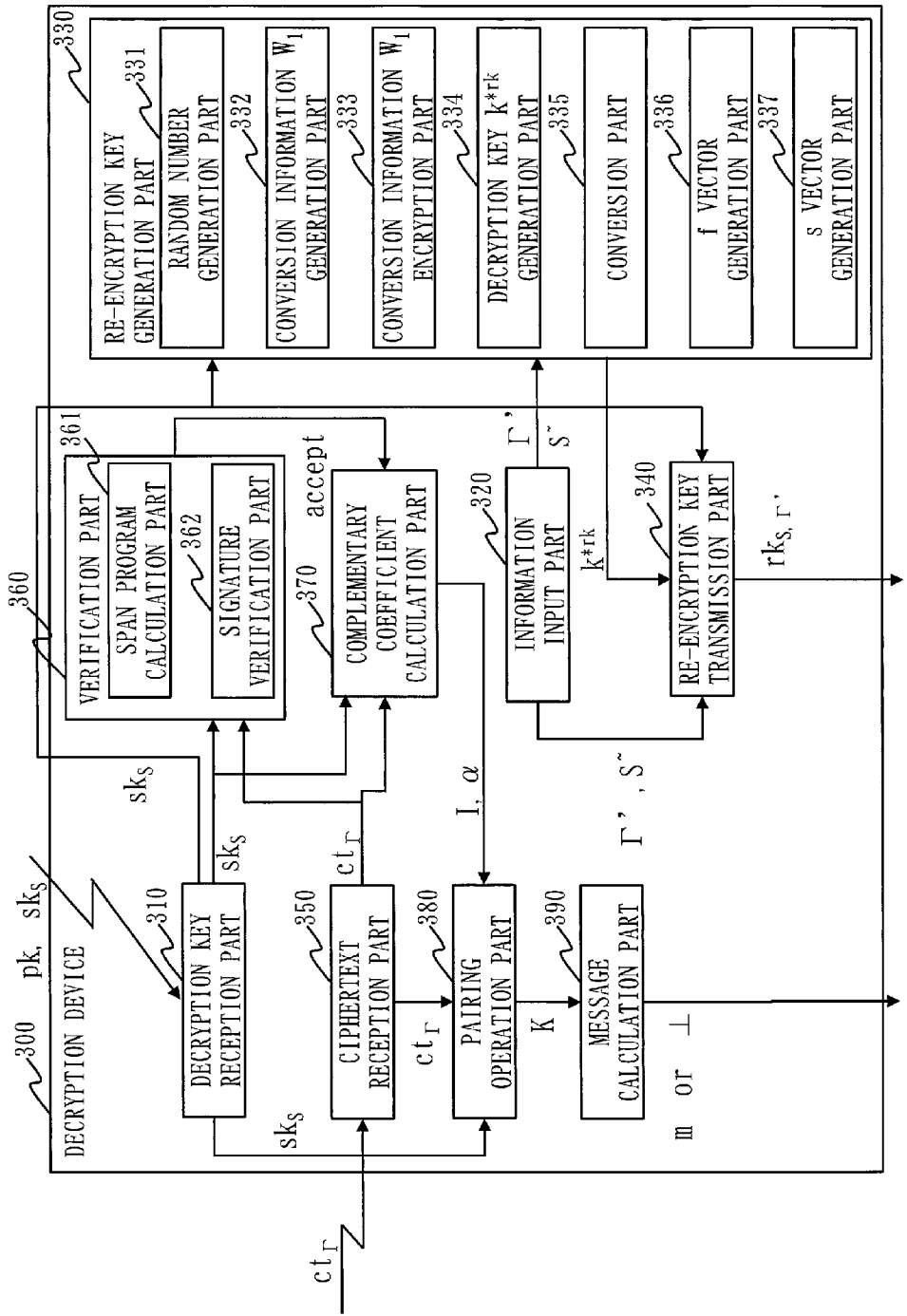
FIG. 21 is a functional block diagram illustrating a function of a decryption device 300.
Figure 22:
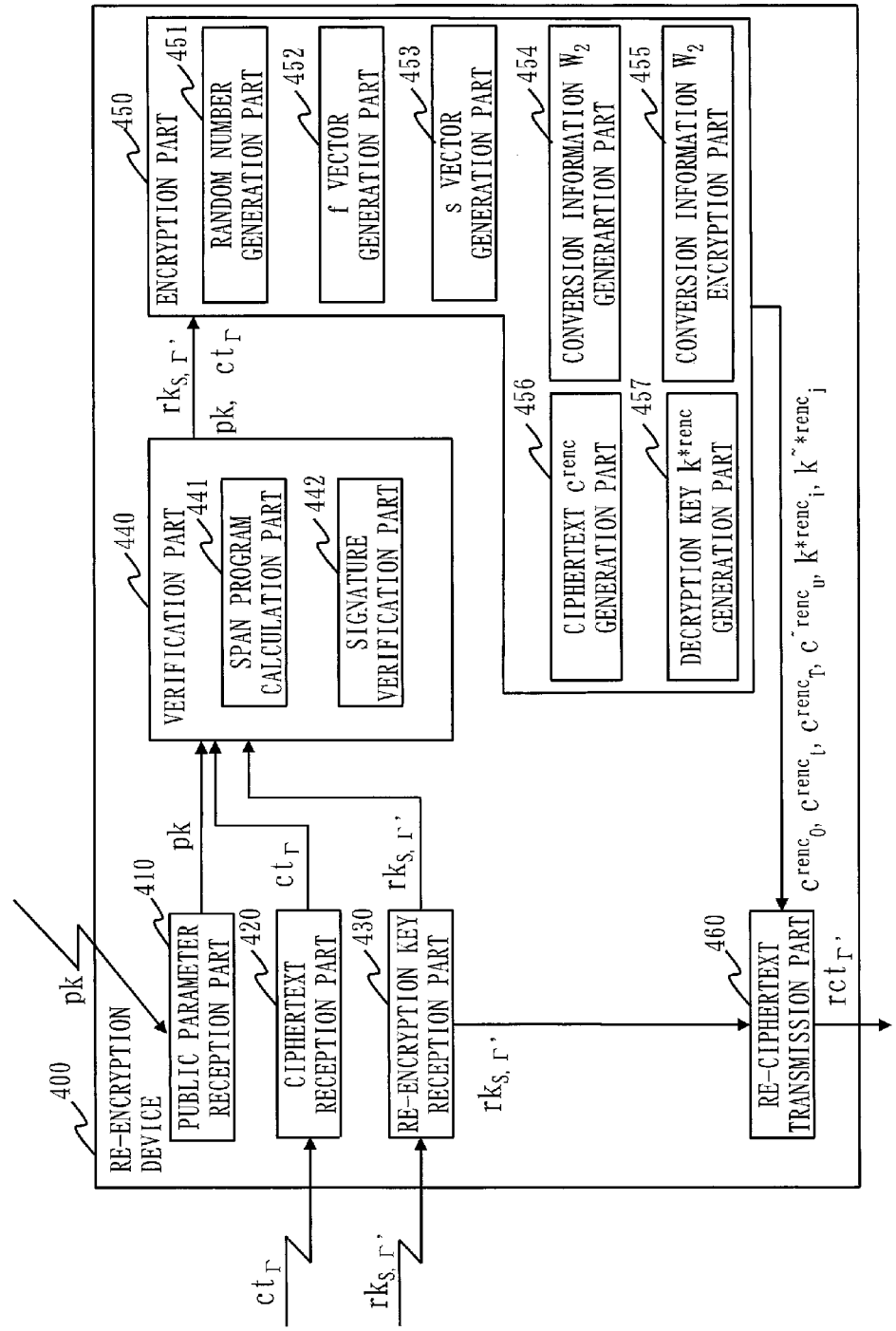
FIG. 22 is a functional block diagram illustrating a function of a re-encryption device 400.
Figure 23:
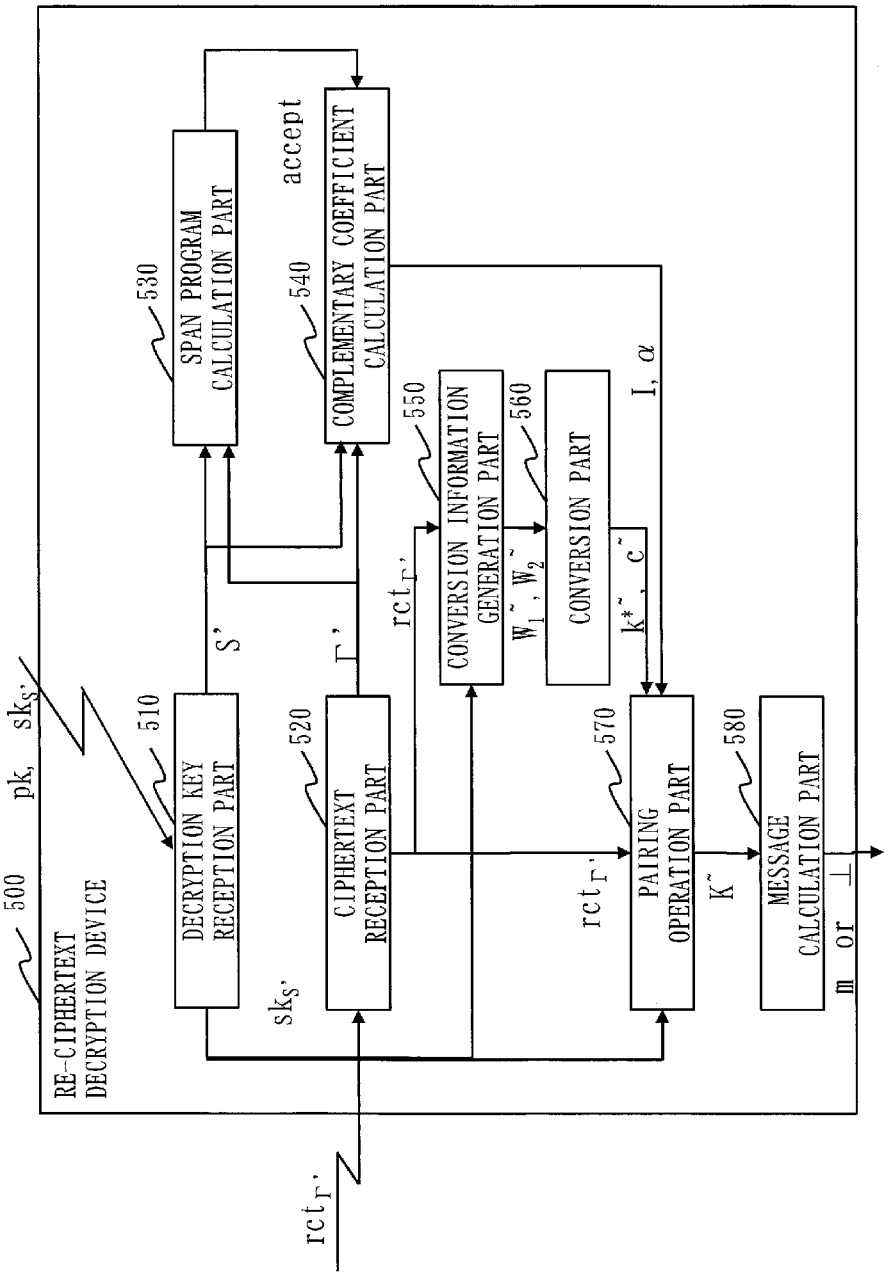
FIG. 23 is a functional block diagram illustrating a function of a re-ciphertext decryption device 500.

FIG. 19 is a functional block diagram illustrating a function of the key generation device 100. FIG. 20 is a functional block diagram illustrating a function of the encryption device 200. FIG. 21 is a functional block diagram illustrating a function of the decryption device 300. FIG. 22 is a functional block diagram illustrating a function of the re-encryption device 400. FIG. 23 is a functional block diagram illustrating a function of the re-ciphertext decryption device 500.

Figure 24:
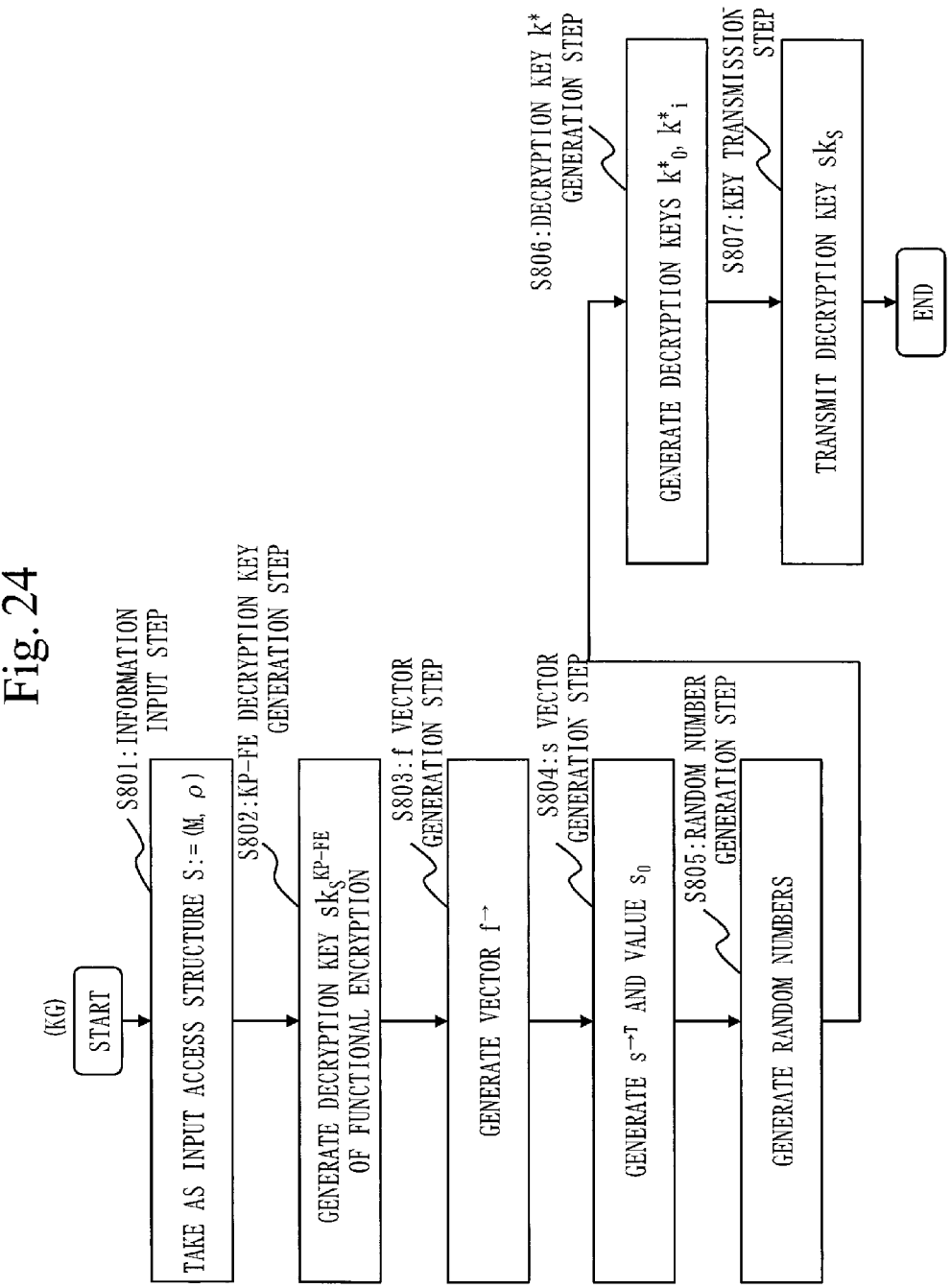
FIG. 24 is a flowchart illustrating a process of KG algorithm.
Figure 25:
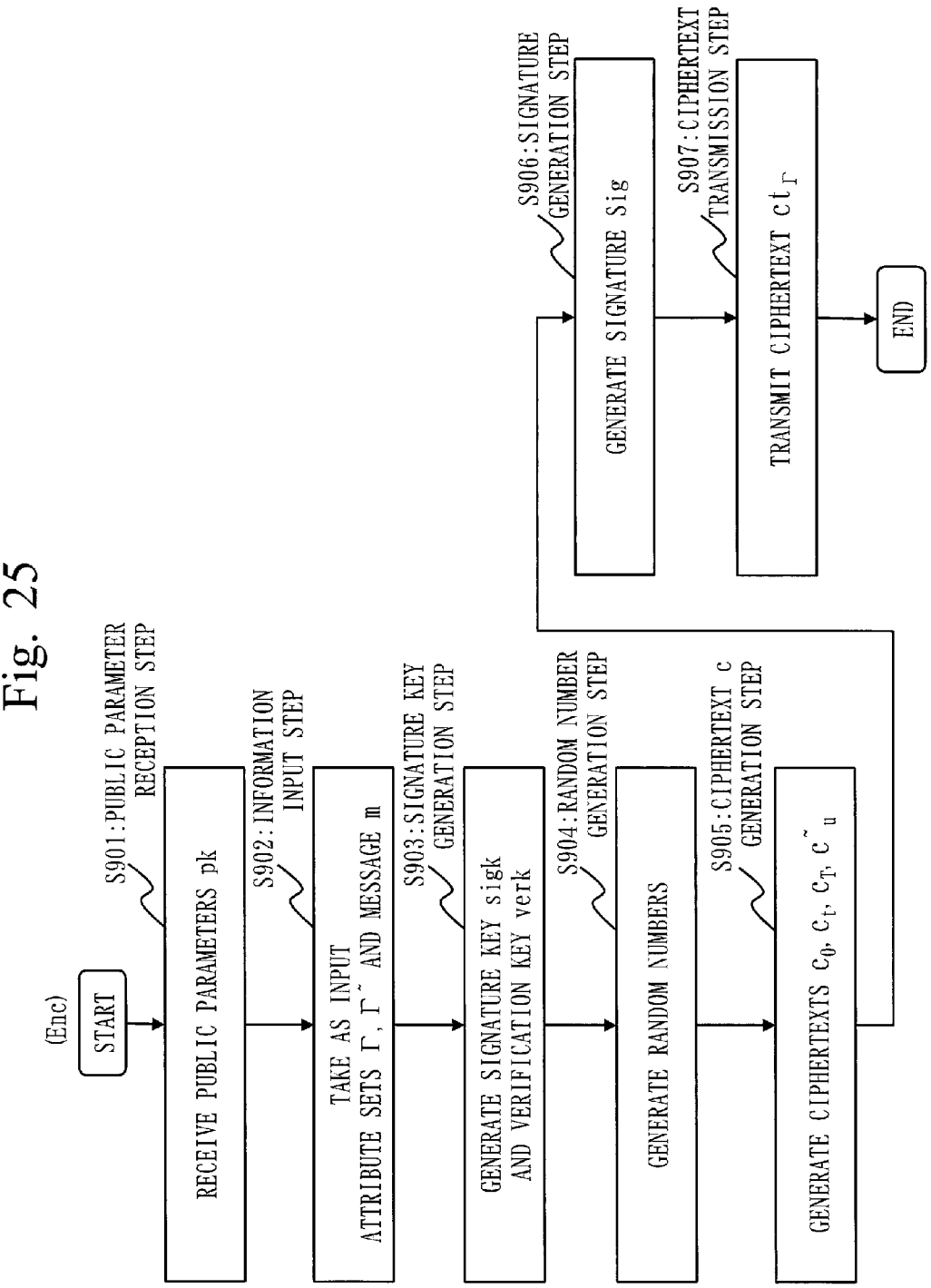
FIG. 25 is a flowchart illustrating a process of Enc algorithm.
Figure 26:
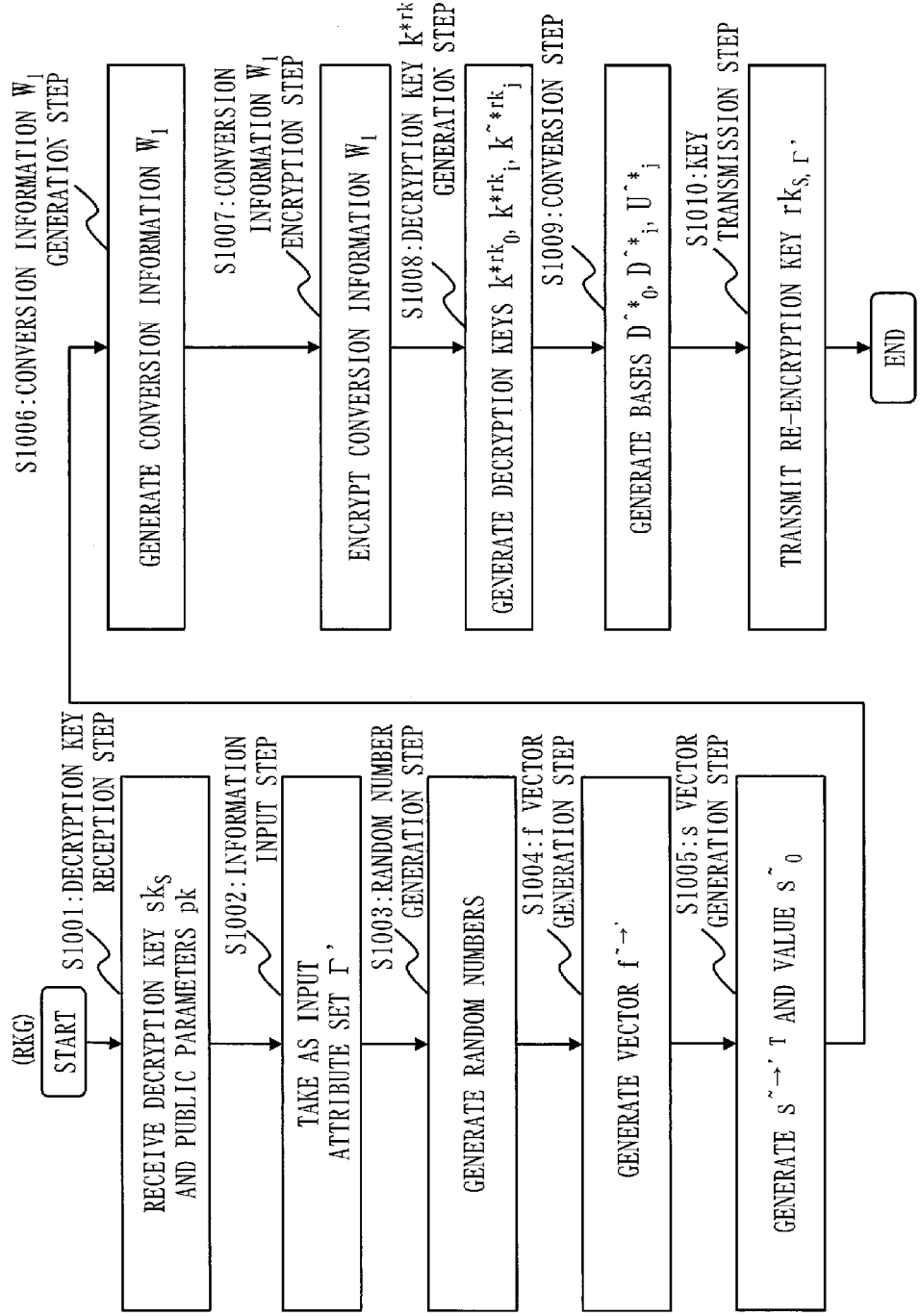
FIG. 26 is a flowchart illustrating a process of RKG algorithm.
Figure 27:
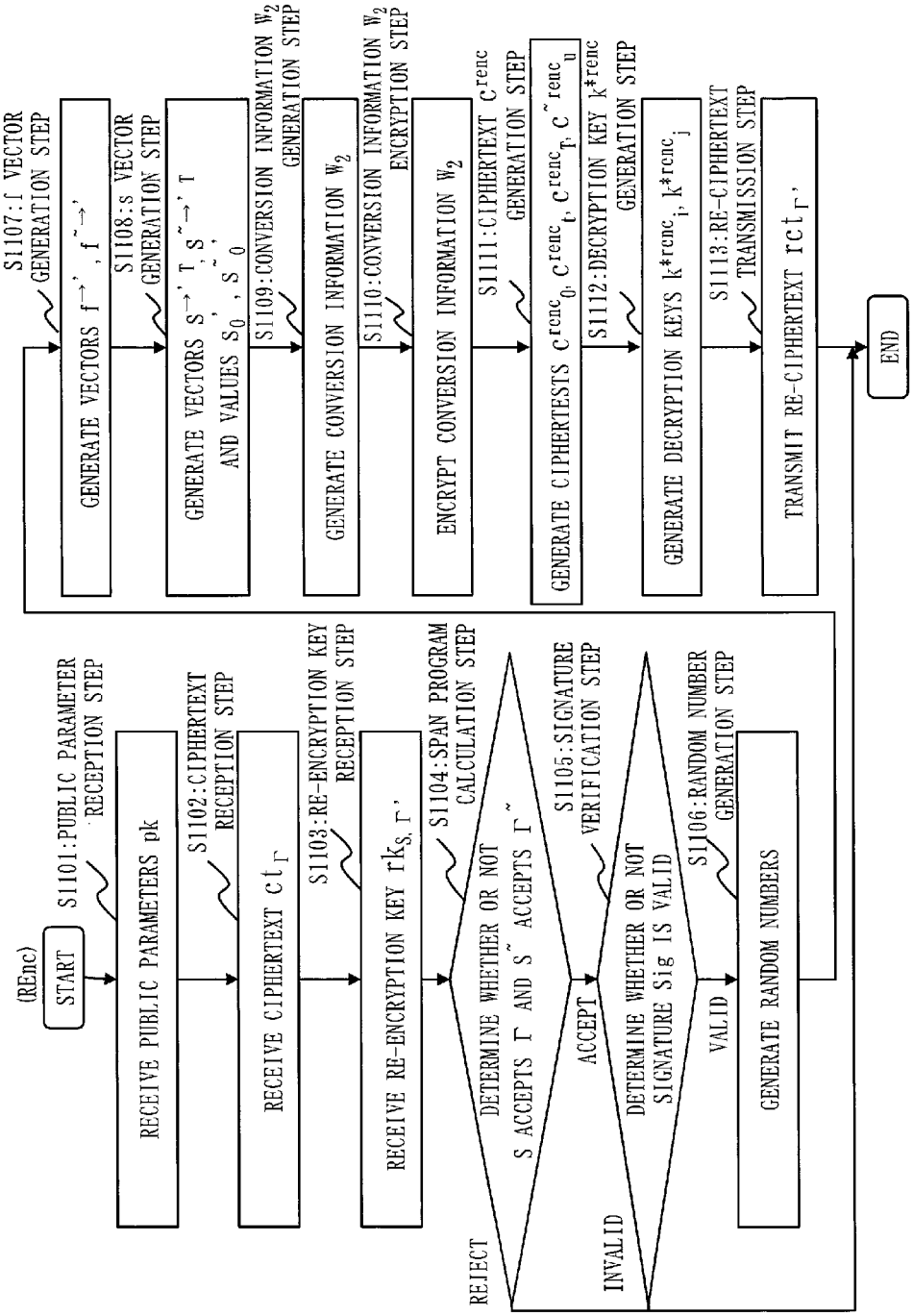
FIG. 27 is a flowchart illustrating a process of REnc algorithm.
Figure 28:
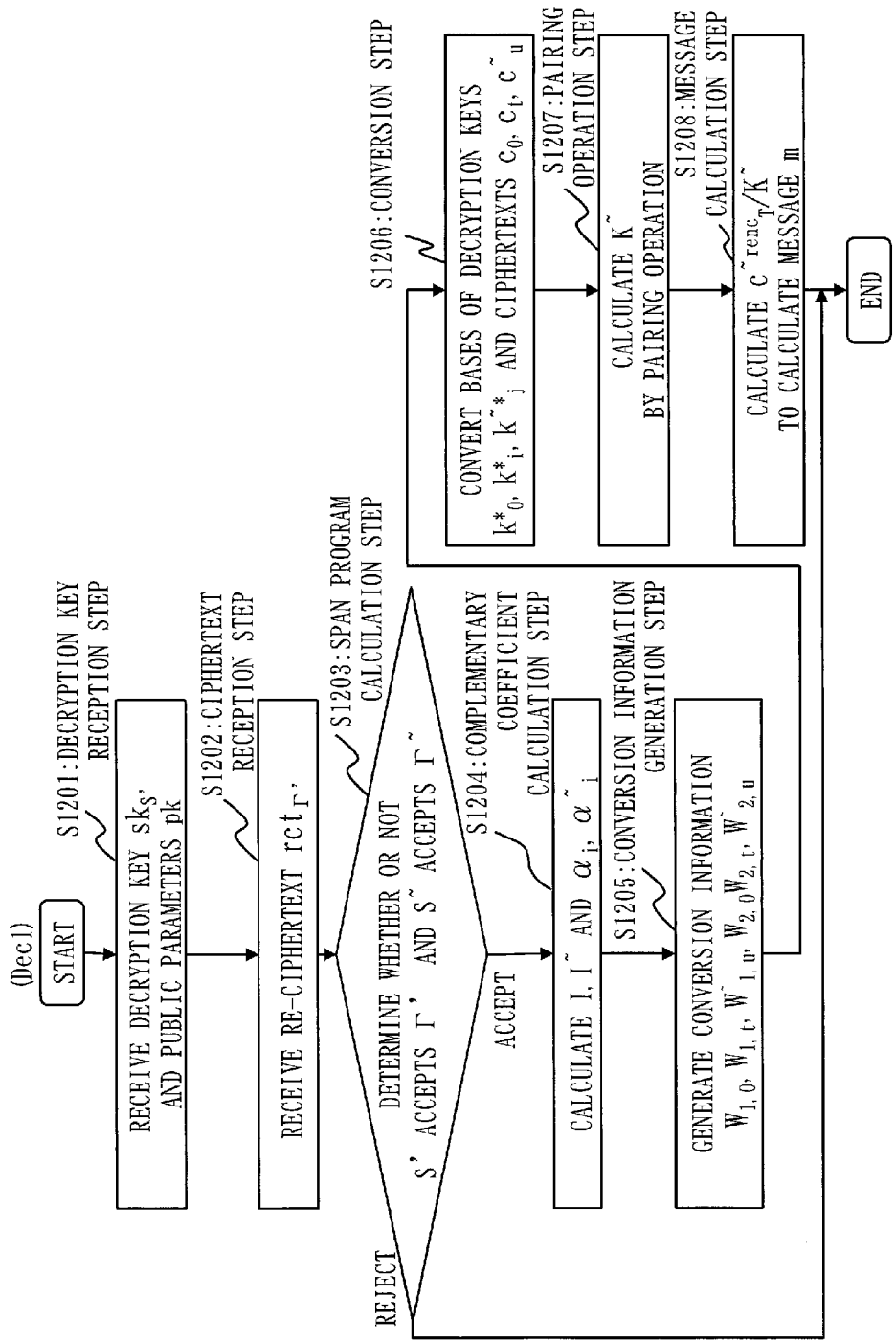
FIG. 28 is a flowchart illustrating a process of Dec1 algorithm.
Figure 29:
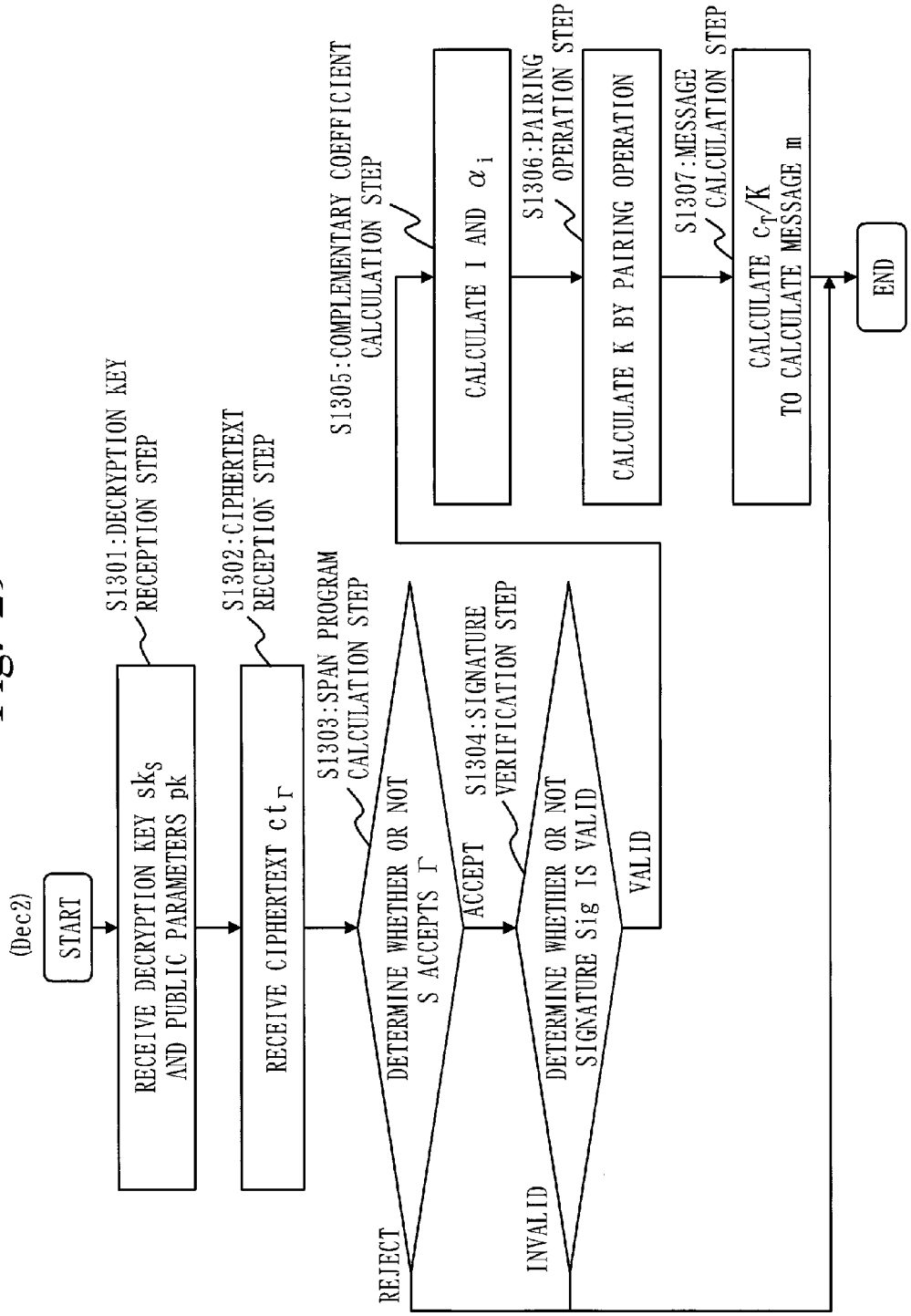
FIG. 29 is a flowchart illustrating a process of Dec2 algorithm.

FIG. 24 is a flowchart illustrating an operation of the key generation device 100 and the process of the KG algorithm. FIG. 25 is a flowchart illustrating an operation of the encryption device 200 and a process of the Enc algorithm. FIG. 26 is a flowchart illustrating an operation of the decryption device 300 and a process of the RKG algorithm. FIG. 27 is a flowchart illustrating an operation of the re-encryption device 400 and a process of the REnc algorithm. FIG. 28 is a flowchart illustrating an operation of the re-ciphertext decryption device 500 and a process of the Dec1 algorithm. FIG. 29 is a flowchart illustrating an operation of the decryption device 300 and a process of the Dec2 algorithm.

The function and operation of the key generation device 100 will be described.

The key generation device 100 is provided with a master key generation part 110, a master key storage part 120, an information input part 130, a decryption key generation part 140, and a key transmission part 150 (key output part), as illustrated in FIG. 19. The decryption key generation part 140 is provided with a random number generation part 142, a decryption key k* generation part 143, a KP-FE key generation part 144, an f vector generation part 145, and an s vector generation part 146.

A description of the process of the Setup algorithm will be omitted because the process is the same as the process of the Setup algorithm described in Embodiment 1, except that in S102 of Embodiment 1, the public parameters $pk_{CP-FE}$ and the master key $sk^{CP-FE}$ of CP-FE are generated, whereas in Embodiment 2, the public parameters $pk^{CP-FE}$ and the master key $sk^{KP-FE}$ of KP-FE are generated.

In brief, the key generation device 100 generates the public parameters pk and the master key sk by executing the Setup algorithm indicated in Formula 178-1 and Formula 178-2.

Setup($1^\lambda, \vec{n} = (d; n_1, \ldots, n_d; w_1, \ldots, w_d; z_1, \ldots, z_d)$): [Formula 178-1]

$param_{\mathbb{G}} := (q, \mathbb{G}, \mathbb{G}_T, g, e) \xleftarrow{R} \mathcal{G}_{bpg}(1^\lambda)$, $N_0 := 9, N_t := n_t + w_t + z_t + 1$ for $t = 1$, $\ldots, d, \psi \xleftarrow{U} \mathbb{F}_q^\times, g_T := e(g, g)^\psi$, for $t = 0, \ldots, d$, $param_{\mathbb{V}_t} := (q, \mathbb{V}_t, \mathbb{G}_T, \mathbb{A}_t, e) \xleftarrow{R} \mathcal{G}_{dpvs}(1^\lambda, N_t)$, $X_t := \begin{pmatrix} \vec{\chi}_{t,1} \\ \vdots \\ \vec{\chi}_{t,N_t} \end{pmatrix} := (\chi_{t,i,j})_{i,j} \xleftarrow{U} GL(N_t, \mathbb{F}_q)$, $\begin{pmatrix} \vec{v}_{t,1} \\ \vdots \\ \vec{v}_{t,N_t} \end{pmatrix} := (v_{t,i,j})_{i,j} := \psi \cdot (X_t^T)^{-1}$, $param_{\vec{n}} := (\{param_t\}_{t=0,\ldots,d}, g_T)$, $b_{t,i} := \sum_{j=1}^{N_t} \chi_{t,i,j} a_{t,j}, \mathbb{B}_t := (b_{t,1}, \ldots, b_{t,N_t})$, $b_{t,i}^* := \sum_{j=1}^{N_t} v_{t,i,j} a_{t,j}, \mathbb{B}_t^* := (b_{t,1}^*, \ldots, b_{t,N_t}^*)$, $X_t' = \begin{pmatrix} \vec{\chi}'_{t,1} \\ \vdots \\ \vec{\chi}'_{t,N_t} \end{pmatrix} := (\chi'_{t,i,j})_{i,j} \xleftarrow{U} GL(N_t, \mathbb{F}_q)$, $\begin{pmatrix} \vec{v}'_{t,1} \\ \vdots \\ \vec{v}'_{t,N_t} \end{pmatrix} := (v'_{t,i,j})_{i,j} := \psi \cdot (X_t'^T)^{-1}$, $h_{t,i} := \sum_{j=1}^{N_t} \chi'_{t,i,j} a_{t,j}, \mathbb{H}_t := (h_{t,1}, \ldots, h_{t,N_t})$, [Formula 178-2]

$h_{t,i}^* := \sum_{j=1}^{N_t} v'_{t,i,j} a_{t,j}, \mathbb{H}_t^* := (h_{t,1}^*, \ldots, h_{t,N_t}^*)$, $(pk^{KP\text{-}FE}, sk^{KP\text{-}FE}) \xleftarrow{R} \text{Setup}_{KP\text{-}FE}(1^\lambda, \vec{n})$ $\hat{\mathbb{B}}_0 := (b_{0,1}, \ldots, b_{0,4}, b_{0,9})$, $\hat{\mathbb{B}}_t := (b_{t,1}, \ldots, b_{t,n_t}, b_{t,N_t})$ for $t = 1, \ldots, d$, $\hat{\mathbb{H}}_u := (h_{u,1}, \ldots, h_{u,n_u}, h_{u,N_u})$ for $u = 1, \ldots, d$, $\hat{\mathbb{B}}_0^* := (b_{0,2}^*, b_{0,3}^*, b_{0,4}^*, b_{0,7}^*, b_{0,8}^*)$, $\hat{\mathbb{B}}_t^* := (b_{t,1}^*, \ldots, b_{t,n_t}^*, b_{t,n_t+w_t+1}^*, \ldots, b_{t,n_t+w_t+z_t}^*)$ for $t = 1, \ldots, d$, $\hat{\mathbb{H}}_u^* := (h_{u,n_u+w_u+1}^*, \ldots, h_{u,n_u+w_u+z_u}^*)$ for $u = 1, \ldots, d$, return $pk = (1^\lambda, pk^{KP\text{-}FE}, param_{\vec{n}},$
$\{\hat{\mathbb{B}}_t, \hat{\mathbb{B}}_t^*\}_{t=0,\ldots,d}, \{\hat{\mathbb{H}}_u, \hat{\mathbb{H}}_u^*\}_{u=1,\ldots,d})$, $sk = (sk^{KP\text{-}FE}, b_{0,1}^*, \{h_{u,1}^*, \ldots, h_{u,n_u}^*\}_{u=1,\ldots,d})$.

The process of the KG algorithm will be described with reference to FIG. 24.

(S801: Information Input Step)

With the input device, the information input part 130 takes as input the access structure S:=(M,ρ). Note that a matrix M of the access structure S is set depending on the condition of a system to be implemented. The attribute information of the user of the decryption key $sk_S$, for example, is set in ρ of the access structure S where $\rho(i)=(t,\vec{v}_i:=(v_{i,1}, \ldots, v_{i,n_t}) \in \mathbb{F}_q^{n_t} \setminus \{\vec{0}\})$ $(v_{i,n_t} \neq 0)$.

(S802: KP-FE Decryption Key Generation Step)

With the processing device, the KP-FE key generation part 144 calculates Formula 179, to generate a decryption key $sk_S^{KP\text{-}FE}$ of functional encryption.

$sk_S^{KP\text{-}FE} \xleftarrow{R} KG^{KP\text{-}FE}(pk^{KP\text{-}FE}, sk^{KP\text{-}FE}, S)$ [Formula 179]

(S803: f Vector Generation Step)

With the processing device, the f vector generation part 145 generates a vector $\vec{f}$ randomly as indicated in Formula 180.

$\vec{f} \xleftarrow{U} \mathbb{F}_q^r$ [Formula 180]

(S804: s Vector Generation Step)

With the processing device, the s vector generation part 146 generates a vector $\vec{s}^T:=(s_1, \ldots, s_L)^T$, as indicated in Formula 181.

$\vec{s}^T:=(s_1, \ldots, s_L)^T := M \cdot \vec{f}^T$ [Formula 181]

With the processing device, the s vector generation part 146 generates a value $s_0$ as indicated in Formula 182.

$s_0 := \vec{1} \cdot \vec{f}^T$ [Formula 182]

(S805: Random Number Generation Step)

With the processing device, the random number generation part 142 generates random numbers, as indicated in Formula 183.

$\vec{\eta}_0 \xleftarrow{U} \mathbb{F}_q^2$, [Formula 183]

$\theta_i \xleftarrow{U} \mathbb{F}_q$, $\vec{\eta}_i \xleftarrow{U} \mathbb{F}_q^{z_t}$ (S806: Decryption Key k* Generation Step)

With the processing device, the decryption key k* generation part 143 generates a decryption key $k_0^*$, as indicated in Formula 184.

$k_0^* := (1, -s_0, 0^2, 0^2, \vec{\eta}_0, 0)_{\mathbb{B}_0^*}$ [Formula 184]

Also, with the processing device, the decryption key k* generation part 143 generates a decryption key $k_i^*$ for each integer i of i=1, ..., L, as indicated in Formula 185.

for $i = 1, \ldots, L$, [Formula 185]

if $\rho(i) = (t, \vec{v}_i)$, $k_i^* := (\overbrace{s_i \vec{e}_{t,1} + \theta_i \vec{v}_t}^{n_t}, \overbrace{0^{w_t}}^{w_t}, \overbrace{\vec{\eta}_i}^{z_t}, \overbrace{0}^{1})_{\mathbb{B}_t^*}$, if $\rho(i) = \neg(t, \vec{v}_i)$, $k_i^* := (\overbrace{s_i \vec{v}_t}^{n_t}, \overbrace{0^{w_t}}^{w_t}, \overbrace{\vec{\eta}_i}^{z_t}, \overbrace{0}^{1})_{\mathbb{B}_t^*}$ (S807: Key Transmission Step)

For example, with the communication device, the key transmission part 150 transmits the decryption key $sk_S$ constituted as elements by the access structure S, the decryption key $Sk_S^{KP\text{-}FE}$, and the decryption keys $k_0^*$ and $k_i^*$, to the decryption device 300 in secrecy via the network. As a matter of course, the decryption key $sk_S$ may be transmitted to the decryption device 300 by another method.

In brief, from (S801) through (S806), the key generation device 100 generates the decryption key $sk_S$ by executing the KG algorithm indicated in Formula 186. Then, in (S807), the key generation device 100 transmits the generated decryption key $sk_S$ to the decryption device 300.

$$KG = (pk, sk, \mathbb{S} = (M, \rho)):$$ [Formula 186]

$$sk_{\mathbb{S}}^{KP\text{-}FE} \xleftarrow{R} KG^{KP\text{-}FE}(pk^{KP\text{-}FE}, sk^{KP\text{-}FE}, \mathbb{S}),$$

$$\vec{f} \xleftarrow{U} \mathbb{F}_q^r,$$

$$\vec{s}^T := (s_1, \ldots, s_L)^T := M \cdot \vec{f}^T, s_0 := \vec{1} \cdot \vec{f}^T,$$

$$\vec{\eta}_0 \xleftarrow{U} \mathbb{F}_q^2,$$

$$k_0^* := (1, -s_0, 0^2, 0^2, \vec{\eta}_0, 0)_{\mathbb{B}_0^*},$$

for $i = 1, \ldots, L$, if $\rho(i) =$ $$(t, \vec{v}_i := (v_{i,1}, \ldots, v_{i,n_t}) \in \mathbb{F}_q^{n_t} \setminus \{\vec{0}\})(v_{i,n_i} \neq 0),$$

$$\theta_i \xleftarrow{U} \mathbb{F}_q, \vec{\eta}_i \xleftarrow{U} \mathbb{F}_q^{z_t},$$

$$k_i^* := \left(\overbrace{s_i \vec{e}_{t,1} + \theta_i \vec{v}_i}^{n_t}, \overbrace{0^{w_t}}^{w_t}, \overbrace{\vec{\eta}_i}^{z_t}, \overbrace{0}^{1}\right)_{\mathbb{B}_t^*},$$

if $\rho(i) = \neg (t, \vec{v}_i)$, $$\vec{\eta}_i \xleftarrow{U} \mathbb{F}_q^{z_t},$$

$$k_i^* := \left(\overbrace{s_i \vec{v}_t}^{n_t}, \overbrace{0^{w_t}}^{w_t}, \overbrace{\vec{\eta}_i}^{z_t}, \overbrace{0}^{1}\right)_{\mathbb{B}_t^*},$$

return $sk_{\mathbb{S}} := (\Gamma, sk_{\mathbb{S}}^{KP\text{-}FE}, k_0^*, \{k_i^*\}_{i=1,\ldots,L}).$ In (S801), the key generation device 100 executes the KG algorithm by taking as input the access structure $S':=(M',\rho')$ to which the attribute information of the user of the decryption key $sk_{S'}$ has been set, to generate the decryption key $sk_{S'}$. Then, the key generation device 100 transmits the decryption key $sk_{S'}:=(S',sk_S^{KP\text{-}FE}, k'^*_0, k'^*_i)$ to the re-ciphertext decryption device 500. Note that $\rho'(i)=(t,v'^{\rightarrow}_i:=(v'_{i,1},\ldots,v'_{i,n_t}\in F_q^{nt}\setminus\{0^\rightarrow\})$ $(v'_{i,n_t}\neq 0)$.

The function and operation of the encryption device 200 will be described.

As illustrated in FIG. 20, the encryption device 200 is provided with a public parameter reception part 210, an information input part 220, a signature processing part 230, an encryption part 240, and a ciphertext transmission part 250 (ciphertext output part). The encryption part 240 is provided with a random number generation part 243 and a ciphertext c generation part 244.

The process of the Enc algorithm will be described with reference to FIG. 25.

(S901: Public Parameter Reception Step)

For example, with the communication device, the public parameter reception part 210 receives the public parameters pk generated by the key generation device 100, via the network.

(S902: Information Input Step)

With the input device, the information input part 220 takes as input the attribute sets $\Gamma:=\{(t,x^\rightarrow_t):=(x_{t,1},\ldots,x_{t,nt}\in F_q^{nt}))|1\leq t\leq d\}$ and $\Gamma^\sim:=\{(u,y^\rightarrow_u)|y^\rightarrow_u\in F_q^{nu}, 1\leq y\leq d\}$. Note that t need not be all integers t of $1\leq t\leq d$ but may be at least some of integers t of $1\leq t\leq d$, and that u need not be all integers u of $1\leq u\leq d$ but may be at least some of integers u of $1\leq u\leq d$. The attribute information of the user capable of decryption, for example, is set to the attribute set $\Gamma$. Information for setting a condition that enables re-encryption, for example, is set to the attribute set $\Gamma^\sim$.

With the input device, the information input part 220 takes as input the message m to be transmitted to the decryption device 300.

(S903: Signature Key Generation Step)

With the processing device, the signature processing part 230 calculates formula 187, to generate a signature key sigk for one-time signature and a verification key verk.

$$(sigk, verk) \xleftarrow{R} SigKG(1^\lambda)$$ [Formula 187]

(S904: Random Number Generation Step)

With the processing device, the random number generation part 243 generates random numbers as indicated in Formula 188.

$$\zeta, \pi, \delta, \varphi_0, \tilde{\zeta}, \tilde{\pi}, \tilde{\varphi}_0 \xleftarrow{U} \mathbb{F}_q,$$ [Formula 188]

$$\varphi_t \xleftarrow{U} \mathbb{F}_q \text{ for } (t, \vec{x}_t) \in \Gamma,$$

$$\tilde{\varphi}_u \xleftarrow{U} \mathbb{F}_q \text{ for } (u, \vec{y}_u) \in \tilde{\Gamma}$$

(S905: Ciphertext c Generation Step)

With the processing device, the ciphertext c generation part 244 generates a ciphertext $c_0$ as indicated in Formula 189.

$$c_0:=(\zeta,\delta,\pi(verk,1),0^2,0^2,\varphi_0)_{B_0}$$ [Formula 189]

With the processing device, the ciphertext c generation part 244 generates a ciphertext $c_t$ for each integer i included in the attribute information F, as indicated in Formula 190.

$$c_t := \left(\overbrace{\delta\vec{x}_t}^{n_t}, \overbrace{0^{w_t}}^{w_t}, \overbrace{0^{z_t}}^{z_t}, \overbrace{\varphi_t}^{1}\right)_{B_t} \text{ for } (t, \vec{x}_t) \in \Gamma$$ [Formula 190]

With the processing device, the ciphertext c generation part 244 generates a ciphertext $c_T$ as indicated in formula 191.

$$c_T:=m\cdot g_T^\zeta$$ [Formula 191]

With the processing device, the ciphertext c generation part 244 generates a ciphertext $\tilde{c}_0$ as indicated in Formula 192.

$$\tilde{c}_0:=(\tilde{\zeta},\delta,\tilde{\pi}(verk,1),0^2,0^2,\tilde{\varphi}_0)_{B_0}$$ [Formula 192]

With the processing device, the ciphertext c generation part 244 generates a ciphertext $\tilde{c}_u$ as indicated in Formula 193.

$$\tilde{c}_u := \left(\overbrace{\delta\vec{y}_u}^{n_u}, \overbrace{0^{w_u}}^{w_u}, \overbrace{0^{z_u}}^{z_u}, \overbrace{\tilde{\varphi}_u}^{1}\right)_{H_u} \text{ for } (u, \vec{y}_u) \in \tilde{\Gamma}$$ [Formula 193]

With the processing device, the ciphertext c generation part 244 generates a ciphertext $\tilde{c}_T$ as indicated in Formula 194.

$$\tilde{c}_T:=m\cdot g_T^{\tilde{\zeta}}$$ [Formula 194]

(S906: Signature Generation Step)

With the processing device, the signature processing part 230 calculates Formula 195, to generate a signature Sig for an element C of the ciphertext $ct_\Gamma$.

$$Sig \xleftarrow{R} Sig(sigk, C := (\Gamma, \tilde{\Gamma}, c_0, \{c_t\}_{(t,\vec{x}_t) \in \Gamma}, \{\tilde{c}_u\}_{(u,\vec{y}_u) \in \tilde{\Gamma}}, c_T)) \quad \text{[Formula 195]}$$

(S907: Ciphertext Transmission Step)

For example, with the communication device, the ciphertext transmission part 250 transmits the ciphertext $ct_\Gamma$ constituted as elements by the attribute sets $\Gamma$ and $\tilde{\Gamma}$, the ciphertexts $c_0$, $c_t$, $C_T$, and $\tilde{c}_u$, the verification key verk, and the signature Sig, to the decryption device 300 via the network. The ciphertext $ct_\Gamma$ may be transmitted to the decryption device 300 by another method, as a matter of course.

In brief, from (S901) through (S906), the encryption device 200 executes the Enc algorithm indicated in Formula 196, to generate the ciphertext $ct_\Gamma$. In (S907), the encryption device 200 transmits the generated ciphertext $ct_\Gamma$ to the decryption device 300.

$$Enc = (pk, m, \Gamma = \{(t, \vec{x}_t) \mid \vec{x}_t \in \mathbb{F}_q^{n_t} \setminus \{\vec{0}\}, 1 \le t \le d\}, \quad \text{[Formula 196]}$$

$$\tilde{\Gamma} = \{(u, \vec{y}_u) \mid \vec{y}_u \in \mathbb{F}_q^{n_u} \setminus \{\vec{0}\}, 1 \le u \le d\}):$$

$$(sigk, verk) \xleftarrow{R} SigKG(1^\lambda),$$

$$\zeta, \pi, \delta, \varphi_0, \tilde{\zeta}, \tilde{\pi}, \tilde{\varphi}_0 \xleftarrow{U} \mathbb{F}_q,$$

$$\varphi_t \xleftarrow{U} \mathbb{F}_q \text{ for } (t, \vec{x}_t) \in \Gamma,$$

$$\tilde{\varphi}_u \xleftarrow{U} \mathbb{F}_q \text{ for } (u, \vec{y}_u) \in \tilde{\Gamma},$$

$$c_0 := (\zeta, \delta, \pi(verk, 1), 0^2, 0^2, \varphi_0)_{\mathbb{B}_0},$$

$$\tilde{c}_0 := (\tilde{\zeta}, \delta, \tilde{\pi}(verk, 1), 0^2, 0^2, \tilde{\varphi}_0)_{\mathbb{B}_0},$$

$$c_t := \left(\tfrac{n_t}{\delta \vec{x}_t}, 0^{w_t}, 0^{z_t}, \tfrac{1}{\varphi_t}\right)_{\mathbb{B}_t} \text{ for } (t, \vec{x}_t) \in \Gamma,$$

$$\tilde{c}_u := \left(\tfrac{n_u}{\delta \vec{y}_u}, 0^{w_u}, 0^{z_u}, \tfrac{1}{\tilde{\varphi}_u}\right)_{\mathbb{H}_u} \text{ for } (u, \vec{y}_u) \in \tilde{\Gamma},$$

$$c_T := m \cdot g_T^\zeta, \tilde{c}_T := m \cdot g_T^{\tilde{\zeta}},$$

$$Sig \xleftarrow{R}$$

$$Sig(sigk, C := (\Gamma, \tilde{\Gamma}, c_0, \{c_t\}_{(t,\vec{x}_t) \in \Gamma}, \{\tilde{c}_u\}_{(u,\vec{y}_u) \in \tilde{\Gamma}}, c_T)),$$

$$ct_\Gamma := (\Gamma, \tilde{\Gamma}, c_0, \{c_t\}_{(t,\vec{x}_t) \in \Gamma}, \{\tilde{c}_u\}_{(u,\vec{y}_u) \in \tilde{\Gamma}}, c_T, verk, Sig).$$

The function and operation of the decryption device 300 will be described.

As illustrated in FIG. 21, the decryption device 300 is provided with a decryption key reception part 310, an information input part 320, a re-encryption key generation part 330, a re-encryption key transmission part 340 (re-encryption key output part), a ciphertext reception part 350, a verification part 360, a complementary coefficient calculation part 370, a pairing operation part 380, and a message calculation part 390. The re-encryption key generation part 330 is provided with a random number generation part 331, a conversion information $W_1$ generation part 332, a conversion information $W_1$ encryption part 333, a decryption key $k^{*rk}$ generation part 334, a conversion part 335, an f vector generation part 336, and an s vector generation part 337. The verification part 360 is provided with a span program calculation part 361 and a signature verification part 362.

The process of the RKG algorithm will be described with reference to FIG. 26. The Dec2 algorithm will be described later.

(S1001: Decryption Key Reception Step)

For example, with the communication device, the decryption key reception part 310 receives the decryption key $sk_S$ transmitted from the key generation device 100, via the network. The decryption key reception part 310 also receives the public parameters pk generated by the key generation device 100.

(S1002: Information Input Step)

With the input device, the information input part 320 takes as input the attribute set $\Gamma' := \{(t, {\vec{x}'}_t := (x'_{t,1}, \ldots, x'_{i,nt} \in \mathbb{F}_q^n \setminus \{\vec{0}\})) \mid 1 \le t \le d\}$. Note that t need not be all integers t of $1 \le t \le d$ but may be at least some of integers t of $1 \le t \le d$. The attribute information of the user who can decrypt the re-ciphertext $ct_{\Gamma'}$, for example, is set to the attribute set $\Gamma'$.

With the input device, the information input part 320 takes as input the access structure $\tilde{S} := (\tilde{M}, \tilde{\rho})$. A matrix $\tilde{M}$ of the access structure $\tilde{S}$ is set depending on the condition of a system to be implemented. Attribute information indicating a condition that enables re-encryption, for example, is set to $\tilde{\rho}$ of the access structure $\tilde{S}$. Note that $\tilde{\rho}(i) = (t, \vec{v}_i := (v_{i,1}, \ldots, v_{i,nt}) \in \mathbb{F}_q^n \setminus \{\vec{0}\})$ $(v_{i,nt} \neq 0)$.

(S1003: Random Number Generation Step)

With the processing device, the random number generation part 331 generates random numbers as indicated in Formula 197.

$$\vec{\tilde{\eta}}_0 \xleftarrow{U} \mathbb{F}_q^2, \quad \text{[Formula 197]}$$

$$\tilde{\theta} \xleftarrow{U} \mathbb{F}_q \text{ for } j = 1, \ldots, \tilde{L},$$

$$\vec{\tilde{\eta}} \xleftarrow{U} \mathbb{F}_q^{z_u} \text{ for } j = 1, \ldots, \tilde{L}$$

(S1004: f Vector Generation Step)

With the processing device, the f vector generation part 336 generates a vector $\vec{f}$ randomly as indicated in Formula 198.

$$\vec{f} \xleftarrow{U} \mathbb{F}_q^r \quad \text{[Formula 198]}$$

(S1005: s Vector Generation Step)

With the processing device, the s vector generation part 337 generates a vector $\vec{s}^{\sim T}$ as indicated in Formula 199.

$$\vec{\tilde{s}}^T := (\tilde{s}_1, \ldots, \tilde{s}_{\tilde{L}})^T := \tilde{M} \cdot \vec{f}^T \quad \text{[Formula 199]}$$

With the processing device, the s vector generation part 337 generates a value $C_0$ as indicated in Formula 200.

$$\tilde{s}_0 := \vec{1} \cdot \vec{f}^T \quad \text{[Formula 200]}$$

(S1006: Conversion Information $W_1$ Generation Step)

With the processing device, the conversion information $W_1$ generation part 332 generates conversion information $W_{1,0}$, $W_{1,i}$ and $\tilde{W}_{1,j}$, as indicated in Formula 201.

$$W_{1,0} \xleftarrow{U} GL(9, \mathbb{F}_q), \quad \text{[Formula 201]}$$

$$W_{1,i} \xleftarrow{U} GL(N_i, \mathbb{F}_q) \text{ for } i = 1, \ldots, L,$$

-continued $$\tilde{W}_{1,j} \xleftarrow{U} GL(N_j, \mathbb{F}_q) \text{ for } j = 1, \ldots, \tilde{L}$$

(S1007: Conversion Information $W_1$ Encryption Step)

With the processing device, the conversion information $W_1$ encryption part 333 calculates Formula 202, to encrypt the conversion information $W_{1,0}$, $W_{1,i}$, and $\tilde{W}_{1,j}$ by functional encryption, thereby generating encrypted conversion information $ct^{rk}_{\Gamma'}(\phi^{rk})$. As the conversion information $W_{1,0}$, $W_{1,i}$, and $\tilde{W}_{1,j}$ are encrypted by functional encryption that takes as input the attribute set $\Gamma'$, they are encrypted by setting the attribute information of the user capable of decrypting the re-ciphertext $rct_{\Gamma'}$.

$$ct^{rk}_{\Gamma'} \xleftarrow{R}$$  [Formula 202]

$$Enc_{KP\text{-}FE}(pk^{KP\text{-}FE}, \Gamma', (\{W_{1,t}\}_{t=0,\ldots,L}, \{W_{1,u}\}_{j=1,\ldots,\tilde{L}}, \mathbb{S}, \hat{\mathbb{S}}))$$

(S1008: Decryption Key $k^{*rk}$ Generation Step)

With the processing device, the decryption key $k^{*rk}$ generation part 334 generates a decryption key $k^{*rk}_0$, as indicated in Formula 203.

$$k_0^{*rk} := (k_0^* + (0, -\tilde{s}_0, 0^4, \vec{\eta}_0, 0)\mathbb{B}^*)W_{1,0}$$  [Formula 203]

Also, with the processing device, the decryption key $k^{*rk}$ generation part 334 generates a decryption key $k^{*rk}_i$ for each integer i of i=1, . . . , L, as indicated in Formula 204.

$$k_i^{*rk} := k_i^* W_{1,i} \text{ for } i=1, \ldots, L$$  [Formula 204]

Also, with the processing device, the decryption key $k^{*rk}$ generation part 334 generates a decryption key $k^{\sim *rk}_j$ for each integer j of i=1, . . . , $\tilde{L}$, as indicated in Formula 205.

for $j = 1, \ldots, \tilde{L}$,  [Formula 205]

if $\tilde{\rho}(j) = (u, \vec{z}_j)$, $$\tilde{k}_j^{*rk} := \left(\overbrace{\tilde{s}_j \vec{e}_{u,1} + \tilde{\theta}_j \vec{z}_j}^{n_u}, \overbrace{0^{w_u}}^{w_u}, \overbrace{\vec{\eta}_j, 0}^{z_u \, 1}\right)_{\mathbb{H}_u^*} \tilde{W}_{1,j},$$

if $\tilde{\rho}(j) = \neg (u, \vec{z}_j)$, $$\tilde{k}_j^{*rk} := \left(\overbrace{\tilde{s}_j \vec{z}_j}^{n_u}, \overbrace{0^{w_u}}^{w_u}, \vec{\eta}_j, 0\right)_{\mathbb{H}_u^*} \tilde{W}_{1,j}$$

(S1009: Conversion Step)

With the processing device, the conversion part 335 calculates Formula 206, to generate bases $\hat{\mathbb{D}}^*_0$, $\hat{\mathbb{D}}^*_t$, and $\hat{\mathbb{U}}^*_j$.

$$\hat{\mathbb{D}}_0^* := (d_{0,i}^* := b_{0,i}^* W_{1,0})_{i=3,4,7,8}$$

$$\hat{\mathbb{D}}_t^* := (d_{t,i}^* := b_{0,i}^* W_{1,t})_{i=n_t+w_t+1, \ldots, n_t+w_t+z_t} \text{ for } i=1, \ldots, L,$$

$$\hat{\mathbb{U}}_j^* := (u_{j,i}^* := b_{0,i}^* \tilde{W}_{1,j})_{i=n_u+w_u+1, \ldots, n_u+w_u+z_u} \text{ for } j=1, \ldots, \tilde{L}$$  [Formula 206]

(S1010: Key Transmission Step)

For example, with the communication device, the re-encryption key transmission part 340 transmits the re-encryption key $rk_{S,\Gamma'}$ constituted as elements by the access structures S and $S^{\sim}$, the attribute set the decryption keys $k^{*rk}_0$, $k^{*rk}_i$, and $k^{\sim*rk}_j$, the encrypted conversion information $ct^{rk}_{\Gamma'}$, and the bases $\hat{D}^*_0$, $\hat{D}^*_i$, and $\hat{U}^*_j$, to the re-encryption device 400 in secrecy via the network. As a matter of course, the re-encryption key $rk_{S,\Gamma'}$ may be transmitted to the re-encryption device 400 by another method.

In brief, from (S1001) through (S1009), the decryption device 300 generates the re-encryption key $rk_{\Gamma,S'}$ by executing the RKG algorithm indicated in Formula 207-1 and Formula 207-2. Then, in (S1010), the decryption device 300 transmits the generated re-encryption key $rk_{S,\Gamma'}$ to the re-encryption device 400.

$$RKG = \left(pk, sk_\mathbb{S} := \left(\Gamma, sk_\mathbb{S}^{KP\text{-}FE}, k_0^*, \{k_i^*\}_{i=1,\ldots,L}\right),\right.$$  [Formula 207-1]

$$\Gamma' = \{(t, \vec{x}_t') \mid \vec{x}_t' \in \mathbb{F}_q^{n_t} \setminus \{\vec{0}\}, 1 \le t \le d\}$$

$$\hat{\mathbb{S}} = (\tilde{M}, \tilde{\rho})\Big)\Big):$$

$$\vec{\tilde{\eta}}_0 \xleftarrow{U} \mathbb{F}_q^2,$$

$$\vec{\tilde{f}} \xleftarrow{U} \mathbb{F}_q^r,$$

$$\vec{\tilde{s}}^T := (\tilde{s}_1, \ldots, \tilde{s}_{\tilde{L}})^T := \tilde{M} \cdot \vec{\tilde{f}}^T, s_0 := \vec{1} \cdot \vec{\tilde{f}}^T,$$

$$W_{1,0} \xleftarrow{U} GL(9, \mathbb{F}_q),$$

$$W_{1,i} \xleftarrow{U} GL(N_i, \mathbb{F}_q) \text{ for } i=1, \ldots, L,$$

$$\tilde{W}_{1,j} \xleftarrow{U} GL(N_j, \mathbb{F}_q) \text{ for } j=1, \ldots, \tilde{L},$$

$$ct^{rk}_{\Gamma'} \xleftarrow{R} Enc_{KP\text{-}FE}(pk^{KP\text{-}FE},$$

$$\Gamma', (\{W_{1,t}\}_{t=0,\ldots,L}, \{W_{1,u}\}_{j=1,\ldots,\tilde{L}}, \mathbb{S}, \hat{\mathbb{S}})),$$

$$k_0^{*rk} := \left(k_0^* + \left(0, -\tilde{s}_0, 0^4, \vec{\tilde{\eta}}_0, 0\right)_{\mathbb{B}^*}\right) W_{1,0},$$  [Formula 207-2]

$$k_i^{*rk} := k_i^* W_{1,i} \text{ for } i=1, \ldots, L,$$

for $j = 1, \ldots, \tilde{L}$, if $\tilde{\rho}(j) =$ $$(u, \vec{z}_j := (z_{j,1}, \ldots, z_{j,n_u}) \in \mathbb{F}_q^{n_u} \setminus \{\vec{0}\})(z_{j,n_u} \neq 0),$$

$$\tilde{\theta}_j \xleftarrow{U} \mathbb{F}_q, \vec{\tilde{\eta}}_j \xleftarrow{U} \mathbb{F}_q^{z_u},$$

$$\tilde{k}_j^{*rk} := \left(\overbrace{\tilde{s}_j \vec{e}_{u,1} + \tilde{\theta}_j \vec{z}_j}^{n_u}, \overbrace{0^{w_u}}^{w_u}, \overbrace{\vec{\tilde{\eta}}_j, 0}^{z_u \, 1}\right)_{\mathbb{H}_u^*} \tilde{W}_{1,j},$$

if $\tilde{\rho}(j) = \neg (u, \vec{z}_j)$, $$\vec{\tilde{\eta}}_j \xleftarrow{U} \mathbb{F}_q^{z_u},$$

$$\tilde{k}_j^{*rk} := \left(\overbrace{\tilde{s}_j \vec{z}_j}^{n_u}, \overbrace{0^{w_u}}^{w_u}, \vec{\tilde{\eta}}_j, 0\right)_{\mathbb{H}_u^*} \tilde{W}_{1,j},$$

$$\hat{\mathbb{D}}_0^* := (d_{0,i}^* := b_{0,i}^* W_{1,0})_{i=3,4,7,8},$$

$$\hat{\mathbb{D}}_t^* := (d_{t,i}^* := b_{0,i}^* W_{1,t})_{i=n_t+w_t+1, \ldots, n_t+w_t+z_t} \text{ for } l=1,$$

$$\ldots, L,$$

$$\hat{\mathbb{U}}_j^* := (u_{j,i}^* := b_{0,i}^* \tilde{W}_{1,j})_{i=n_u+w_u+1, \ldots, n_u+w_u+z_u} \text{ for } j=1,$$

$$\ldots, \tilde{L},$$

return $rk_{\Gamma,S'} :=$ $$(\mathbb{S}, \hat{\mathbb{S}}, \Gamma', \{k_i^{*rk}, \hat{\mathbb{D}}_i^*\}_{i=0,\ldots,L}, \{\tilde{k}_j^{*rk}, \hat{\mathbb{U}}_j^*\}_{j=1,\ldots,\tilde{L}}, ct^{rk}_{\Gamma'}).$$

The function and operation of the re-encryption device 400 will be described.

As indicated in FIG. 22, the re-encryption device 400 is provided with a public parameter reception part 410, a ciphertext reception part 420, a re-encryption key reception part 430, a verification part 440, an encryption part 450, and a re-ciphertext transmission part 460 (re-ciphertext output part). The verification part 440 is provided with a span program calculation part 441 and a signature verification part 442. The encryption part 450 is provided with a random number generation part 451, an f vector generation part 452, an s vector generation part 453, a conversion information $W_2$ generation part 454, a conversion information $W_2$ encryption part 455, a ciphertext $c^{renc}$ generation part 456, and a decryption key $k^{*renc}$ generation part 457.

The process of the REnc algorithm will be described with reference to FIG. 27.

(S1101: Public Parameter Reception Step)

For example, with the communication device, the public parameter reception part 410 receives the public parameters pk generated by the key generation device 100, via the network.

(S1102: Ciphertext Reception Step)

For example, with the communication device, the ciphertext reception part 420 receives the ciphertext $ct_\Gamma$ transmitted by the encryption device 200, via the network.

(S1103: Re-encryption Key Reception Step)

For example, with the communication device, the re-encryption key reception part 430 receives the re-encryption key $rk_{S,\Gamma'}$ transmitted from the decryption device 300, via the network.

(S1104: Span Program Calculation Step)

With the processing device, the span program calculation part 441 determines whether or not the access structure S included in the re-encryption key $rk_{S,\Gamma'}$ accepts $\Gamma$ included in the ciphertext $ct_\Gamma$, and determines whether or not the access structure S~ included in the re-encryption key $rk_{S,\Gamma'}$ accepts $\Gamma$~ included in the ciphertext $ct_\Gamma$. The method of determining whether or not the access structure S accepts $\Gamma$ and whether or not the access structure S~ accepts $\Gamma$~ is as described in "3. Concept for Implementing FCPRE" of Embodiment 1.

If the access structure S accepts $\Gamma$ and the access structure S~ accepts $\Gamma$~ (ACCEPT in S1104), the span program calculation part 441 advances the process to (S1105). If the access structure S rejects $\Gamma$ or the access structure S~ rejects $\Gamma$~ (REJECT in S1104), the span program calculation part 441 ends the process.

(S1105: Signature Verification Step)

With the processing device, the signature verification part 442 determines whether or not the result of calculating Formula 208 is 1. If the result is 1 (VALID in S1105), the signature verification part 442 advances the process to (S506). If the result is 0 (INVALID in S1105), the signature verification part 442 ends the process.

Ver(verk,C,Sig)

where $$C := (\Gamma, \tilde{\Gamma}, c_0, \{c_t\}_{(t, \vec{x}_t) \in \Gamma}, \{\tilde{c}_u\}_{(u, \vec{y}_u)}, \Sigma \tilde{\Gamma}, c_T) \quad [\text{Formula 208}]$$

(S1106: Random Number Generation Step)

With the processing device, the random number generation part 451 generates random numbers as indicated in Formula 209.

$$\pi', \delta', \zeta, \varphi'_0, \xleftarrow{U} \mathbb{F}_q, \quad [\text{Formula 209}]$$

$$\vec{\eta}' \xleftarrow{U} \mathbb{F}_q^2,$$

$$\varphi'_t \xleftarrow{U} \mathbb{F}_q \text{ for } (t, \vec{x}_t) \in \Gamma,$$

$$\tilde{\varphi}'_u \xleftarrow{U} \mathbb{F}_q \text{ for } (u, \vec{y}_u) \in \tilde{\Gamma}$$

(S1107: f Vector Generation Step)

With the processing device, the f vector generation part 452 generates vectors $\vec{f}'$ and $\vec{f}^{\sim'}$ randomly, as indicated in Formula 210.

$$\vec{f}' \xleftarrow{U} \mathbb{F}_q^r, \quad [\text{Formula 210}]$$

$$\vec{\tilde{f}}' \xleftarrow{U} \mathbb{F}_q^{\tilde{r}}$$

(S1108: s Vector Generation Step)

With the processing device, the s vector generation part 453 generates vectors $\vec{s}'^T$ and $\vec{\tilde{s}}'^T$, as indicated in Formula 211.

$$\vec{s}'^T := (s_1', \ldots, s_L')^T := M \cdot \vec{f}'^T,$$

$$\vec{\tilde{s}}'^T := (\tilde{s}_1', \ldots, \tilde{s}_{\tilde{L}}')^T := \tilde{M} \cdot \vec{\tilde{f}}'^T \quad [\text{Formula 211}]$$

With the processing device, the s vector generation part 453 generates values $s_0'$, and $\tilde{s}_0'$, as indicated in Formula 212.

$$s_0' := \vec{1} \cdot \vec{f}'^T,$$

$$\tilde{s}_0' := \vec{1} \cdot \vec{\tilde{f}}'^T \quad [\text{Formula 212}]$$

(S1109: Conversion Information $W_2$ Generation Step)

With the processing device, the conversion information $W_2$ generation part 454 generates conversion information $W_{2,0}$, $W_{2,t}$, and $W_{2,u}$, as indicated in Formula 213.

$$W_{2,0} \xleftarrow{R} GL(9, \mathbb{F}_q), \quad [\text{Formula 213}]$$

$$W_{2,t} \xleftarrow{R} GL(N_t, \mathbb{F}_q) \text{ for } (t, \vec{x}_t) \in \Gamma,$$

$$W_{2,u} \xleftarrow{R} GL(N_u, \mathbb{F}_q) \text{ for } (u, \vec{y}_u) \in \tilde{\Gamma}$$

(S1110: Conversion Information $W_2$ Encryption Step)

With the processing device, the conversion information $W_2$ encryption part 455 calculates Formula 214, to encrypt the conversion information $W_{2,0}$, $W_{2,t}$, and $W_{2,u}$ by functional encryption, thereby generating encrypted conversion information $ct^{renc}_{S^\wedge}$ ($\phi^{renc}$). As the conversion information $W_{2,0}$, $W_{2,t}$, and $W_{2,u}$ are encrypted by functional encryption that takes as input the attribute set $\Gamma'$, they are encrypted by setting the attribute information of the user capable of decrypting the re-ciphertext $rct_{\Gamma'}$.

$$ct^{renc}_{\Gamma'} \xleftarrow{R} Enc_{KP-FE}(pk^{KP-FE}, \quad [\text{Formula 214}]$$

$$\Gamma', W_{2,0}, (\{W_{2,t}\}_{(t,\vec{x}_t) \in \Gamma}, \{W_{2,u}\}_{(u,\vec{y}_u) \in \tilde{\Gamma}}))$$

(S1111: Ciphertext $c^{renc}$ Generation Step)

With the processing device, the ciphertext $c^{renc}$ generation part 456 generates a ciphertext $c^{renc}_0$, as indicated in Formula 215.

$$c^{renc}_0 := (c_0 + \tilde{c}_0 + (\zeta', \delta', \pi'(\text{ver}k,1), 0^2, 0^2, \phi_0')\mathbb{B}_0) W_{2,0} \quad [\text{Formula 215}]$$

With the processing device, the ciphertext $c^{renc}$ generation part 456 generates a ciphertext $c^{renc}_t$ for each integer t included in the attribute information $\Gamma$, as indicated in Formula 216.

$$c^{renc}_t := (c_t + (\delta' \vec{x}_t, 0^{w_t}, 0^{w_t}, \phi'_t)\mathbb{B}_t) W_{2,t} \text{ for } (t,\vec{x}_t) \in \Gamma \quad [\text{Formula 216}]$$

With the processing device, the ciphertext $c^{renc}$ generation part 456 generates a ciphertext $c^{renc}_T$, as indicated in Formula 217.

$$c^{renc}_T := c_T \cdot \tilde{c}_T \cdot g_T^\zeta \quad [\text{Formula 217}]$$

With the processing device, the ciphertext $c^{renc}$ generation part 456 generates a ciphertext $c^{renc}_u$ for each integer u included in the attribute information $\tilde{\Gamma}$, as indicated in Formula 218.

$$\tilde{c}^{renc}_u := (\tilde{c}_u + (\delta' \vec{y}_u, 0^{w_u}, 0^{z_u}, \tilde{\varphi}'_u)) \mathbb{B}_u \, W_{2,u} \text{ for } (u, \vec{y}_u) \in \tilde{\Gamma} \quad \text{[Formula 218]}$$

(S1112: Decryption Key $k^{*renc}$ Generation Step)

With the processing device, the decryption key $k^{*renc}$ generation part 457 generates a decryption key $k^{*renc}_0$, as indicated in Formula 219.

$$k_0^{*renc} := (k_0^{*rk} + (0, -s'_0 - \tilde{s}'_0, \sigma(-1, \text{ver}k),$$
$$0^2, \vec{\eta}'_0, 0) \mathbb{D}_0^*) W_{1,0} \quad \text{[Formula 219]}$$

With the processing device, the decryption key $k^{*renc}$ generation part 457 generates a decryption key $k^{*renc}_i$ for each integer i of i=1, ..., L, as indicated in Formula 220.

for i = 1, ..., L, [Formula 220]

if $\rho(i) = (t, \vec{v}_i)$, $$k_i^{*renc} := k_i^{*rk} + \left( \overbrace{s'_i \vec{e}_{t,1} + \theta'_i \vec{v}_i}^{n_t}, \overbrace{0^{w_t}}^{w_t}, \overbrace{\vec{\eta}'_i, 0}^{\frac{z_t}{1}} \right)_{\mathbb{D}_t},$$

if $\rho(i) = \neg (t, \vec{v}_i)$, $$k_i^{*renc} := k_i^{*rk} + \left( \overbrace{s'_i \vec{v}_i}^{n_t}, \overbrace{0^{w_t}}^{w_t}, \overbrace{\vec{\eta}'_i, 0}^{\frac{z_t}{1}} \right)_{\mathbb{D}_t},$$

With the processing device, the decryption key $k^{\sim *renc}$ generation part 457 generates a decryption key $\tilde{k}^{*renc}_j$ for each integer j of j=1, ..., as indicated in Formula 221.

for j = 1, ..., $\tilde{L}$, [Formula 221]

if $\tilde{\rho}(j) = (u, \vec{z}_j)$, $$\tilde{k}_j^{*renc} := \tilde{k}_j^{*rk} + \left( \overbrace{\tilde{s}'_j \vec{e}_{u,1} + \tilde{\theta}'_j \vec{z}_j}^{n_u}, \overbrace{0^{w_u}}^{w_u}, \overbrace{\vec{\tilde{\eta}}'_j, 0}^{\frac{z_u}{1}} \right)_{\mathbb{U}_u},$$

if $\tilde{\rho}(j) = \neg (u, \vec{z}_j)$, $$\tilde{k}_j^{*renc} := \tilde{k}_j^{*rk} + \left( \overbrace{\tilde{s}'_j \vec{z}_j}^{n_u}, \overbrace{0^{w_u}}^{w_u}, \overbrace{\vec{\tilde{\eta}}'_j, 0}^{\frac{z_u}{1}} \right)_{\mathbb{U}_u}$$

(S1113: Re-Ciphertext Transmission Step)

For example, with the communication device, the re-ciphertext transmission part 460 transmits the re-ciphertext $rct_{\Gamma'}$ constituted as elements by the attribute sets $\Gamma'$, $\Gamma$, and $\tilde{\Gamma}$, the access structures S and $\tilde{S}$, the decryption keys $k^{*renc}_0$, $k^{*renc}_i$, and $\tilde{k}^{*renc}_j$, the ciphertexts $c^{renc}_0$, $c^{renc}_t$, $c^{renc}_T$, and $\tilde{c}^{renc}_u$, and the encrypted conversion information $ct^{rk}_{\Gamma'}$ and $ct^{renc}_{\Gamma'}$, to the re-ciphertext decryption device 500 in secrecy via the network. The re-ciphertext $rct_{\Gamma'}$ may be transmitted to the decryption device 500 by another method, as a matter of course.

In brief, from (S1101) through (S1112), the re-encryption device 400 executes the REnc algorithm indicated in Formula 222-1, Formula 222-2, and Formula 222-3, to generate the re-ciphertext $rct_{\Gamma'}$. In (S1113), the re-encryption device 400 transmits the generated re-ciphertext $rct_{\Gamma'}$ to the re-ciphertext decryption device 500.

$REnc = (pk, rk_{\Gamma,S} := (S, \tilde{S}, \Gamma, \{k_i^{*rk}, \tilde{D}_i\}_{i=0,...,L}, \{\tilde{k}_j^{*rk},$
$\hat{U}\}_{j=1,...,\tilde{L}}), ct_{\Gamma}^{rk}), ct_{\Gamma'} := (\Gamma', \tilde{\Gamma}, c_0,$
$\{c_t\}_{(t,\vec{x}_t) \in \Gamma}, \{\tilde{c}_u\}_{(u,\vec{y}_u) \in \tilde{\Gamma}}, c_T, \text{ver}k, \text{Sig}))$ [Formula 222-1]

If S accepts $\Gamma$, $\tilde{S}$ accepts $\tilde{\Gamma}$, and Ver(verk,C,Sig)=1 then compute following $\pi', \delta', \zeta', \varphi'_0 \xleftarrow{U} F_q,$ $\vec{\eta}_0 \xleftarrow{U} F_q^2,$ $\varphi'_t \xleftarrow{U} F_q \text{ for } (t, \vec{x}_t) \in \Gamma,$ $\tilde{\varphi}'_u \xleftarrow{U} F_q \text{ for } (u, \vec{y}_u) \in \tilde{\Gamma},$ $\vec{f}' \xleftarrow{U} F_q^r, \vec{s}'^T := (s'_1, ..., s'_L)^T := M \cdot \vec{f}'^T,$ $\vec{\tilde{f}}' \xleftarrow{U} F_q^{\tilde{r}}, \vec{\tilde{s}}'^T := (\tilde{s}'_1, ..., \tilde{s}'_L)^T := \tilde{M} \cdot \vec{\tilde{f}}'^T,$ $s'_0 := \vec{1} \cdot \vec{f}'^T,$ $\tilde{s}'_0 := \vec{1} \cdot \vec{\tilde{f}}'^T,$ $W_{2,0} \xleftarrow{R} GL(9, F_q),$ $W_{2,t} \xleftarrow{R} GL(N_t, F_q) \text{ for } (t, \vec{x}_t) \in \Gamma,$ $W_{2,u} \xleftarrow{R} GL(N_u, F_q) \text{ for } (u, \vec{y}_u) \in \tilde{\Gamma},$ $ct^{renc}_{\Gamma'} \xleftarrow{R} Enc_{KP-FE}(pk^{KP-FE}, \Gamma',$ [Formula 222-2]
$W_{2,0}, (\{W_{2,t}\}_{(t,\vec{x}_t) \in \Gamma}, \{W_{2,u}\}_{(u,\vec{y}_u) \in \tilde{\Gamma}})),$ $c_0^{renc} := (c_0 + \tilde{c}_0 + (\zeta', \delta', \pi'(\text{ver}k, 1), 0^2, 0^2, \varphi'_0)B_0)$
$W_{2,0},$ $c_t^{renc} := (c_t + (\delta' \vec{x}_t, 0^{w_t}, 0^{z_t}, \varphi'_t)B_t)W_{2,t} \text{ for } (t, \vec{x}_t) \in \Gamma,$ $c_T^{renc} := c_T \cdot \tilde{c}_T \cdot g_T^{\zeta'},$ $\tilde{c}_u^{renc} := (c_u + (\delta' \vec{y}_u, 0^{w_u}, 0^{z_u}, \tilde{\varphi}'_u)B_u)$
$W_{2,u} \text{ for } (u, \vec{y}_u) \in \tilde{\Gamma},$ $k_0^{*renc} := \left( k_0^{*rk} + \left( 0, -s'_0 - \tilde{s}'_0, \sigma(-1, \text{ver}k), 0^2, \vec{\eta}'_0, 0 \right)_{\mathbb{D}_0^*} \right)$
$W_{1,0},$ for i = 1, ..., L,
if $\rho(i) =$
$(t, \vec{v}_i := (v_{i,1}, ..., v_{i,n_t}) \in F_q^{n_t} \setminus \{\vec{0}\})(v_{i,n_t} \neq 0),$ $\theta'_i \xleftarrow{U} F_q, \vec{\eta}'_i \xleftarrow{U} F_q^{z_t},$ $k_i^{*renc} := k_i^{*rk} + \left( \overbrace{s'_i \vec{e}_{t,1} + \theta'_i \vec{v}_i}^{n_t}, \overbrace{0^{w_t}}^{w_t}, \overbrace{\vec{\eta}'_i, 0}^{\frac{z_t}{1}} \right)_{\mathbb{D}_t},$ if $\rho(i) = \neg (t, \vec{v}_i), \vec{\eta}'_i \xleftarrow{U} F_q^{z_t},$ $k_i^{*renc} := k_i^{*rk} + \left( \overbrace{s'_i \vec{v}_i}^{n_t}, \overbrace{0^{w_t}}^{w_t}, \overbrace{\vec{\eta}'_i, 0}^{\frac{z_t}{1}} \right)_{\mathbb{D}_t},$ for j = 1, ..., $\tilde{L}$, [Formula 222-3]
if $\tilde{\rho}(j) =$
$(u, \vec{z}_j := (z_{j,1}, ..., z_{j,n_u}) \in F_q^{n_u} \setminus \{\vec{0}\})(z_{j,n_u} \neq 0),$ $\tilde{\theta}'_j \xleftarrow{U} F_q, \vec{\tilde{\eta}}'_j \xleftarrow{U} F_q^{z_t},$ $\tilde{k}_j^{*renc} := \tilde{k}_j^{*rk} + \left( \overbrace{\tilde{s}'_j \vec{e}_{u,1} + \tilde{\theta}'_j \vec{z}_j}^{n_u}, \overbrace{0^{w_u}}^{w_u}, \overbrace{\vec{\tilde{\eta}}'_j, 0}^{\frac{z_u}{1}} \right)_{\mathbb{U}_u},$ if $\tilde{\rho}(j) = \neg (u, \vec{z}_j), \vec{\tilde{\eta}}'_i \xleftarrow{U} F_q,$ $\tilde{k}_j^{*renc} := \tilde{k}_j^{*rk} + \left( \overbrace{\tilde{s}'_j \vec{z}_j}^{n_u}, \overbrace{0^{w_u}}^{w_u}, \overbrace{\vec{\tilde{\eta}}'_j, 0}^{\frac{z_u}{1}} \right)_{\mathbb{U}_u},$ return $rct_{\Gamma'} :=$ $(\Gamma', S, \tilde{S}, \Gamma, \tilde{\Gamma} \{k_i^{*renc}\}_{i=1,...,L}, \{\tilde{k}_j^{*renc}\}_{j=1,...,\tilde{L}},$ $\{c_t^{renc}\}_{t=0,(t,\vec{x}_t) \in \Gamma}, \{\tilde{c}_u^{renc}\}_{(u,\vec{y}_u) \in \tilde{\Gamma}}, c_T^{renc}, ct_\Gamma^{rk}, ct_{\Gamma'}^{renc}).$ The function and operation of the re-ciphertext decryption device 500 will be described.

As illustrated in FIG. 23, the re-ciphertext decryption device 500 is provided with a decryption key reception part 510, a ciphertext reception part 520, a span program calculation part 530, a complementary coefficient calculation part 540, a conversion information generation part 550, a conversion part 560, a pairing operation part 570, and a message calculation part 580. The pairing operation part 570 and the message calculation part 580 will be collectively referred to as a decryption part.

The process of the Dec1 algorithm will be described with reference to FIG. 28.

(S1201: Decryption Key Reception Step)

For example, with the communication device, the decryption key reception part 510 receives the decryption key $sk_{S'}$ transmitted from the key generation device 100, via the network. The decryption key reception part 310 also receives the public parameters pk generated by the key generation device 100.

(S1202: Ciphertext Reception Step)

For example, with the communication device, the ciphertext reception part 520 receives the re-ciphertext $rct_{\Gamma'}$ transmitted by the re-encryption device 400, via the network.

(S1203: Span Program Calculation Step)

With the processing device, the span program calculation part 530 determines whether or not the access structure S' included in the decryption key $sk_{S'}$ accepts Γ' included in the re-ciphertext $rct_{\Gamma'}$, and determines whether or not the access structure S~ included in the re-ciphertext $rct_{\Gamma'}$ accepts Γ~ included in the re-ciphertext $rct_{\Gamma'}$. The method of determining whether or not the access structure S' accepts Γ' and whether or not the access structure S~ accepts Γ~ is as described in "3. Concept for Implementing FCPRE" of Embodiment 1.

If the access structure S' accepts Γ' and the access structure S~ accepts Γ~ (ACCEPT in S1203), the span program calculation part 530 advances the process to (S1204). If the access structure S' rejects Γ' or the access structure S~ rejects Γ~ (REJECT in S1203), the span program calculation part 530 ends the process.

(S1204: Complementary Coefficient Calculation Step)

With the processing device, the complementary coefficient calculation part 540 calculates I and J and constants (complementary coefficients) $\{\alpha_i\}_{i \in I}$ and $\{\tilde{\alpha}_j\}_{j \in J}$ which satisfy Formula 223.

$$\vec{1} = \Sigma_{i \in I} \alpha_i M_i, \vec{1} = \Sigma_{j \in J} \tilde{\alpha}_j \tilde{M}_J \quad \text{[Formula 223]}$$

where $M_i$ is the i-th row of M, $\tilde{M}_j$ is the j-th row of $\tilde{M}$ and $I \subseteq \{i \in \{1, \ldots, L\} | [\rho(i) = (t, \vec{v}_i)] \wedge (t, \vec{x}_t) \in$
$\Gamma \wedge \vec{v}_i \cdot \vec{x}_t = 0] \vee [\rho(i) = \neg(t, \vec{v}_i) \wedge (t, \vec{x}_t) \in$
$\Gamma \wedge \vec{v}_i \wedge \vec{x}_t \neq 0]\}$, $J \subseteq \{j \in \{1, \ldots, \tilde{L}, | [\tilde{\rho}(j) = (u, \vec{z}_j) \wedge (u, \vec{y}_u) \in \tilde{\Gamma} \wedge \vec{z}_j \cdot$
$\vec{y}_u = 0] \vee [\tilde{\rho}(j) = \neg(u, \vec{z}_j) \wedge (u, \vec{y}_u) \in \tilde{\Gamma} \wedge \vec{z}_j \cdot$
$\vec{y}_u \neq 0]\}$ (S1205: Conversion Information Generation Step)

With the processing device, the conversion information generation part 550 generates conversion information $W_{1,0}$, $W_{1,t}$, $\tilde{W}_{1,u}$, $W_{2,0}$, $W_{2,t}$, and $\tilde{W}_{2,u}$, as indicated in Formula 224.

$$(\{W_{1,t}\}_{t=0,\ldots,L}, \{\tilde{W}_{1,u}\}_{j=1,\ldots,\tilde{L}}, \mathbb{S}, \tilde{\mathbb{S}}) \xleftarrow{R} \quad \text{[Formula 224]}$$

$$Dec_{CP\text{-}FE}(pk^{CP\text{-}FE}, sk_{\Gamma'}^{CP\text{-}FE}, ct_{\mathbb{S}'}^{rk}),$$

$$(W_{2,0}, \{W_{2,t}\}_{(t,\vec{x}_t) \in \Gamma'}, \{\tilde{W}_{2,u}\}_{(u,\vec{y}_u) \in \tilde{\Gamma}'}) \xleftarrow{R}$$

$$Dec_{CP\text{-}FE}(pk^{CP\text{-}FE}, sk_{\Gamma'}^{CP\text{-}FE}, ct_{\mathbb{S}'}^{renc})$$

(S1206: Conversion Step)

With the processing device, the conversion part 560 generates the decryption keys $k^*_0$, $k^*_i$, and $\tilde{k}^*_j$, and generates the ciphertexts $c_0$, $c_t$, $\tilde{c}_u$, as indicated in Formula 225.

$$k_0^* := K_0^{*renc} W_{1,0}^{-1},$$

$$k_i^* := k_i^{*renc} W_{1,i}^{-1} \text{ for } i=1, \ldots, L,$$

$$\tilde{k}_j^* := k_j^{*renc} \tilde{W}_{1,j}^{-1} \text{ for } j=1, \ldots, \tilde{L},$$

$$c_0 := c_0^{renc} W_{2,0}^{-1},$$

$$c_t := c_t^{renc} W_{2,t}^{-1} \text{ for } (t, \vec{x}_t) \in \Gamma,$$

$$\tilde{c}_u := \tilde{c}_u^{renc} W_{2,u}^{-1} \text{ for } (u, \vec{y}_u) \in \tilde{\Gamma} \quad \text{[Formula 225]}$$

(S1207: Pairing Operation Step)

With the processing device, the pairing operation part 570 calculates Formula 226, to generate a session key K~.

$$\tilde{K} := e(c_0, k_0^*) \prod_{i \in I \wedge \rho(i) = (t, \vec{v}_i)} e(c_t^{renc}, k_i^*)^{\alpha_i} \quad \text{[Formula 226]}$$

$$\prod_{i \in I \wedge \rho(i) = \neg(t, \vec{v}_i)} e(c_t^{renc}, k_i^*)^{\alpha_i / (\vec{v}_i \cdot \vec{x}_t)}$$

$$\prod_{j \in J \wedge \tilde{\rho}(j) = (u, \vec{z}_j)} e(\tilde{c}_u^{renc}, \tilde{k}_j^*)^{\tilde{\alpha}_j}$$

$$\prod_{j \in J \wedge \tilde{\rho}(j) = \neg(u, \vec{z}_j)} e(\tilde{c}_u^{renc}, \tilde{k}_j^*)^{\tilde{\alpha}_j / (\vec{z}_j \cdot \vec{y}_u)}$$

(S1208: Message Calculation Step)

With the processing device, the message calculation part 580 calculates $m' = c_T^{renc} / \tilde{K}$, to generate a message m' (=m).

In brief, from (S1201) through (S1208), the re-ciphertext decryption device 500 executes the Dec1 algorithm indicated in Formula 227-1 and Formula 227-2, to generate the message message m' (=m).

$$Dec_1( \quad \text{[Formula 227-1]}$$

$$rct_{\Gamma'} := (\Gamma', \mathbb{S}, \tilde{\mathbb{S}}, \Gamma, \tilde{\Gamma}, \{k_i^{*renc}\}_{i=1,\ldots,L}, \{\tilde{k}_j^{*renc}\}_{j=1,\ldots,\tilde{L}},$$

$$\{c_t^{renc}\}_{i=0,(t,\vec{x}_t) \in \Gamma}, \{\tilde{c}_u^{renc}\}_{(u,\vec{y}_u) \in \tilde{\Gamma}}, c_T^{renc}, ct_{\Gamma'}^{rk}, ct_{\Gamma'}^{renc}),$$

$$sk_{\mathbb{S}} := (\Gamma, sk_{\mathbb{S}}^{KP\text{-}FE}, k_0^*, \{k_t^*\}_{i=1,\ldots,L}))$$

If $\mathbb{S}'$ accepts Γ' and $\tilde{\mathbb{S}}$ accepts $\tilde{\Gamma}$,
then compute I, J and $\{\alpha_i\}_{i \in I}$, $\{\tilde{\alpha}_j\}_{j \in J}$ such that $$\vec{1} = \Sigma_{i \in I} \alpha_i M_i, \vec{1} = \Sigma_{j \in J} \tilde{\alpha}_j \tilde{M}_j$$

where $M_i$ is the i-th row of M, $\tilde{M}_j$ is the j-th row of $\tilde{M}$ and $$I \subseteq \{i \in \{1, ..., L\} \mid [\rho(i) = (t, \vec{v}_i) \wedge (t, \vec{x}_t) \in \Gamma \wedge \vec{v}_i \cdot \vec{x}_t = 0] \vee [$$
$$\rho(i) = \neg (t, \vec{v}_i) \wedge (t, \vec{x}_t) \in \Gamma \wedge \vec{v}_i \cdot \vec{x}_t \neq 0]\},$$

$$J \subseteq \{j \in \{1, ..., \tilde{L}\} \mid [\tilde{\rho}(j) = (u, \vec{z}_j) \wedge (u, \vec{y}_u) \in \tilde{\Gamma} \wedge \vec{z}_j \cdot \vec{y}_u = 0] \vee [$$
$$\tilde{\rho}(j) = \neg (u, \vec{z}_j) \wedge (u, \vec{y}_u) \in \tilde{\Gamma} \wedge \vec{z}_j \cdot \vec{y}_u \neq 0]\},$$

$$(\{W_{1,t}\}_{t=0,...,L}, \{W_{1,u}\}_{j=1,...,\tilde{L}}, \mathbb{S}, \tilde{\mathbb{S}}) \xleftarrow{R}$$

$$Dec_{CP\text{-}FE}\left(pk^{CP\text{-}FE}, sk_{\Gamma'}^{CP\text{-}FE}, ct_{\mathbb{S}'}^{rk}\right),$$

$$(\{W_{2,t}\}_{(t,\vec{x}_t) \in \Gamma},$$

$$\{W_{2,u}\}_{(u,\vec{y}_u) \in \tilde{\Gamma}} \xleftarrow{R} Dec_{CP\text{-}FE}\left(pk^{CP\text{-}FE}, sk_{\Gamma'}^{CP\text{-}FE}, ct_{\tilde{\mathbb{S}}'}^{renc}\right),$$

$$k_0^* := k_0^{*renc} W_{0,1}^{-1}, \qquad \text{[Formula 227-2]}$$
$$k_i^* := k_i^{*renc} W_{1,i}^{-1} \text{ for } i = 1, ..., L,$$
$$\tilde{k}_j^* := k_j^{*renc} \tilde{W}_{1,j}^{-1} \text{ for } j = 1, ..., \tilde{L},$$
$$c_0 := c_0^{renc} W_{2,0}^{-1},$$
$$c_t := c_t^{renc} W_{2,u}^{-1} \text{ for } (t, \vec{x}_t) \in \Gamma,$$
$$\tilde{c}_u := \tilde{c}_u^{renc} W_{2,u}^{-1} \text{ for } (u, \vec{y}_u) \in \tilde{\Gamma},$$

$$\tilde{K} := e(c_0, k_0^*) \prod_{i \in I \wedge \rho(i) = (t,\vec{v}_i)} e(c_t^{renc}, k_i^*)^{\alpha_i}$$
$$\prod_{i \in I \wedge \rho(i) = \neg(t,\vec{v}_i)} e(c_t^{renc}, k_i^*)^{\alpha_i/(\vec{v}_i \cdot \vec{x}_t)}$$
$$\prod_{j \in \tilde{I} \wedge \tilde{\rho}(j) = (u,\vec{z}_j)} e(\tilde{c}_u^{renc}, \tilde{k}_j^*)^{\tilde{\alpha}_j}$$
$$\prod_{j \in \tilde{I} \wedge \tilde{\rho}(j) = \neg(u,\vec{z}_j)} e(\tilde{c}_u^{renc}, \tilde{k}_j^*)^{\tilde{\alpha}_j/(\vec{z}_j \cdot \vec{y}_u)}$$

$$m' := \tilde{c}_T / \tilde{K},$$
return $m'$.

The process of the Dec2 algorithm will be described with reference to FIG. 29.

(S1301: Decryption Key Reception Step)

For example, with the communication device, the decryption key reception part 310 receives the decryption key $sk_S$ transmitted from the key generation device 100, via the network. The decryption key reception part 310 also receives the public parameters pk generated by the key generation device 100.

(S1302: Ciphertext Reception Step)

For example, with the communication device, the ciphertext reception part 350 receives the ciphertext $ct_\Gamma$ transmitted by the re-encryption device 400, via the network.

(S1303: Span Program Calculation Step)

With the processing device, the span program calculation part 361 determines whether or not the access structure S included in the decryption key $sk_S$ accepts $\Gamma$ included in the ciphertext $ct_\Gamma$. The method of determining whether or not the access structure S accepts $\Gamma$ is as described in "3. Concept for Implementing FCPRE" of Embodiment 1.

If the access structure S accepts $\Gamma$ (ACCEPT in S1303), the span program calculation part 361 advances the process to (S1304). If the access structure S rejects $\Gamma$ (REJECT in S1303), the span program calculation part 361 ends the process.

(S1304: Signature Verification Step)

With the processing device, the signature verification part 362 determines whether or not the result of calculating Formula 228 is 1. If the result is 1 (VALID in S1304), the signature verification part 362 advances the process to (S1305). If the result is 0 (INVALID in S1304), the signature verification part 362 ends the process.

Ver(verk,C,Sig)

where $$C := (\Gamma, \tilde{\Gamma}, c_0, \{c_t\}_{(t,\vec{x}_t) \in \Gamma}, \{\tilde{c}_u\}_{(u,\vec{y}_u) \in \tilde{\Gamma}}, c_T) \qquad \text{[Formula 228]}$$

(S1305: Complementary Coefficient Calculation Step)

With the processing device, the complementary coefficient calculation part 370 calculates I and a constant (complementary coefficient) $\{\alpha_i\}_{i \in I}$ which satisfy Formula 229.

$$\vec{1} = \sum_{i \in I} \alpha_i M_i \qquad \text{[Formula 229]}$$

where $M_i$ is the i-th row of M, and $$I \subseteq \{i \in \{1, ..., L\} \mid [\rho(i) = (t, \vec{v}_i) \wedge (t, \vec{x}_t) \in \Gamma \wedge \vec{v}_i \cdot \vec{x}_t = 0] \vee [\rho(i) = \neg (t, \vec{v}_i) \wedge (t, \vec{x}_t) \in \Gamma \wedge \vec{v}_i \cdot \vec{x}_t \neq 0]\}$$

(S1306: Pairing Operation Step)

With the processing device, the pairing operation part 380 calculates Formula 230, to generate a session key K.

$$K := e(c_0, k_0^*) \cdot \prod_{i \in I \wedge \rho(i) = (t,\vec{v}_i)} e(c_i, k_i^*)^{\alpha_i} \cdot \prod_{i \in I \wedge \rho(i) = \neg(t,\vec{v}_i)} e(c_i, k_i^*)^{\alpha_i/(\vec{v}_i \cdot \vec{x}_t)} \qquad \text{[Formula 230]}$$

(S1307: Message Calculation Step)

With the processing device, the message calculation part 390 calculates $m' = c^{enc}_{d+1}/K$, to generate a message $m'$ ($=m$).

In brief, from (S1301) through (S1307), the decryption device 300 executes the Dec2 algorithm indicated in Formula 231, to generate the message message $m'$ ($=m$).

$$Dec_2(pk, sk_\Gamma := (\Gamma, s k_\mathbb{S} := (\Gamma, s k_\mathbb{S}^{KP\text{-}FE}, k_0^*,$$
$$\{k_t^*\}_{t=1,...,L}), ct_\Gamma := (\Gamma, \tilde{\Gamma}, c_0, \{c_t\}_{(t,\vec{x}_t) \in \Gamma}, \{\tilde{c}_u\}_{(u,\vec{y}_u) \in \tilde{\Gamma}}, c_T, verk, Sig)) \qquad \text{[Formula 231]}$$

If $\mathbb{S}$ accepts $\Gamma := \{(t, \vec{x}_t)\}$
and Ver(verk,C,Sig)=1,
then compute I and $\{\alpha_i\}_{i \in I}$ such that $$\vec{1} = \sum_{i \in I} \alpha_i M_i$$

where $M_i$ is the i-th row of M, and $$I \subseteq \{i \in \{1, ..., L\} \mid [\rho(i) = (t, \vec{v}_i) \wedge (t, \vec{x}_t) \in \Gamma \wedge \vec{v}_i \cdot \vec{x}_t = 0] \vee$$
$$[\rho(i) = \neg (t, \vec{v}_i) \wedge (t, \vec{x}_t) \in \Gamma \wedge \vec{v}_i \cdot \vec{x}_t \neq 0]\}$$

-continued $$K := e(c_0, k_0^*) \cdot \prod_{i \in I \wedge \rho(i)=(t,\vec{v}_i)} e(c_t, k_i^*)^{\alpha_i} \cdot \prod_{i \in I \wedge \rho(i)=\neg(t,\vec{v}_i)} e(c_t, k_i^*)^{\alpha_i/(\vec{v}_i \cdot \vec{x}_t)}$$

$m' = c_T/K,$ return $m'$.

As has been described above, the cryptographic system according to Embodiment 2 is capable of implementing the KP-FCPRE scheme. Therefore, with a single re-encryption key, a ciphertext can be transferred to a group of various types of users. Furthermore, a condition for designating a ciphertext to be re-encrypted can be specified.

In the above explanation, the decryption device 300 also serves as a re-encryption key generation device, and the decryption device 300 executes not only the Dec2 algorithm but also the RKG algorithm. Alternatively, the decryption device 300 and the re-encryption key generation device may be separate devices. In this case, the decryption device 300 executes the Dec2 algorithm and the re-encryption key generation device executes the RKG algorithm. Accordingly, in this case, the decryption device 300 is provided with a functional configuration necessary for executing the Dec2 algorithm, and the re-encryption key generation device is provided with a functional configuration necessary for executing the RKG algorithm.

In the above explanation, $n_t+w_t+z_t+1$ is set to $N_t$. Alternatively, $n_t+w_t+z_t+\beta_t$ may be set to $N_t$ where $\beta_t$ is an integer of not less than 0.

In the above explanation, 9 is set to $N_0$. Alternatively, $1+1+2+w_0+z_0+\beta_0$ may be set to $N_0$ where $w_0$, $z_0$, and $\beta_0$ are each an integer of not less than 0.

In the above explanation, $\pi'(\text{verk},1)$ in the ciphertext $c^{\sim renc}_0$ generated in S1111 is additional information H, and $\sigma(-1,\text{verk})$ in the decryption key $k^{*renc}_0$ generated in S1112 is additional information $\Theta$. The additional information H and the additional information $\Theta$ are related to each other and are canceled by the pairing operation executed in S1207. Although the security may be somewhat degraded, in place of verk, a value such as a random value may be included in the additional information.

In the above embodiments, assuming a case where a message is encrypted by FE and transmitted to the destination, explanation has been made on how the re-encryption device 400 re-encrypts a ciphertext and changes the destination of the ciphertext.

FE can implement not only the function of encrypting a message and transmitting the message to the destination, but can also implement searchable encryption that renders a ciphertext searchable without decrypting the ciphertext. When searchable encryption is implemented by FE, a preset search keyword can be changed by the algorithms described in the above embodiments.

In the above embodiments, the attribute information set in the ciphertext designates a user who can decrypt. The destination of the ciphertext is changed by changing the attribute information. When searchable encryption is to be implemented by FE, some portion of the attribute information set in the ciphertext designates the user who can search. Part of the remaining portion of the attribute information designates a search keyword. Hence, when that part of the attribute information which designates the search keyword is changed by utilizing the algorithms described in the above embodiments, the preset keyword can be changed.

In the above embodiments, the decryption key is generated by the single key generation device 100. However, it is also possible to combine the algorithms of the above embodiments with the decentralized multi-authority scheme described in Non-Patent Literature 5, so that one decryption key is generated by a plurality of key generation devices 100.

In the above embodiments, when an attribute category is to be added (when the value of d in the attribute format $\vec{n}$ is to be increased), public parameters need be issued again. However, it is also possible to combine the algorithms of the above embodiments with the Unbounded scheme described in Non-Patent Literature 6, so that the attribute category can be added without issuing the public parameters again.

In the above embodiments, assuming that the length of a vector used for inner-product cryptography is N, the sizes of the public parameters and of the master secret key are each proportional to $N^2$, and a time proportional to $N^2$ is needed for generating the decryption key to be given to the user and for the encryption process. However, it is also possible to combine the algorithms of the above embodiments with the scheme described in Non-Patent Literature 7, so that the sizes of the public parameters and of the master secret keys are reduced, and the time needed for generating the decryption key to be given to the user and for the encryption process is shortened.

In the above embodiments, the keys and ciphertexts are transmitted to the transmission destination device. Alternatively, the keys and ciphertexts may be outputted to a storage medium such as a CD or DVD, and the transmission destination device may read the storage medium.

Embodiment 3

In the above embodiments, a method of implementing the cryptographic process in the dual vector spaces has been described. In Embodiment 3, a method of implementing a cryptographic process in dual additive groups will be described.

More specifically, in the above embodiments, the cryptographic process is implemented in the cyclic group of the prime order q. If a ring R is expressed as indicated in Formula 232 using a composite number M, the cryptographic process described in the above embodiments can also be applied to a module having the ring R as a coefficient.

$$\mathbb{R} := \mathbb{Z}/M\mathbb{Z} \qquad \text{[Formula 232]}$$

where $\mathbb{Z}$: an integer; and

M: a composite number

If $F_R$ in the algorithms described in the above embodiments is changed to R, the cryptographic process in dual additive groups can be implemented.

From the viewpoint of security proof, in the above embodiments, $\rho(i)$ for each integer i of i=1, ..., L may be limited to a positive tuple $(t,\vec{v})$ or negative tuple $\neg(t,\vec{v})$ for different identification information t.

In other words, when $\rho(i)=(t,\vec{v})$ or $\rho(i)=\neg(t,\vec{v})$, let a function $\rho^\sim$ be map of $\{1, \ldots, L\} \to \{1, \ldots, d\}$ with which $\rho^\sim(i)=t$ is established. In this case, $\rho^\sim$ may be limited to injection. Note that $\rho(i)$ is $\rho(i)$ in the access structure $S:=(M,\rho(i))$ described above.

The hardware configuration of the cryptographic system 10 (the key generation device 100, the encryption device 200, the decryption device 300, the re-encryption device 400, and the re-ciphertext decryption device 500) in the above embodiments will be described.

Figure 30:
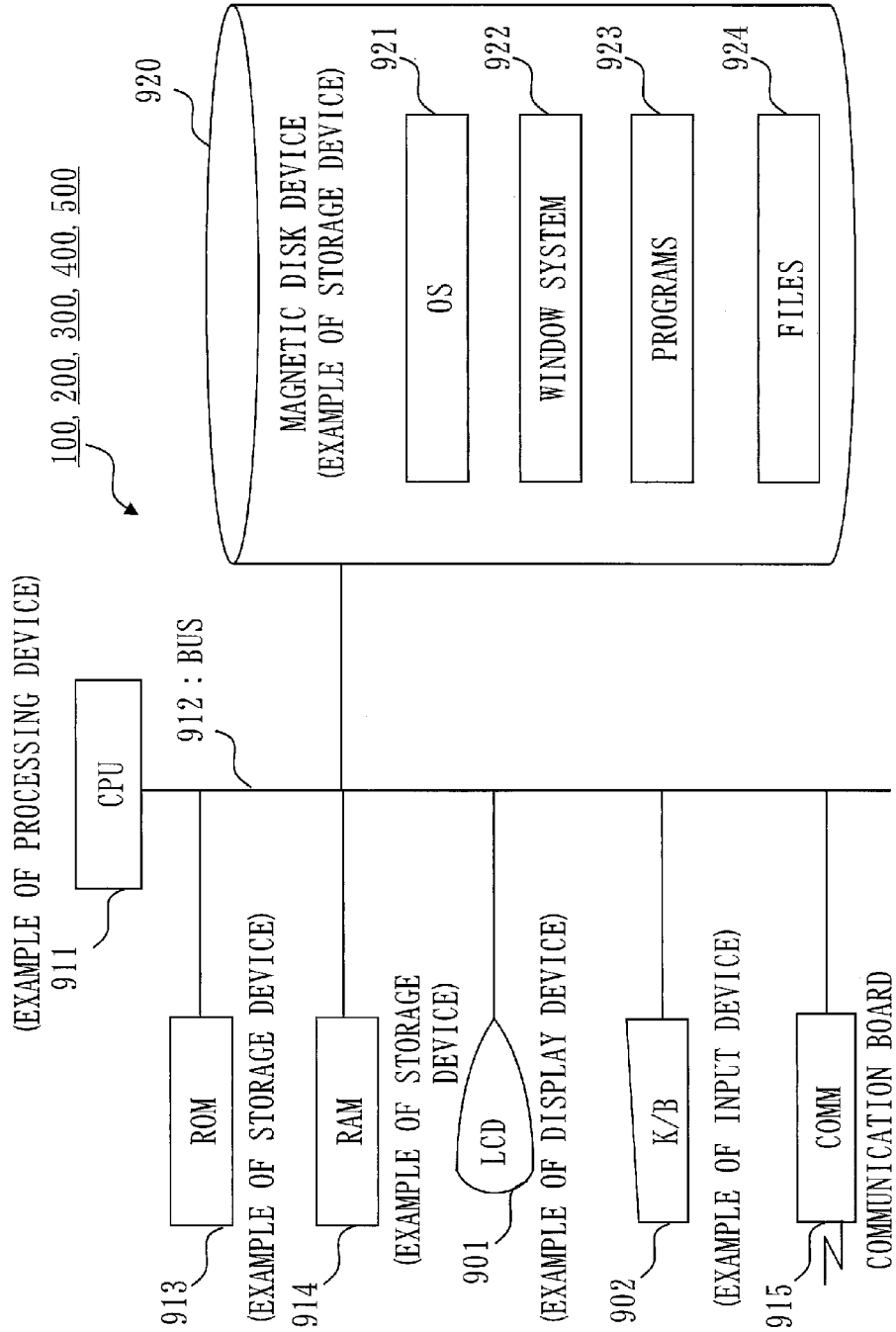
FIG. 30 is a diagram illustrating an example of the hardware configuration of the key generation device 100, encryption device 200, decryption device 300, re-encryption device 400, and re-ciphertext decryption device 500.

FIG. 30 is a diagram illustrating an example of the hardware configuration of the key generation device 100, encryption device 200, decryption device 300, re-encryption device 400, and re-ciphertext decryption device 500.

As illustrated in FIG. 30, each of the key generation device 100, encryption device 200, decryption device 300, re-encryption device 400, and re-ciphertext decryption device 500 includes the CPU 911 (also referred to as a Central Processing Unit, central processing device, processing device, computation device, microprocessor, microcomputer, or processor) which executes programs. The CPU 911 is connected to the ROM 913, the RAM 914, an LCD 901 (Liquid Crystal Display), a keyboard 902 (K/B), the communication board 915, and the magnetic disk device 920 via a bus 912, and controls these hardware devices. In place of the magnetic disk device 920 (fixed disk device), a storage device such as an optical disk device or memory card read/write device may be employed. The magnetic disk device 920 is connected via a predetermined fixed disk interface.

The ROM 913 and the magnetic disk device 920 are examples of a nonvolatile memory. The RAM 914 is an example of a volatile memory. The ROM 913, the RAM 914, and the magnetic disk device 920 are examples of the storage device (memory). The keyboard 902 and the communication board 915 are examples of the input device. The communication board 915 is an example of the communication device. Furthermore, the LCD 901 is an example of a display device.

The magnetic disk device 920, ROM 913, or the like stores an operating system 921 (OS), a window system 922, programs 923, and files 924. The CPU 911, the operating system 921, and the window system 922 execute each program of the programs 923.

The programs 923 store software and programs that execute the functions described as the "master key generation part 110", "master key storage part 120", "information input part 130", "decryption key generation part 140", "key transmission part 150", "public parameter reception part 210", "information input part 220", "signature processing part 230", "encryption part 240", "ciphertext transmission part 250", "decryption key reception part 310", "information input part 320", "re-encryption key generation part 330", "re-encryption key transmission part 340", "ciphertext reception part 350", "verification part 360", "complementary coefficient calculation part 370", "pairing operation part 380", "message calculation part 390", "public parameter reception part 410", "ciphertext reception part 420", "re-encryption key reception part 430", "verification part 440", "encryption part 450", "re-ciphertext transmission part 460", "decryption key reception part 510", "ciphertext reception part 520", "span program calculation part 530", "complementary coefficient calculation part 540", "conversion information generation part 550", "conversion part 560", "pairing operation part 570", "message calculation part 580", and the like in the above description. The programs 923 store other programs as well. The programs are read and executed by the CPU 911.

The files 924 store information, data, signal values, variable values, and parameters such as the "public parameters pk", "master secret key sk", "decryption keys $sk_S$ and $sk_\Gamma$", "ciphertexts $ct_\Gamma$ and $ct_S$", "re-encryption keys $rk_{\Gamma,S'}$ and $rk_{S,\Gamma'}$", "re-ciphertexts $rct_{S'}$ and $rct_{\Gamma'}$", "access structures S, S', and S~", "attribute sets Γ, Γ', and Γ~", "message m", and the like of the above explanation, as the items of a "file" and "database". The "file" and "database" are stored in a recording medium such as a disk or memory. The information, data, signal values, variable values, and parameters stored in the recording medium such as the disk or memory are read out to the main memory or cache memory by the CPU 911 through a read/write circuit, and are used for the operations of the CPU 911 such as extraction, search, look-up, comparison, computation, calculation, process, output, print, and display. The information, data, signal values, variable values, and parameters are temporarily stored in the main memory, cache memory, or buffer memory during the operations of the CPU 1911 including extraction, search, look-up, comparison, computation, calculation, process, output, print, and display.

The arrows of the flowcharts in the above explanation mainly indicate input/output of data and signals. The data and signal values are stored in the memory of the RAM 914, in the recording medium such as an optical disk, or in an IC chip. The data and signals are transmitted online via a transmission medium such as the bus 912, signal lines, or cables; or via electric waves.

The "part" in the above explanation may be a "circuit", "device", "equipment", "means" or "function"; or a "step", "procedure", or "process". The "device" may be a "circuit", "equipment", "means", or "function"; or a "step", "procedure", or "process". The "process" may be a "step". Namely, the "part" may be implemented as firmware stored in the ROM 913. Alternatively, the "part" may be practiced as only software; as only hardware such as an element, a device, a substrate, or a wiring line; as a combination of software and hardware; or furthermore as a combination of software, hardware, and firmware. The firmware and software are stored, as programs, in the recording medium such as the ROM 913. The program is read by the CPU 911 and executed by the CPU 911. Namely, the program causes the computer to function as the "part" described above. Alternatively, the program causes the computer or the like to execute the procedure and method of the "part" described above.

REFERENCE SIGNS LIST

100: key generation device; 110: master key generation part; 120: master key storage part; 130: information input part; 140: decryption key generation part; 141: CP-FE key generation part; 142: random number generation part; 143: decryption key k* generation part; 144: KP-FE key generation part; 145: f vector generation part; 146: s vector generation part; 150: key transmission part; 200: encryption device; 210: public parameter reception part; 220: information input part; 230: signature processing part; 240: encryption part; 241: f vector generation part; 242: s vector generation part; 243: random number generation part; 244: ciphertext c generation part; 250: ciphertext transmission part; 300: decryption device; 310: decryption key reception part; 320: information input part; 330: re-encryption key generation part; 331: random number generation part; 332: conversion information $W_1$ generation part; 333: conversion information $W_1$ encryption part; 334: decryption key $k^{*rk}$ generation part; 335: conversion part; 336: f vector generation part; 337: s vector generation part; 340: re-encryption key transmission part; 350: ciphertext reception part; 360: verification part; 361: span program calculation part; 362: signature verification part; 370: complementary coefficient calculation part; 380: pairing operation part; 390: message calculation part; 400: re-encryption device; 410: public parameter reception part; 420: ciphertext reception part; 430: re-encryption key reception part; 440: verification part; 441: span program calculation part; 442: signature verification part; 450: encryption part; 451: random number generation part; 452: f vector generation part; 453: s vector generation part; 454: conversion information $W_2$ generation part; 455: conversion information $W_2$ encryption part; 456: ciphertext $c^{renc}$ generation part; 457: decryption key $k^{*renc}$ generation part; 460: re-ciphertext transmission part; 500: re-ciphertext decryption device; 510: decryption key reception part; 520: ciphertext reception part; 530: span program calculation part; 540: complementary coefficient calculation part; 550: conversion information generation part; 560: conversion part; 570: pairing operation part; 580: message calculation part

The invention claimed is:

1. A cryptographic system that implements a proxy re-encryption function in a cryptographic scheme for decrypting a ciphertext with a decryption key, the ciphertext being set with one of two pieces of information related to each other, the decryption key being set with the other one of the two pieces of information, the cryptographic system comprising:

an encryption computer device to output a ciphertext ct including a ciphertext c and a ciphertext c~, the ciphertext c being set with one of attribute information x and attribute information v related to each other, the ciphertext c~ being set with one of attribute information y and attribute information z related to each other;

a re-encryption key generator to acquire a decryption key k* which is set with the other one of the attribute information x and the attribute information v, and to output a re-encryption key rk including a decryption key $k^{*rk}$ a decryption key $k^{~*rk}$ and encrypted conversion information $\phi^{rk}$, the decryption key $k^{*rk}$ being obtained by converting the acquired decryption key k* with conversion information $W_1$, the decryption key $k^{~*rk}$ being set with the other one of the attribute information y and the attribute information z, the encrypted conversion information $\phi^{rk}$ being obtained by encrypting the conversion information $W_1$ by setting one of attribute information x' and attribute information v' related to each other; and a re-encryption computer device to output a re-ciphertext rct including a ciphertext $c^{renc}$ and a decryption key $k^{*renc}$, the ciphertext $c^{renc}$ being obtained by setting one of additional information H and additional information Θ related to each other to the ciphertext ct, the decryption key $k^{*renc}$ being obtained by setting the other one of the additional information H and the additional information Θ to the re-encryption key rk;

the system thereby establishing an encryption key, decryption key, and re-encryption key with improved flexibility of usage to enhance cybertext security.

2. The cryptographic system according to claim 1, wherein the decryption key $k^{~*rk}$ is generated by converting a decryption key $k^{~*}$ with conversion information $W^{~}_1$, the decryption key $k^{~*}$ being set with the other one of the attribute information y and the attribute z, and wherein the encrypted conversion information $\phi^{rk}$ is generated by encrypting the conversion information $W_1$ and the conversion information $W^{~}_1$, the conversion information $W_1$ being encrypted by setting said one of the attribute information x' and the attribute information v'.

3. The cryptographic system according to claim 2,
wherein the ciphertext c is a vector on a basis B,
wherein the decryption key k* is a vector on a basis B* related to the basis B,
wherein the ciphertext c~ is a vector on a basis H obtained by converting the basis B with conversion information $H^{~}$, and
wherein the decryption key $^{~*rk}$ is a vector on a basis H* obtained by converting the basis B* with the conversion information $H^{~}$.

4. The cryptographic system according to claim 3,
wherein the encryption device outputs the ciphertext ct including the ciphertext c indicated in Formula 1 and the ciphertext c~ indicated in Formula 2,
wherein the re-encryption key generator acquires the decryption key k* indicated in Formula 3, and outputs the re-encryption key rk including the decryption key $k^{*rk}$ indicated in Formula 4, the decryption key $k^{~*rk}$ indicated in Formula 5, and the encrypted conversion information $\phi^{rk}$, and
wherein the re-encryption computer device outputs the re-ciphertext rct including the ciphertext $c^{renc}$ indicated in Formula 6 and the decryption key $k^{*renc}$ indicated in Formula 7

[Formula 1]
$$c_0 := (\zeta, -s_0)_{B_0},$$
for $i = 1, ..., L,$
if $\rho(i) = (t, \vec{v}_i = (t, \vec{v}_i := (v_{i,1}, ..., v_{i,n_t})),$
$$c_i := (s_i \vec{e}_{t,1} + \theta_i \vec{v}_t)_{B_t},$$
if $\rho(i) = \neg (t, \vec{v}_i),$
$$c_i := (s_i \vec{v}_t)_{B_t},$$
$$c := (c_0, \{c_i\}_{i=1,...,L})$$
where
$$\vec{f} \xleftarrow{U} F_q^r,$$
$$\vec{s}^T := (s_1, ..., s_L)^T := M \cdot \vec{f}^T,$$
$$s_0 := \vec{1} \cdot \vec{f}^T,$$
$$\zeta, \theta_i \xleftarrow{U} F_q,$$

M is an (L rows×r columns) matrix
$n_t$ is an integer of not less than 1

[Formula 2]
$$\tilde{c}_0 := (\tilde{\zeta}, -\tilde{s}_0)_{B_0}$$
for $j = 1, ..., \tilde{L},$
if $\tilde{\rho}(j) = (u, \vec{z}_j := (z_{j,1}, ..., z_{j,n_u})),$
$$\tilde{c}_j := (\tilde{s}_j \vec{e}_{u,1} + \tilde{\theta}_j \vec{z}_j)_{H_u},$$
if $\tilde{\rho}(i) = \neg (u, \vec{z}_j),$
$$\tilde{c}_j := (\tilde{s}_j \vec{z}_j)_{H_u}$$

-continued $$\tilde{c} := (\tilde{c}_0, \{\tilde{c}_j\}_{j=1,\ldots,\tilde{L}})$$

where $$\vec{\tilde{f}} \xleftarrow{U} F_q^{\tilde{r}},$$

$$\vec{\tilde{s}}^T := (\tilde{s}_1, \ldots, \tilde{s}_{\tilde{L}})^T := \tilde{M} \cdot \vec{\tilde{f}}^T,$$

$$\tilde{s}_0 := \vec{1} \cdot \vec{\tilde{f}}^T,$$

$$\tilde{\zeta}, \tilde{\theta}_i \xleftarrow{U} F_q$$

$\tilde{M}$ is an ($\tilde{L}$ rows $\times \tilde{r}$ columns) matrix
$n_u$ is an integer of not less than 1

$$k_0^* := (1, \delta)_{B_0^*},$$  [Formula 3]

$$k_t^* := (\delta \vec{x}_t)_{B_t^*} \text{ for } (t, \vec{x}_t), \in \Gamma,$$

$$\tilde{k}_{u,i}^* := \delta h_{u,i}^* \text{ for } u = 1, \ldots, d; i = 1, \ldots, n_u,$$

$$k^* := \left(k_0^*, \{k_t^*\}_{(t,\vec{x}_t)\in\Gamma}, \{\tilde{k}_{u,i}^*\}_{u=1,\ldots,d;i=1,\ldots,n_u}\right)$$

where $$\delta \xleftarrow{U} F_q,$$

$$\Gamma = (\{(t, \vec{x}_t), 1 \le t \le d\},$$

$$\vec{x}_t := (x_{t,1}, \ldots, x_{t,n_t}),$$

$$H_u^* := (h_{u,1}^*, \ldots, h_{u,n_u}^*)$$

d is an integer of not less than 1

$$k^{*rk} := k_t^* W_{q,t} \text{ for } 0, (t, \vec{x}_t) \in \Gamma$$  [Formula 4]

where $$W_1 := \{W_{1,t}\}_{0,(t,\vec{x}_t)\in\Gamma}$$

$$\tilde{k}_{u,i}^{*rk} := \vec{y}_{u,i} \tilde{k}_{u,i}^* \tilde{W}_{1,u} \text{ for } (u, \vec{y}_u) \in \tilde{\Gamma}; i = 1, \ldots, n_u,$$  [Formula 5]

$$\tilde{k}_u^{*rk} := \sum_{i=1}^{n_u} \tilde{k}_{u,i}^{*rk} \text{ for } (u, \vec{y}_u) \in \tilde{\Gamma},$$

$$\tilde{k}^{*rk} := \{\tilde{k}_u^{*rk}\}_{(u,\vec{y}_u)\in\tilde{\Gamma}}$$

where $$\tilde{\Gamma} = (\{(u, \vec{y}_u), 1 \le u \le d\},$$

$$\vec{y}_u := (y_{u,1}, \ldots, y_{u,n_u}),$$

$$\tilde{W}_1 := \{\tilde{W}_{1,u}\}_{(u,\vec{y}_u)\in\tilde{\Gamma}}$$

-continued $$\tilde{c}_0^{renc} := (c_0 + \tilde{c}_0 + (\zeta', -s_0' - \tilde{s}_0', \pi'(vk, 1))B_0,$$  [Formula 6]

for $i = 1, \ldots, L$, if $\rho(i) = (t, \vec{v}_i)$, $$c_i^{renc} := c_i + (s_i' \vec{e}_{t,1} + \theta_i' \vec{v}_i)_{B_t},$$

if $\rho(i) = \neg (t, \vec{v}_i)$, $$c_i^{renc} := c_i + (s_i' \vec{v}_i)_{B_t},$$

for $j = 1, \ldots, \tilde{L}$, if $\tilde{\rho}(j) = (u, \vec{z}_j)$, $$\tilde{c}_j^{renc} := \tilde{c}_j + (\tilde{s}_j' \vec{e}_{u,1} + \tilde{\theta}_j' \vec{z}_j)_{H_u},$$

if $\tilde{\rho}(j) = (u, \vec{z}_j)$, $$\tilde{c}_j^{renc} := \tilde{c}_j + (\tilde{s}_j' \vec{z}_j)_{H_u},$$

$$c^{renc} := \left(\tilde{c}_0^{renc}, \{c_i^{renc}\}_{i=1,\ldots,L}, \{\tilde{c}_j^{renc}\}_{j=1,\ldots,\tilde{L}}\right)$$

where $$\vec{f}' \xleftarrow{U} F_q^r, \vec{\tilde{f}}' \xleftarrow{U} F_q^{\tilde{r}},$$

$$\vec{s}'^T := (s_1', \ldots, s_L')^T := M \cdot \vec{f}'^T, s_0' := \vec{1} \cdot \vec{f}'^T,$$

$$\vec{\tilde{s}}'^T := (\tilde{s}_1', \ldots, \tilde{s}_{\tilde{L}}')^T := \tilde{M} \cdot \vec{\tilde{f}}'^T, \tilde{s}_0' := \vec{1} \cdot \vec{\tilde{f}}'^T,$$

$$\pi', \zeta', \theta_i', \tilde{\theta}_j' \xleftarrow{U} F_q$$

vk is a value $$k_0^{*renc} := k_0^{*rk} + (0^2, \sigma(-1, vk))_{D_0^*},$$  [Formula 7]

$$k_t^{*renc} := k_t^{*rk} + r \text{ for } (t, \vec{x}_t) \in \Gamma,$$

$$\tilde{k}_u^{*renc} := \tilde{k}_u^{*rk} + r' \text{ for } (u, \vec{y}_u) \in \tilde{\Gamma},$$

$$k^{*renc} := \left(k_0^{*renc}, \{k_t^{*renc}\}_{(t,\vec{x}_t)\in\Gamma}, \{\tilde{k}_u^{*renc}\}_{(u,\vec{y}_u)\in\tilde{\Gamma}}\right)$$

where $$\sigma, r, r' \xleftarrow{U} F_q.$$

5. The cryptographic system according to claim 3,
wherein the encryption computer device outputs the ciphertext ct including the ciphertext c indicated in Formula 8 and the ciphertext c˜ indicated in Formula 9,
wherein the re-encryption key generator acquires the decryption key k* indicated in Formula 10, and outputs the re-encryption key rk including the decryption key k*$^{rk}$ indicated in Formula 11, the decryption key k˜*$^{rk}$ indicated in Formula 12, and the encrypted conversion information φ$^{rk}$, and
wherein the re-encryption computer device outputs the re-ciphertext rct including the ciphertext c$^{renc}$ indicated in Formula 13 and the decryption key k*$^{renc}$ indicated in Formula 14

$$c_0 := (\zeta, \delta)_{B_0},$$  [Formula 8]

$$c_t := (\delta \vec{x}_t)_{B_t} \text{ for } (t, \vec{x}_t) \in \Gamma,$$

$$c := (c_0, \{c_t\}_{(t,\vec{x}_t)\in\Gamma})$$

where $$\zeta, \delta \xleftarrow{U} F_q,$$

-continued $\Gamma := (\{(t, \vec{x}_t), 1 \le t \le d\},$ $\vec{x}_t := (x_{t,1}, \ldots, x_{t,n_t}),$ $n_t$ is an integer of not less than 1

$\tilde{c}_0 := (\tilde{\xi}, \delta)_{B_0},$ $\tilde{c}_u := (\overline{\delta \vec{y}_u}^{n_u})_{H_u}$ for $(u, \vec{y}_u) \in \tilde{\Gamma},$ $c^\sim := (\tilde{c}_0, \{\tilde{c}_u\}_{(u,\vec{y}_u) \in \tilde{\Gamma}})$ where $\tilde{\xi} \xleftarrow{U} F_q,$ $\tilde{\Gamma} := (\{(u, \vec{y}_u), 1 \le u \le d\},$ $\vec{y}_u := (y_{u,1}, \ldots, y_{u,n_u})$ $n_u$ is an integer of not less than 1

[Formula 10]

$k_0^* := (1, -s_0)_{B_0^*},$ for $i = 1, \ldots, L,$ if $\rho(i) = (t, \vec{v}_i := (v_{i,1}, \ldots, v_{i,n_i})),$ $k_i^* := (\overline{s_i \vec{e}_{t,1} + \theta_i \vec{v}_i}^{n_t})_{B_t^*},$ if $\rho(i) = \neg(t, \vec{v}_i),$ $k_i^* := (\overline{s_i \vec{v}_i}^{n_t})_{B_t^*},$ $k^* := (k_0^*, \{k_i^*\}_{i=1,\ldots,L})$ where $\vec{f} \xleftarrow{U} F_q^r,$ $\vec{s}^T := (s_1, \ldots, s_L)^T := M \cdot \vec{f}^T,$ $s_0 := \vec{1} \cdot \vec{f}^T,$ $\theta_i \xleftarrow{U} F_q,$ M is an (L rows×r columns) matrix $k_0^{*rk} := (k_0^* + (0, -\tilde{s}_0)_{B^*})W_{1,0},$ $k_i^{*rk} := k_i^* W_{1,i}$ for $i = 1, \ldots, L,$ $k^{*rk} := (k_0^{*rk}, \{k_i^{*rk}\}_{i=1,\ldots,L})$ where $\vec{\tilde{f}} \xleftarrow{U} F_q^{\tilde{r}},$ $\vec{\tilde{s}}^T := (\tilde{s}_1, \ldots, \tilde{s}_L)^T := \tilde{M} \cdot \vec{\tilde{f}}^T,$ -continued $\tilde{s}_0 := \vec{1} \cdot \vec{\tilde{f}}^T,$ $W_1 := \{W_{1,i}\}_{i=0,\ldots,L}$ $\tilde{M}$ is an ($\tilde{L}$ columns×$\tilde{r}$ columns) matrix

[Formula 12]

for $j = 1, \ldots, \tilde{L},$ if $\tilde{\rho}(j) = (u, \vec{z}_j := (z_{j,1}, \ldots, z_{j,n_u})),$ $\tilde{k}_j^{*rk} := (\overline{\tilde{s}_j \vec{e}_{u,1} + \tilde{\theta}_j \vec{z}_j}^{n_u})_{H_u^*} \tilde{W}_{1,j},$ if $\tilde{\rho}(j) = \neg(u, \vec{z}_j),$ $\tilde{k}_j^{*rk} := (\overline{\tilde{s}_j \vec{z}_j}^{n_u})_{H_u^*} \tilde{W}_{1,j},$ where $\tilde{W_1} := \{\tilde{W}_{1,j}\}_{j=1,\ldots,\tilde{L}}$

[Formula 13]

$c_0^{renc} := (c_0 + \tilde{c}_0 + (\zeta', \delta', \pi'(vk, 1))_{B_0}),$ $c_t^{renc} := (c_t + (\delta' \vec{x}_t B_t)$ for $(x, \vec{x}_t) \in \Gamma$ $c^{renc} := (c_0^{renc}, \{c_t^{renc}\}_{(t,\vec{x}_t) \in \Gamma})$ where $\zeta', \delta', \pi' \xleftarrow{U} F_q,$ vk is a value

[Formula 14]

$k_0^{*renc} := (k_0^{*rk} + (0, 0, \sigma(-1, vk))_{D_0^*})W_{1,0},$ for $i = 1, \ldots, L,$ if $\rho(i) = (t, \vec{v}_i),$ $k_i^{*renc} := k_i^{*rk} + (\overline{s_i' \vec{e}_{t,1} + \theta_i' \vec{v}_i}^{n_t})_{D_t},$ if $\rho(i) = \neg(t, \vec{v}_i),$ $k_i^{*renc} := k_i^{*rk} + (\overline{s_i' \vec{v}_i}^{n_t})_{D_t},$ for $j = 1, \ldots, \tilde{L},$ if $\tilde{\rho}(j) = (u, \vec{z}_j),$ $\tilde{k}_j^{*renc} := \tilde{k}_j^{*rk} + (\overline{\tilde{s}_j' \vec{e}_{u,1} + \tilde{\theta}_j' \vec{z}_j}^{n_u})_{U_u},$ if $\tilde{\rho}(j) = \neg(u, \vec{z}_j),$ $\tilde{k}_j^{*renc} := \tilde{k}_j^{*rk} + (\overline{\tilde{s}_j' \vec{z}_j}^{n_u})_{U_u},$ $k^{*renc} := (k_0^{*renc}, \{k_i^{*renc}\}_{i=1,\ldots,L}, \{\tilde{k}_j^{*renc}\}_{j=1,\ldots,\tilde{L}})$ where $\vec{f}' \xleftarrow{U} F_q^r, \vec{\tilde{f}}' \xleftarrow{U} F_q^{\tilde{r}},$ $\vec{s}'^T := (s_1', \ldots, s_L')^T := M \cdot \vec{f}'^T, s_0' := \vec{1} \cdot \vec{f}'^T,$ $\vec{\tilde{s}}'^T := (\tilde{s}_1', \ldots, \tilde{s}_L')^T := \tilde{M} \cdot \vec{\tilde{f}}'^T, \tilde{s}_0' := \vec{1} \cdot \vec{\tilde{f}}'^T,$ $\sigma, \theta_i', \tilde{\theta}_j' \xleftarrow{U} F_q.$

6. The cryptographic system according to claim 3, further comprising a re-ciphertext decryption computer device to acquire a decryption key k*' which is set with the other one of the attribute information x' and the attribute information v', and to decrypt the re-ciphertext rct using the acquired decryption key k*'.

7. The cryptographic system according to claim 2, further comprising
a re-ciphertext decryption computer device to acquire a decryption key k*' which is set with the other one of the attribute information x' and the attribute information v', and to decrypt the re-ciphertext rct using the acquired decryption key k*'.

8. The cryptographic system according to claim 1, further comprising:
a re-ciphertext decryption computer device to acquire a decryption key k*' which is set with the other one of the attribute information x' and the attribute information v', and to decrypt the re-ciphertext rct using the acquired decryption key k*'.

9. A cryptographic program stored on a non-transitory computer storage medium and when executed by a computer processor forming a computer device that implements a proxy re-encryption function in a cryptographic scheme for decrypting a ciphertext with a decryption key, the ciphertext being set with one of two pieces of information related to each other, the decryption key being set with the other one of the two pieces of information, the cryptographic program comprising causing the computer processor to execute:
an encryption process to output a ciphertext ct including a ciphertext c and a ciphertext c~, the ciphertext c being set with one of attribute information x and attribute information v related to each other, the ciphertext c~ being set with one of attribute information y and attribute information z related to each other;
a re-encryption key generation process to acquire a decryption key k* which is set with the other one of the attribute information x and the attribute information v, and to output a re-encryption key rk including a decryption key $k^{*rk}$, a decryption key $k^{\sim *rk}$, and encrypted conversion information $\phi^{rk}$, the decryption key $k^{*rk}$ being obtained by converting the acquired decryption key k* with conversion information $W_1$, the decryption key $k^{\sim *rk}$ being set with the other one of the attribute information y and the attribute information z, the encrypted conversion information $\phi^{rk}$ being obtained by encrypting the conversion information $W_1$ by setting one of attribute information x' and attribute information v' related to each other; and
a re-encryption process to output a re-ciphertext rct including a ciphertext $c^{renc}$ and a decryption key $k^{*renc}$, the ciphertext $c^{renc}$ being obtained by setting one of additional information H and additional information Θ related to each other, to the ciphertext ct, the decryption key $k^{*renc}$ being obtained by setting the other one of the additional information H and the additional information Θ to the re-encryption key rk;
the cryptographic program when implemented by the computer processor thereby establishing an encryption key, decryption key, and re-encryption key with improved flexibility of usage to enhance cybertext security.

* * * * *